(12) United States Patent
Salimi Jazi

(10) Patent No.: US 11,934,915 B2
(45) Date of Patent: *Mar. 19, 2024

(54) SYNTHETIC STANDARDIZED WAVE IDENTIFIERS FOR REPRESENTING AND CLASSIFYING ENTITIES

(71) Applicant: Farzad Salimi Jazi, San Jose, CA (US)

(72) Inventor: Farzad Salimi Jazi, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/588,357

(22) Filed: Jan. 31, 2022

(65) Prior Publication Data

US 2022/0156475 A1  May 19, 2022

Related U.S. Application Data

(63) Continuation-in-part of application No. 17/100,476, filed on Nov. 20, 2020, now Pat. No. 11,238,325.

(60) Provisional application No. 62/937,895, filed on Nov. 20, 2019.

(51) Int. Cl.
*G06K 7/14* (2006.01)

(52) U.S. Cl.
CPC ......... *G06K 7/1439* (2013.01); *G06K 7/1417* (2013.01)

(58) Field of Classification Search
CPC .................... G06K 7/1439; G06K 7/1417
See application file for complete search history.

(56) References Cited

U.S. PATENT DOCUMENTS

| | | |
|---|---|---|
| 8,331,542 B2 | 12/2012 | Crausaz et al. |
| 9,524,638 B2 | 12/2016 | Kim et al. |
| 9,991,970 B2 | 6/2018 | Ansell |
| 11,238,325 B2 | 2/2022 | Salimi Jazi |
| 2007/0108281 A1 | 5/2007 | Kumar et al. |
| 2012/0099760 A1* | 4/2012 | Bernosky ............. G06F 16/683 382/100 |
| 2014/0372210 A1 | 12/2014 | Watfa et al. |
| 2015/0120767 A1 | 4/2015 | Skeen |

(Continued)

FOREIGN PATENT DOCUMENTS

| | | |
|---|---|---|
| EP | 2947617 | 11/2015 |
| WO | WO 2021102342 | 5/2021 |

OTHER PUBLICATIONS

Portions of prosecution history of U.S. Appl. No. 17/100,476, filed Jan. 12, 2022, Salimi Jazi, Farzad.

(Continued)

*Primary Examiner* — Sonji N Johnson
(74) *Attorney, Agent, or Firm* — Makoui Law, PC; Ali Makoui

(57) ABSTRACT

A method of identifying data items by wave blocks, each wave block comprising a set of unique features distinguishable from the unique features of other wave blocks. The unique features of the wave blocks are extracted and stored. A plurality of wave tags are defined, each comprising a set wave blocks. A mapping of the set of wave blocks to each wave tag is stored. A request for a wave tag to identify a data item is received and a wave tag is assigned to the data item. The wave tag is broadcasted and is captured by a capturing device, which extracts the unique features of the wave blocks. The wave tag is identified by comparing the extracted features of the wave blocks with the stored features of the plurality of wave blocks. The data item is identified from the mapping of the data item to the wave tag.

28 Claims, 56 Drawing Sheets

(56) References Cited

U.S. PATENT DOCUMENTS

| | | |
|---|---|---|
| 2015/0302231 A1 | 10/2015 | Makimoto et al. |
| 2016/0104190 A1 | 4/2016 | Webster et al. |
| 2017/0264969 A1* | 9/2017 | Mitra .................... H04H 60/58 |
| 2017/0280350 A1 | 9/2017 | Skaaksrud |
| 2018/0225655 A1 | 8/2018 | Abhishek |
| 2019/0013879 A1 | 1/2019 | Webster |
| 2019/0028208 A1 | 1/2019 | Abhishek et al. |
| 2019/0281354 A1 | 9/2019 | Webster et al. |
| 2019/0347635 A1 | 11/2019 | Siedlecki et al. |
| 2020/0196138 A1 | 6/2020 | Abhishek |
| 2020/0272875 A1 | 8/2020 | Neymotin et al. |

OTHER PUBLICATIONS

International Search Report and Written Opinion of PCT/US2020/061628, dated Feb. 11, 2021, Salimi Jazi, Farzad.

Chao, Wei-Kun, "Introduction to Video Fingerprinting," *Graduate Institute of Communication Engineering, National Taiwan University (NTU)*, Month Unknown, 2009.

* cited by examiner

400

| Starting Signaling Wave Blocks | | | |
|---|---|---|---|
| Wave Block ID | Wave Block Fingerprint | Data Type Identified by the Corresponding Wave Tag | |
| Wave Block S1 | Fingerprint S1 | Products | — 421 |
| Wave Block S2 | Fingerprint S2 | URLs | — 422 |
| Wave Block S3 | Fingerprint S3 | Phone Numbers | — 423 |
| Wave Block S4 | Fingerprint S4 | ISNBs | — 424 |
| Wave Block S5 | Fingerprint S5 | 1D Barcodes | — 425 |
| Wave Block S6 | Fingerprint S6 | 2D Barcodes | — 426 |
| Wave Block S7 | Fingerprint S7 | Entity A's Data | — 427 |
| Wave Block S8 | Fingerprint S8 | Entity C's Data | — 428 |
| Wave Block S9 | Fingerprint S9 | Short Data | — 429 |
| ⋮ | ⋮ | ⋮ | |
| Wave Block Sn | Fingerprint Sn | Any Item | — 430 |

| Body Wave Blocks | |
|---|---|
| Wave Block ID | Wave Block Fingerprint |
| Wave Block B1 | Fingerprint B1 |
| Wave Block B2 | Fingerprint B2 |
| ⋮ | ⋮ |
| Wave Block Bn | Fingerprint Bn |

| Short Data Body Wave Blocks 452 | | |
|---|---|---|
| Wave Block ID 451 | Wave Block Fingerprint | Wave Block's Associated Data 453 |
| Wave Block SD1 454 | Fingerprint SD1 | 1399185044 457 |
| Wave Block SD2 455 | Fingerprint SD2 | 8592866044 458 |
| ⋮ 456 | ⋮ | ⋮ 459 |
| Wave Block SDn | Fingerprint SDn | 362761126 |

| Ending Signaling Wave Blocks | | |
|---|---|---|
| Wave Block ID 471 | Wave Block Fingerprint 472 | Data Identified by the Corresponding Wave Tag 473 |
| Wave Block E1 | Fingerprint E1 | Products — 481 |
| Wave Block E2 | Fingerprint E2 | URLs — 482 |
| Wave Block E3 | Fingerprint E3 | Phone Numbers — 483 |
| Wave Block E4 | Fingerprint E4 | ISNBs — 484 |
| Wave Block E5 | Fingerprint E5 | 1D Barcodes — 485 |
| Wave Block E6 | Fingerprint E6 | 2D Barcodes — 486 |
| Wave Block E7 | Fingerprint E7 | Short Data — 487 |
| Wave Block E8 | Fingerprint E8 | Entity A's Data — 488 |
| Wave Block E9 | Fingerprint E9 | Entity C's Data — 489 |
| ⋮ | ⋮ | ⋮ |
| Wave Block En | Fingerprint En | Any Item — 490 |

FIG. 4D

| Starting Signaling Wave Block 901 | Body Wave Block 1 902 | ... 903 | Body Wave Block n 904 | Ending Signaling Wave Block 905 | Entity Class 906 |
|---|---|---|---|---|---|
| S1 911 | Any | ... | Any | E1 912 | Short Data 913 |
| Sb 921 | Any | ... | Any | Any | Organization A 922 |
| ... | ... | ... | ... | ... | ... |
| Sd 931 | Any | ... | Any | Ed 932 | Organization B 933 |
| Sd 931 | Any | ... | Any | Ep 941 | Organization C 942 |
| Sm | B1m | ... | Bnm | E1m | Any |

| Starting Signaling Wave Block (901) | Body Wave Block 1 (902) | ... (903) | Body Wave Block n (904) | Ending Signaling Wave Block (905) | Entity Class (906) |
|---|---|---|---|---|---|
| Sb 921 | B6 1011 | ... | Any | E6 1012 | Products 1013 |
| Sb 921 | B20 | Not Used | Not Used | Not Used | Mapped Data A |
| Sb 921 | B36 | Not Used | Not Used | Not Used | Mapped Data B |
| Sb 921 | B32 1021 | Any | Any | E12 | URLs |
| Sb 921 | B8 | Not Used | Any | E8 | Short Data |
| Sb 921 | ⋮ | ⋮ | ⋮ | ⋮ | ⋮ |

| Organization A's Wave Blocks | |
|---|---|
| Wave Tags' Wave Block Assignment (1051) | Identified Item (1052) |
| Sb-B6-B55-E6 | Tesla Model X - Price 60K |
| Sb-B6-B56-E6 | Tesla Model Y - Price 42K |
| Sb-B6-B57-E6 | Tesla Model YS - Price 51K |
| Sb-B20 | Mapped Data A |
| Sb-B36 | Mapped Data B |
| Sb-B8-B14-E8 | www.orgA.com |
| Sb-B8-B17-E8 | www.orgA.com/promotion5 |
| ⋮ | ⋮ |

SYNTHETIC STANDARDIZED WAVE IDENTIFIERS FOR REPRESENTING AND CLASSIFYING ENTITIES

CLAIM OF BENEFIT TO PRIOR APPLICATIONS

This application is a continuation-in-part of U.S. patent application Ser. No. 17/100,476, filed on Nov. 20, 2020, published as U.S. Patent Publication No. 2021/0150298. U.S. patent application Ser. No. 17/100,476 claims the benefit of U.S. Provisional Patent Application Ser. No. 62/937,895, filed on Nov. 20, 2019. The contents of U.S. patent application Ser. No. 17/100,476, published as U.S. Patent Publication No. 2021/0150298 and U.S. Provisional Patent Application No. 62/937,895 are hereby incorporated by reference.

BACKGROUND

Machine-readable labels are used to identify information about an item. One method for representing items is using an optical label such as a one-dimensional barcode or a matrix barcode such as Quick Response (QR) code. An optical label includes an optically readable code that may be read with an image input device such as a camera. The image may then be processed to identify the information contained in the optical label.

For example, an image of a QR code may be taken by a camera. The size of the code matrix may then be obtained based on the two-dimensional code that is read out. The coordinates of data cells in the code matrix may then be successively obtained and a judgement of '0', '1' (light, dark) content of the data cells may be made. Each of the data cells may then be converted into character information to identify the optical label's information.

BRIEF DESCRIPTION OF THE DRAWINGS

The various embodiments of the present non-printable synthetic standardized identifier tags now will be discussed in detail with an emphasis on highlighting the advantageous features. These embodiments depict the novel and non-obvious non-printable synthetic standardized identifier tags shown in the accompanying drawings, which are for illustrative purposes only. These drawings include the following figures, in which like numerals indicate like parts:

FIGS. 4A-4D illustrate several examples of the metadata and features data stored for the signaling and body wave blocks, according to various aspects of the present disclosure;

FIG. 9 illustrates a sample wave block assignment table for constructing classifying standardized wave tags, according to various aspects of the present disclosure;

FIG. 10A illustrates an example arrangement of wave blocks for a specific organization, according to various aspects of the present disclosure;

FIG. 10B illustrates an example arrangement of wave blocks in wave tags based on the table of FIG. 10A to identify different items associated with a specific organization, according to various aspects of the present disclosure;

FIG. 42E is a schematic front view of a computing device that may display a user interface for using a wave tag as a method of login or a step in a multifactor authentication, according to various aspects of the present disclosure.

DETAILED DESCRIPTION

Figure 1:
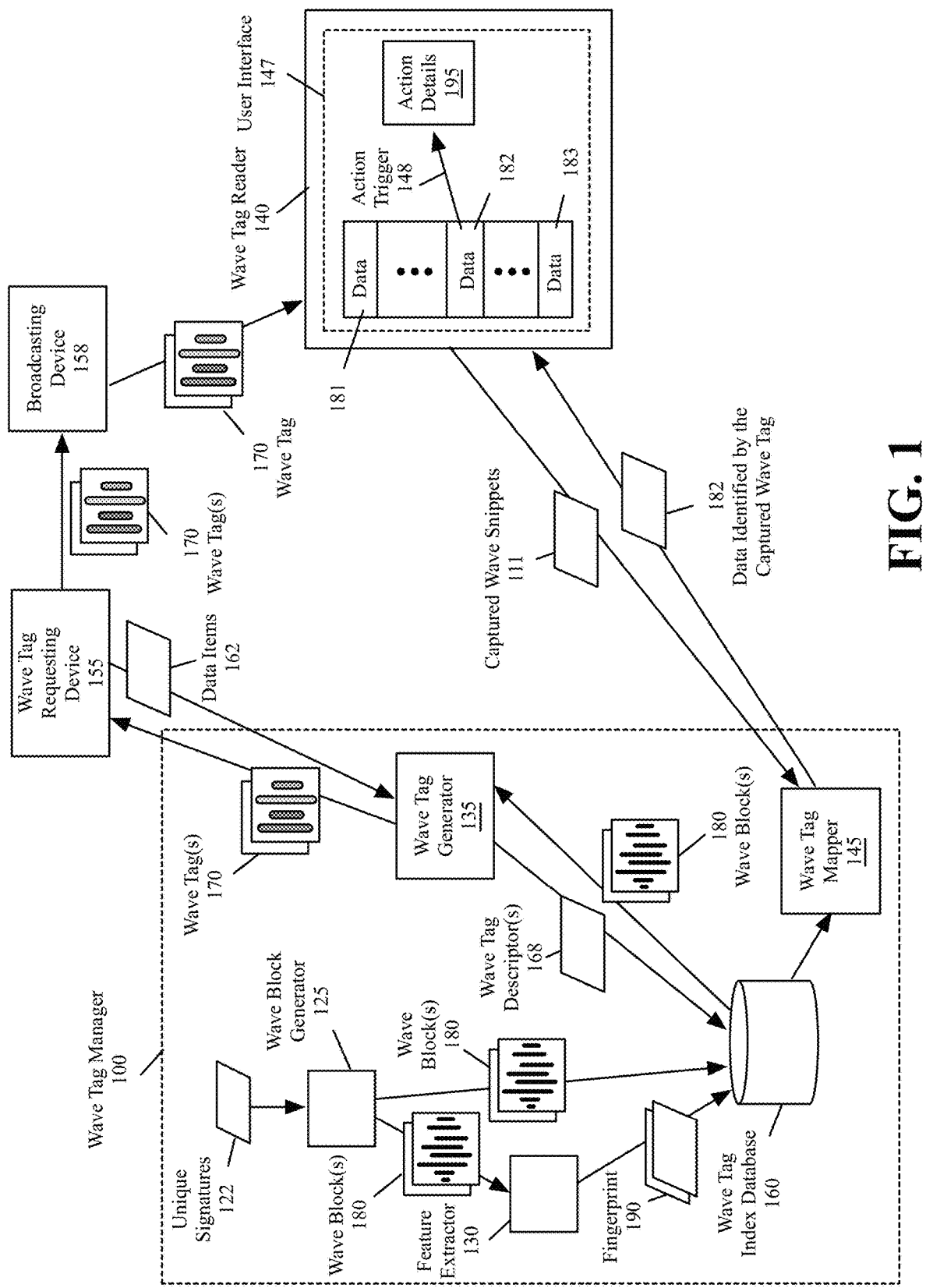
FIG. 1 is a functional diagram illustrating an example embodiment of a wave tag lifecycle, according to various aspects of the present disclosure.

One aspect of the present embodiments includes the realization that the optical labels include several shortcomings. One problem with the optical labels is that the optical two-dimensional code itself should be visible by an optical code reader, such as a camera or scanner, and by a human who is holding the code reader. Therefore, the optical codes are unsuitable for the cases where the codes cannot be seen. The barcode or QR-code are images printed by barcode or two-dimensional code printers on a printable surface. The optical label typically includes light and dark colors representing digital 0 and 1 values. The optical label has to be optically scanned in order to convert the image pixel by pixel to digital values and store them in the memory of the reading device. The optical labels are, therefore, suitable when the printed image is visible and may be scanned by an optical code reader device. However, there are many situations where the reading operation is inconvenient, repetitive, ambiguous, or not possible. Some of these situations are described below.

A first situation where the optical labels are not practical is when the optical label may become unreadable due to the distance between the printed code and the reading device. This distance may be unavoidable or inconvenient. For example, an optical label displayed on a location such as a billboard may be far away from a person, or may be too high to be scanned by the person's reading device.

A second situation may occur when showing the code is through another device that makes the code unclear or difficult to read. For example, showing the printed barcode or QR code inside a TV usually makes the code blurry and unclear, and many attempts may be required in order to scan data.

A third situation is a predicted, or unpredicted temporary display of the printed optical label. The display may be limited to time, location, or other constraints. For example, showing a product's barcode in TV for a few seconds may make the optical reading operation impractical, since it may take time for people to scan the displayed printed code using their reading device. The scanning operation may also be inconvenient, as the person may have to move in front of the TV.

A fourth situation is when the printed code should be scanned by a large number of reading devices and there are limited number of printed codes available. As an example, consider a case when a large number of persons attending a game in a stadium want to read a barcode. Either a large number of printed bar codes has to be distributed among the attendants or it may take a lot of time for all persons to scan a limited number of barcodes.

A fifth situation is when the printed code should be simultaneously scanned by more than one reading device. For example, consider a room full of people where some people are closer and some are far away from a printed optical label that maps to a contest in which everyone has to start together for a fair competition. In this situation it may be hard or impossible to make sure everyone accesses the code at almost the same exact time.

A sixth situation is when a printed optical code has to be accessible to many persons, but the printed label may be placed in a limited number of places. For example, in an airport with many terminals and hundreds of gates, it is hard to place printed optical labels everywhere to be accessed by everyone as an emergency code at a specific time.

A seventh situation is when showing a printed code is not possible. For example, audio devices, such as radio, loudspeakers, or similar devices do not have visually detectable outputs. In this situation clearly the exiting optical labels do not work An eighth situation is when there is a need for every possible reader in the environment to have access to an identifier in a printed code in a short time period of time. For example, an optical label may represent a promotion that is valid for just a short period of time and there is a need to expose the code to everyone in a large audience, in the short time period in an equal way. Using the printed version of identifiers requires at least one copy of the code to be visible by all readers in the short time period.

In addition to the above situations, there are other situations where none of existing printed codes including barcode and QR-code may be used. First, the printed codes are not designed for remote scan as both the reading device and the printed code should be in front of each other. The printed codes are not built to be detected from longer distances such as several meters, several kilometers, or larger distances. Second, the printed codes are multi-color images (e.g., including black and white or other colors) which may be created based on a standard and contain some data. Thus, their standardized code representing a product or data are in printed format and their reading devices are built to read the printed code not non-printed codes.

Third, the printed codes and the corresponding reading devices obey one general standard for all in their kind. Thus, anyone who has a reading device may be able to read the code and extract the corresponding data. The printed codes are, therefore, general purpose and are not suitable for situations where the code should be readable by some but not all persons. Fourth, the existing standardized printed codes are designed on the assumption that they can be visible at least once from the front, or at least from an angle. The printed codes cannot be detected by non-optical readers and the codes and are not suitable for applications where the codes are not to be visible by everyone.

Fifth, the existing standardized printed codes are built on the assumption that they may be interpreted as soon as they are captured. In other words, the printed codes are always mapped to the same entity and are not designed to be captured and interpreted at a later time. For example, a captured promotion may map to nothing for now even it is captured now but if it is captured now and interpreted later it would be mapped to a promoted item. Alternatively, the same captured promotion may be mapped to different items in different periods of time in future.

There have been attempts in the past to use non-printed codes to address some of the shortcomings of the printed codes. However, the existing methods of generating and using non-printed codes themselves suffer from the following shortcomings.

For example, in one method, a sound may be captured by a mobile device and may either be interpreted by the mobile device or may be sent to a remote server for interpretation. The mobile device may then perform a function based on the interpretation of the captured voice. For example, in a movie theater, a sound such as "please turn off your phone" may be played through one or more speakers. The sound may be interpreted by the mobile device or by the remote server and the mobile device may provide a visual audio, or a tactile notification to a user to turn the off mobile device. Alternatively, the mobile device may be configured to automatically turn off. This method, however, interprets and responds to the sounds corresponding to spoken words and does not map synthetic, standardized identifier tags to different entities or different functions. This method may also not be able to properly handle a situation where there is a conversation such as "I told her to please turn off your phone," where there is no intention for the listeners to turn off their phones. In addition, this method is for use in real time and may not be able to handle capturing and storing sounds to be interpreted and used at a later time (e.g., several hours or several days later).

Another method used in the past converts alphanumerical data into inaudible tones for inclusion in the content. For example, each bit of the data may be represented by a tone pair. The content may be broadcasted to a device to provide tangential information regarding the content, information regarding the current location of the user, information regarding a product or service to which the user may have interest, launch an application, or launch a website. In this method, the tones included in the content are always directly dependent on the corresponding alphanumeric message. In other words, the data to be conveyed is converted to tones, the tones are embedded in a specific location in the content that is broadcasted. The broadcast is then captured, the embedded tones are extracted from their specific location in the content, and are converted back to the corresponding data (e.g., to the alphanumeric characters in a message or to an action to be taken by the receiving device). The method does not use standardized identifiers that are independent of the corresponding message. The method does not provide different interpretations of the same set of tones based on the identity of the receiving device nor does it distinguish messages that should only be interpreted by certain receiving devices based on the identity of the receiving devices. the method is not capable of detecting tones that are included in random placed in the content.

The present embodiments, as described in detail below, solve the above-mentioned problems by providing a novel synthetic non-printed identifier wave pattern referred herein as wave tag. The wave tag is a non-printed standardized identification tag representing different items and/or different actions. The wave tags are highly distinguishable and may obey predefined rules when created and may be recognized by precise accuracy during the capturing operation. The waves include mechanical waves, such as for example, and without limitations, acoustic waves such as audible sound and ultrasound. The waves may include electromechanical (EM) waves, such as for example, and without limitations, visible light, infrared light, ultraviolet light, radio waves, microwaves, X rays, etc.

Each wave tag, in some embodiments, may include one or more wave blocks. Each wave block may represent all or a portion of the information or data of the wave tag. The wave blocks may be detectable by a capturing device. The combination of the wave blocks may be interpreted by the capturing device. The wave blocks, in some embodiments, may include signaling wave blocks and/or body wave blocks. The signaling wave blocks may include one or more signaling patterns that may trigger the capturing device to extract the mapping data, to perform an operation, and/or to convey some information to help interpret the wave tag. The signaling wave blocks may include, for example, and without limitations, one or more starting wave blocks to indicate the start of a wave tag. The signaling wave blocks may include, one or more ending waves block to indicate the end of a wave tag, and/or one or more signaling blocks to provide performance enhancements and scalability (e.g., to reduce searching delays by providing searching hierarchy, load balancing information, etc.).

The starting and ending signaling wave blocks may include unique wave characteristics and/or may be unique wave patterns. The wave tag structure including the signaling wave blocks may provide additional information that may help interpreting the wave blocks, may help interpreting the associated wave tag, and/or may convey some meaning or action without a need to be decoded, reversed, or converted back to data. For example, the signaling wave blocks may indicate how many other wave blocks are included in the wave tag, whether the data identified by the wave tag represents a product, a service, a promotion, which organization or which person is the owner of the wave tag, etc. The wave blocks may include specific waves patterns that may be captured and fingerprinted. The fingerprints may be used to make a table lookup to find a match with stored fingerprints of the existing wave blocks. Once the wave blocks of a wave tag are detected, the wave tag and the data identified by the wave tag may be found by a database search (e.g., by a table lookup).

The wave tags may be for public or private use. For example, some embodiments may include public (or general purpose) wave tags and private (or reserved) wave tags. A public wave tag may be captured and interpreted by any reading device that is capable of reading the wave tag. A private wave tag may be associated to a particular owner or entity and may only be captured and/or interpreted by devices of the corresponding owner or entity. Other reading devices may not be able to capture and/or interpret the private wave tags.

Examples of wave tags may include acoustic wave tags, light wave tags, or arbitrary EM waves tags. Acoustic wave tags may include audible or inaudible sound tags and may specify the pattern, code, and/or data, using unique standardized sound block(s). The light tags may specify the pattern, code, and/or data using unique standardized blocks of synthetic light patterns which may or may not be visible by humans but may be detectable by an electronic capturing (or reader) device. The EM wave tags may specify the pattern, code, and/or data using unique standardized blocks of synthetic EM waves which may be detectable by an electronic capturing device. Each class of wave tags may be detectable by a corresponding type of capturing device. For example, some embodiments may include devices and/or software for performing acoustic tag capturing operations, light tag capturing operations, and EM wave tag capturing operation.

The remaining detailed description describes the present embodiments with reference to the drawings. In the drawings, reference numbers label elements of the present embodiments. These reference numbers are reproduced below in connection with the discussion of the corresponding drawing features.

I. Synthetic Standardized Identifier Tags for Representing and Classifying Entities FIG. 1 is a functional diagram illustrating an example embodiment of a wave tag lifecycle, according to various aspects of the present disclosure. With reference to FIG. 1, wave tags, such as the wave tags 170 may be a distinguishable non-printed unique wave patterns representing items or actions in the real world. The wave tags 170 may be generated by a wave tag manager system 100, which may include hardware and/or software for generating the unique non-printed distinguishable standardized waves tags 170.

The wave tags 170 may be non-printed standardized codes and may be in a wave format such as, for example, and without limitations, acoustic wave format, light wave format, or other types of mechanical and/or EM wave formats, etc. The wave tags 170 may include one or more wave blocks 180. The wave blocks 180 may be unique wave patterns and each wave tag 170 may include a unique combination of one or more wave blocks 180. Wave tags, in some embodiments, may include wave blocks that are made of different type of waves. For example, and without limitations, a wave tag may include one or more sound wave blocks and one or more light blocks. A wave block, in some embodiments, may include several different types of wave patterns. For example, and without limitations, a wave block may include both audible sound wave patterns and ultrasound wave patterns. As another example, a wave block may include both sound and light wave patterns, for example, the wave block may be a video clip.

The wave tag manager 100 may include a wave block generator 125, which may receive unique signatures 122 and may generate unique wave blocks 180 from the unique signatures 122. The unique signatures 122 may be, for example, and without limitations, unique strings generated by one or more hash generators, unique information extracted from existing wave files (e.g., music files, sounds, images, or videos recorded from nature, etc.), unique information extracted from a particular wave file provided by a wave tag requesting device 155 (e.g., an electronic device associated with an entity such as organization or a person who is requesting one or more wave tags 170), or may be any unique code or data.

The wave block generator 125 may receive the unique signatures 122 and may generate the wave blocks 180 that may include, for example, and without limitations, distinguishable sound patterns, distinguishable light patterns, or other type wave patterns with distinguishable features. The wave tag manager 100 may include a feature extractor 130 that may receive the wave blocks 180 and may extract the unique features of the wave patterns of each wave block 180. For example, and without limitations, the unique features may be fingerprints 190 of the wave blocks 180 that may be extracted by a fingerprint generator as described below with reference to FIG. 3. The unique features of the wave blocks 180 may also be extracted by other techniques such as artificial intelligence, etc. The wave blocks 180 and their associated features (e.g., the fingerprints 190) may be stored in one or more databases (or tables) such as the wave tag index database 160.

The wave tag manager 100 may receive requests from wave tag requesting devices 155 that may request one or more wave tags to identify items such as products, services, phone numbers, website uniform resource locators (URLs), barcodes, international standard book numbers (ISBNs), etc. A wave tag requesting device 155 may send a request that may include a set of data items 162, such as, for example, and without limitations, data regarding the item(s) to be identified by the requested wave tag(s), information regarding the requesting organization or person, a set of customization data for customizing the wave patterns of the requested wave tag(s), the number of the wave tags requested, etc.

The wave tag manager 100 may include a wave tag generator 135, which may receive the data items 162 and may generate one or more wave tags 170 based on the data items 162 received from the wave tag requesting device 155. The wave tag generator 135 may activate the wave block generator 125 to generate one or more wave blocks 180 based on the data items 162 received from the requesting device. In addition to, or in lieu of activating the wave block generator 125, the wave tag generator 135 may retrieve one or more wave blocks 180 from the wave tag index database 160.

The wave tag generator 135 may combine the wave blocks 180 based on a set of rules to generate one or more wave tags 180. The wave tag generator 135 may generate a descriptor 168 for each generated wave tag 170. The descriptor 168 may identify the wave blocks 180 used to generate the wave tag 170, the data item identified by the wave tag 170, and/or the schema and the rules used for generating the wave tag 170, etc. The wave tag manager 100 may send the wave tag(s) 170 to the requesting device 155, for example, in the form of a media file.

In some embodiments, the wave tag manager 100 may allow some of the requesting devices 155 and/or some of the broadcasting devices 158 to receive an application program (e.g., by downloading the application program from a website associated with the wave tag manager 100) to generate the wave blocks and/or the web tags that are being used by an organization or a person associated with the wave tag requesting device 155. In these embodiments, instead of sending the wave tag(s) 170, the wave tag manager 100 may provide the application program, the rules, and/or the data required to generate the wave blocks and/or the wave tags to the requesting device 135 and/or the broadcasting device 158.

The wave tag requesting device 135 may send the associated wave tag(s) 170 to a broadcasting device 158. The broadcasting device 158 may be a broadcasting entity such as a radio station, a TV station, a website, a satellite, etc., that may broadcast the wave tag(s) 170. The broadcasted wave tag(s) 170 may be detected by wave tag capturing (or reader) devices 140. The wave tag capturing devices 140 may be, for example, and without limitations, electronic devices such as mobile phones, tablet devices, computing devices (e.g., desktop computers, laptop computers), etc., that may include software and/or hardware to receive the wave patterns of the wave block(s) of the wave tags.

As described below, the wave tag(s) 170 associated with an organization may be public or private wave tags. The public wave tags may include signaling wave blocks that may be used by any wave tag capturing device 140 to map a detected wave tag to a corresponding item. The private wave tags may include signaling wave blocks that may be used by only a set of authorized wave tag capturing devices 140 that may map a detected private wave tag into a corresponding item.

With further reference to FIG. 1, the wave tag capturing device 140 may capture the wave blocks of the wave tags. For example, the wave tag capturing device 140 may include an audio recorder (such as one or more microphones) to record broadcasted audio wave blocks or to record wave blocks played from a web site or a device. The wave tag capturing device 140 may include a video recorder (such as a camera or a light sensor) to record broadcasted videos or to record videos played from a website or a device. For example, and without limitations, the video recorder may record the on-off light patterns of flashlight (e.g., a mobile device's flashlight) or the on-off light patterns of a set of emitting diodes (LEDs) from a distance.

In some embodiments, the wave tag capturing device 140 may record snippets of waves that are broadcasted or played. The wave tag capturing device 140 may send the captured wave snippets 111 as a sliding window to the wave tag manager 100 in order to detect any wave blocks and/or wave tags in the wave snippets and to map the detected wave tags to their corresponding data items.

The wave tag manager 100 may include a wave tag mapper 145. The wave tag mapper 145 may receive the captured wave snippets 111 from different wave tag capturing devices 140 and may activate the feature extractor 130 to extract features the wave snippets 110 (e.g., to generate fingerprints of the wave snippets). The wave tag mapper 145 may compare the fingerprints extracted from the wave snippets 111 with the fingerprints stored in the wave tag index database 160 to find the matching wave blocks.

The wave tag mapper 145 may identify one or more wave blocks and may determine that a sequence of one or more detected wave blocks match a wave tag identified by a descriptor stored in the wave tag index database 160. The wave tag mapper 145 may retrieve the data item 182 corresponding to the matched wave tag from the wave tag index database 160 and may send the data identified by the captured wave tag to the wave tag capturing device 140.

As described below, the wave tag recording device 140, in some embodiments, may be able to download an application program that may capture the wave snippets 111. The application program may provide a user interface (UI) 147 to display the data items 181-183 that correspond to different captured wave tags. When the UI 147 receives a selection of a data item, such as the data item 182, an action may be triggered (as shown by 148). The corresponding action details 195 may be provided by the UI 147. For example, and without limitations, the action may include displaying information or promotion for a product, redirecting the UI to a website, calling a phone number, etc., depending on the specific nature of the data identified by the corresponding wave tag.

In some embodiments, the application program used by the wave tag capturing device 140 may allow extracting wave pattern features, etc., in order to save the bandwidth between the wave tag capturing device 140 and the wave tag manager 100. In some embodiments, a subset of data items represented by wave tags may be provided to the wave tag reading devices 140 in order to minimize (or eliminate) the need for the wave tag capturing device 140 to communicate with the wave tag manager 100 to identify the wave tags and/or to identify the data items represented by the wave tags.

A. Wave Block Generation

Wave blocks are pool of media files with unique features (or fingerprints). Depending on the type of a wave tag, the wave blocks that make the wave tag may include audio signals, light signals, or other types of mechanical or EM wave signals. Several exemplary methods of generating wave blocks are explained with reference to FIGS. 2A-2D.

Figure 2A:
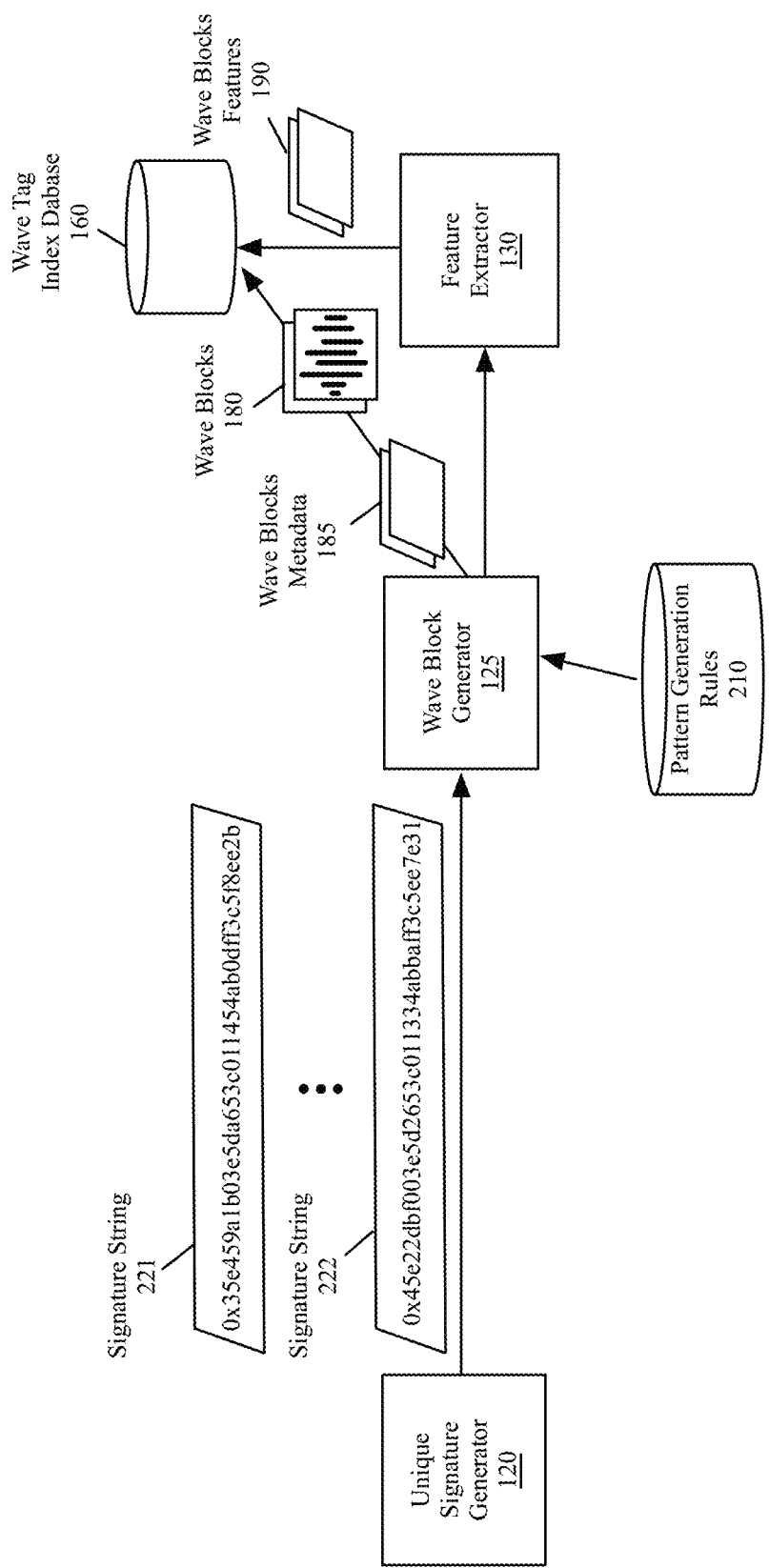
FIG. 2A is a functional diagram illustrating an example method of generating wave blocks by using unique signature strings, according to various aspects of the present disclosure.

FIG. 2A is a functional diagram illustrating an example method of generating wave blocks by using unique signature strings, according to various aspects of the present disclosure. With reference to FIG. 2A, the synthesized wave files corresponding to the wave blocks may be generated based on the unique signature strings 221-222. In the example of FIG. 2A, the unique signature strings 221-222 may be generated by a unique signature generator 210, which may include hardware and/or software. For example, and without limitations, the unique signature generator 210 may use different hash functions to generate random unique strings 221-222.

The wave block generator 125 may use each unique signature 221-222 to generate a corresponding wave file 180. The wave block generator 125 may store the wave blocks 180 and wave blocks metadata 185 in the wave tag index database (or table) 160. The metadata 185 for a wave block 180 may include, for example, and without limitations, the identification of the unique signature generation algorithm (e.g., the type of hash function used to generate the unique signatures), the signature string used to generate the wave block, the type of waves patterns (e.g., piano notes, light patterns, etc.) used to generate the wave block, the identification of the rules 210 used to generate the wave blocks, an entity to which the wave block may be assigned (if the entity is known at the time the wave block is generated), etc.

For example, for acoustic wave blocks, the wave file may be a synthesized audio file. As a non-limiting example, when the signature strings are character strings representing hexadecimal numbers, the wave block generator 125 may associate a musical instrument s note (e.g., a piano note) with each character in a signature string in order to generate an audio wave file. Some embodiments may generate more than one unique wave file for each unique signature string. For example, the wave block generator 125 may generate multiple unique wave files from the same signature string, where the same character in the signature string may be associated with different notes from the same instrument (e.g., by a different mapping of the notes to character) in different wave files. Alternatively, the same character in the signature string may be associated with notes from different instruments in order to generate different wave files. The main requisite for the wave blocks 180 is that the associated have to be distinguishable from each other. In general, the wave block generator 125 may use different pattern generation rules 210 to generate the wave blocks 180.

When the wave files 180 include light waves, the same logic may be applied to generate unique pattern of light, for example, and without limitations, as a video file, or stream, or LED on-off pattern, etc. For other types of wave files, such as, for example, and without limitations, ultrasound, infrared, ultraviolet, microwaves, radio waves, etc., the wave blocks may be generated to include unique and identifiable features, such as identifiable frequencies, different waves patterns, etc. It should be noted that the unique signatures 221-222 may have no correlation with a data item that may be identified by a wave tag generated from the wave blocks 180. Instead, such a data item may be identified by a mapping operation from the wave tag to the data item, as described above with reference to FIG. 1.

As shown in FIG. 2A, the feature extractor 130 may extract distinguishable features from each wave file 180 and may store the distinguishable features 190 in order to be used for detecting the wave blocks when the wave blocks are broadcasted as a part of wave tags, as described above with reference to FIG. 1. For example, and without limitations, when the wave blocks 180 are audio files, the features may be extracted using different fingerprinting methods and/or artificial intelligence methods. The data regarding the wave blocks features 190 and the waves blocks metadata 185 may each be stored in the same or in separate tables.

A fingerprinting algorithm is a procedure that maps an arbitrarily large data item (such as a computer file) into a much shorter bit string, a fingerprint, that uniquely identifies the original data for all practical purposes just as human fingerprints uniquely identify people for practical purposes. This is also referred to as file fingerprinting, data fingerprinting, or structured data fingerprinting.

For example, when the wave file is an acoustic file, the acoustic fingerprint of the wave file may be a condensed digital summary (or a fingerprint) that is deterministically generated from the audio signals, which may be used to identify a played audio sample or may be used to quickly locate a matching audio file in an audio file database.

Figure 3:
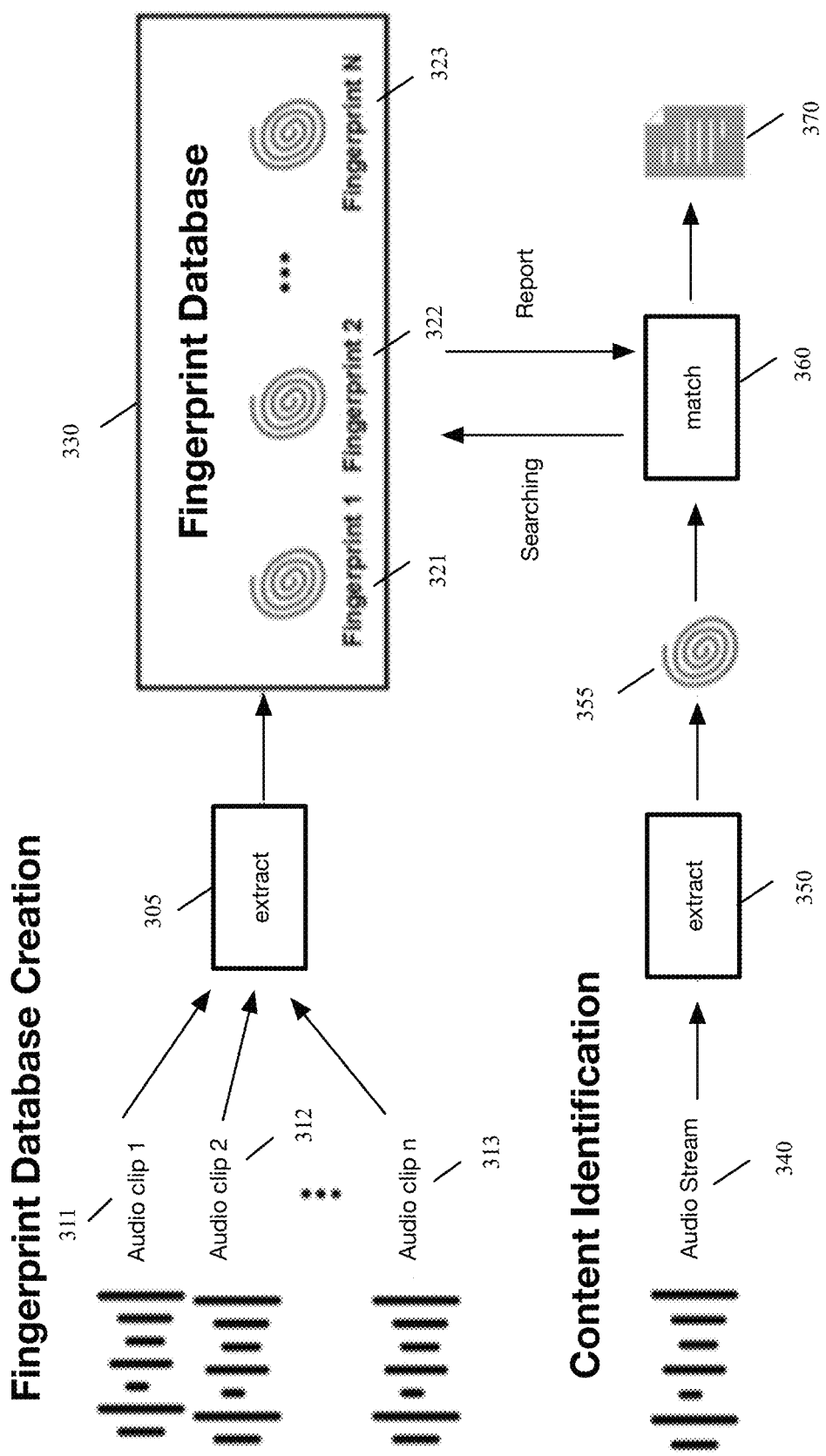
FIG. 3 is a functional diagram illustrating an example fingerprinting method according to prior art.

FIG. 3 is a functional diagram illustrating an example fingerprinting method according to prior art. With reference to FIG. 3, the extract module 305 may extract features from the audio files 311-313. The extracted features 321-323 may be stored in a fingerprint database 330. The fingerprint database may also store either the audio clips files 311-313 or a link to them.

When an audio stream 340 is played, the extract module 350 (e.g., in a device that is receiving the audio stream 340) may extract features 355 from the audio stream 340. The match module 360 compare the extracted features 355 with the features (or signatures) 321-323 that are stored in the fingerprint database 330. When a signature match is found, the corresponding audio file 370 may be identified.

Shazam is one example of an acoustic fingerprinting algorithm that is developed and commercially deployed as a flexible audio search engine. The algorithm is noise and distortion resistant, computationally efficient. The algorithm is capable of quickly identifying a short segment of music captured through a microphone in the presence of foreground voices and other dominant noise, and through voice codec compression, by searching a database of over a million tracks. The algorithm uses a combinatorically hashed time-frequency constellation analysis of the audio, yielding unusual properties such as transparency, in which multiple tracks mixed together may each be identified. Furthermore, for applications such as radio monitoring, search times on the order of a few milliseconds per query are attained, even on a massive music database.

There are many other acoustic fingerprinting methods and algorithm that may be used by the present embodiments for identifying acoustic wave blocks. A similar method may be used to extract features (or generate fingerprints) from, and detect, wave blocks that are light waves or other type of wave files. For example, Content ID is another system developed by Google that creates an ID file for audio and video material and stores it in a database. When a video is uploaded to an associated website, the video is checked against the database, and flagged if a match is found. The present embodiments are independent of using specific fingerprinting or other alternative ways to distinguish audio, video, or other wave signals.

Figure 2B:
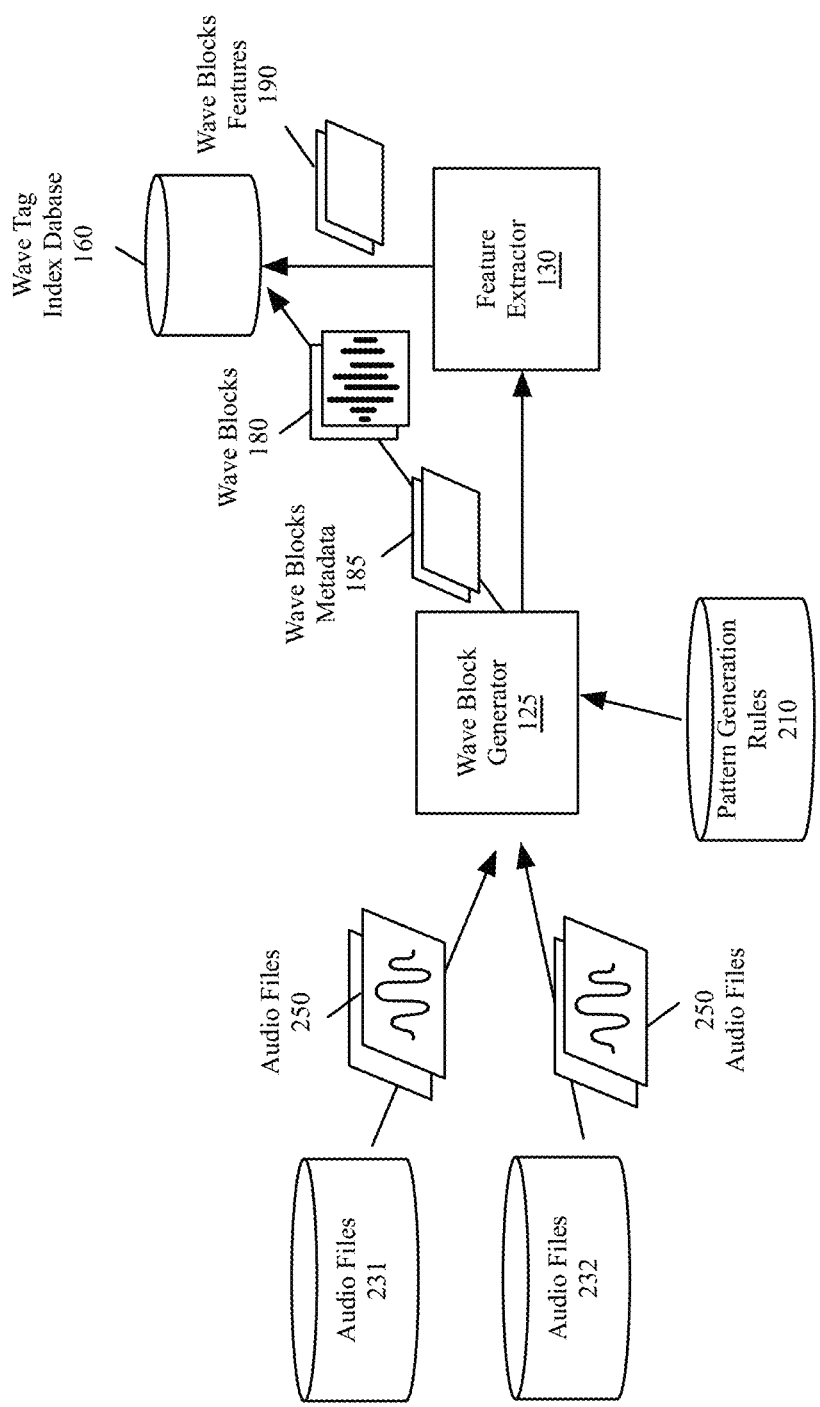
FIG. 2B is a functional diagram illustrating an example method of generating wave blocks from existing wave file, according to various aspects of the present disclosure.

FIG. 2B is a functional diagram illustrating an example method of generating wave blocks from existing wave file, according to various aspects of the present disclosure. With reference to FIG. 2AB, randomly or selectively. all or part of existing wave files 250 (e.g., and without limitations, audio files, video files, images, etc.) may be selected from different sources 231-232 for wave block generation. The wave block generator 125 may use parts or all of the wave files 250 to generate the wave blocks 180 based on a set of pattern generation rules 210. The feature extractor 130 may extract features from the wave blocks and may ensure that the extracted features of a wave block is unique (e.g., by comparing them with the wave block features already stored in the wave tag index database 160 to make sure the features are unique prior to storing the wave blocks and their associated metadata in the wave tag index database 160.

Figure 2C:
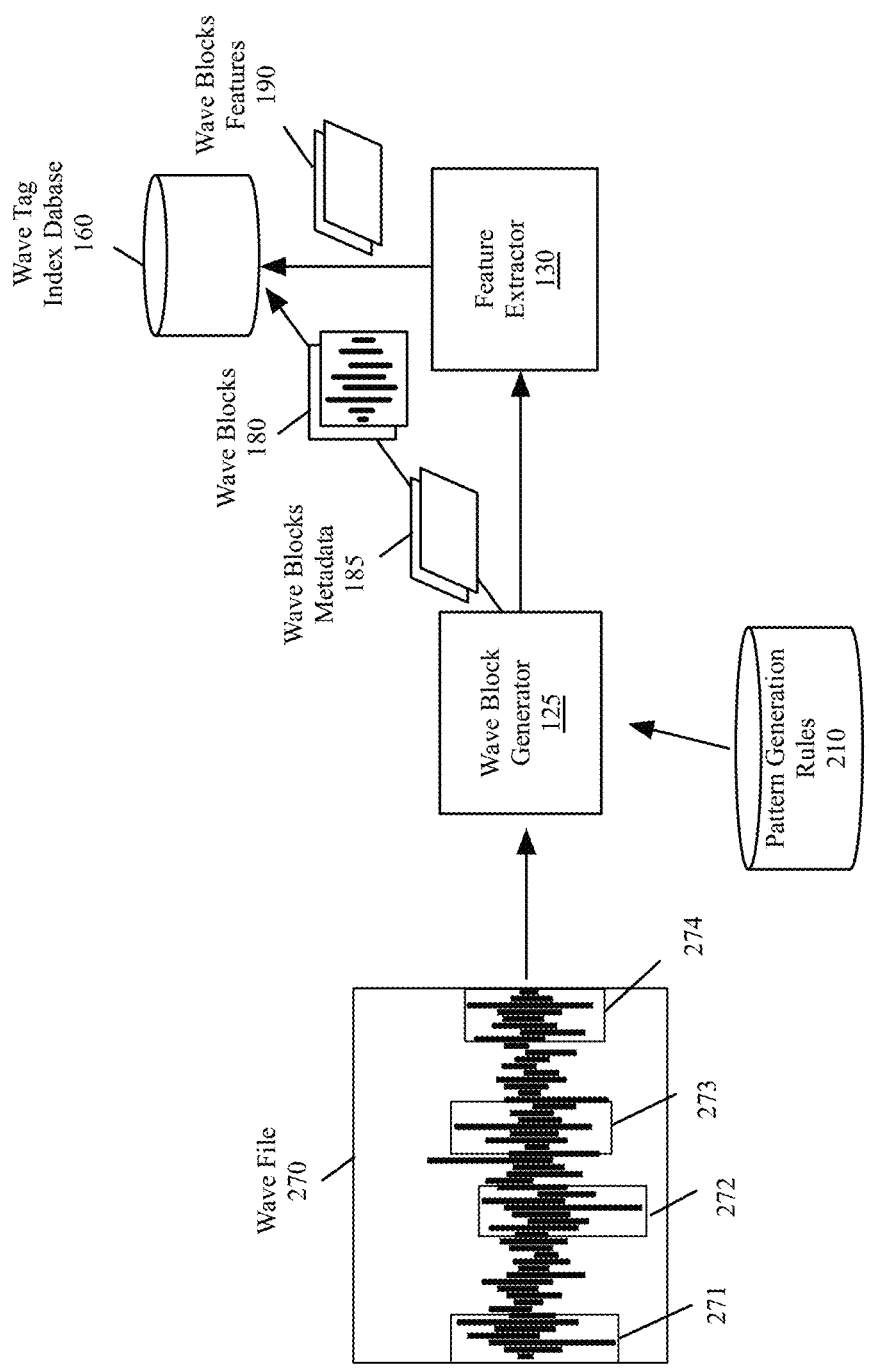
FIG. 2C is a functional diagram illustrating an example method of generating wave blocks from a specific wave file, according to various aspects of the present disclosure.

FIG. 2C is a functional diagram illustrating an example method of generating wave blocks from a specific wave file, according to various aspects of the present disclosure. With reference to FIG. 2C, a specific file 270, for example and without limitations, a file from which a client may wish to generate wave blocks and wave tags, may be used to generate wave blocks. The file 270 may be an acoustic file, an image, a video file, any other type of wave files.

As a non-limiting example, the wave file 270 may be an audio file that may be recorded from a nature, from a person (e.g., a singer singing or a person speaking), a music file, etc. The wave block generator 125 may use all, or portions 271-274 of the wave file 270 to generate one or more wave blocks 180 based on a set of pattern generation rules 210.

The feature extractor 130 may extract features from the wave blocks and may ensure that the extracted features of a wave block is unique (e.g., by comparing them with the wave block features already stored in the wave tag index database 160 to make sure the features are unique prior to storing the wave blocks and their associated metadata in the wave tag index database 160.

Figure 2D:
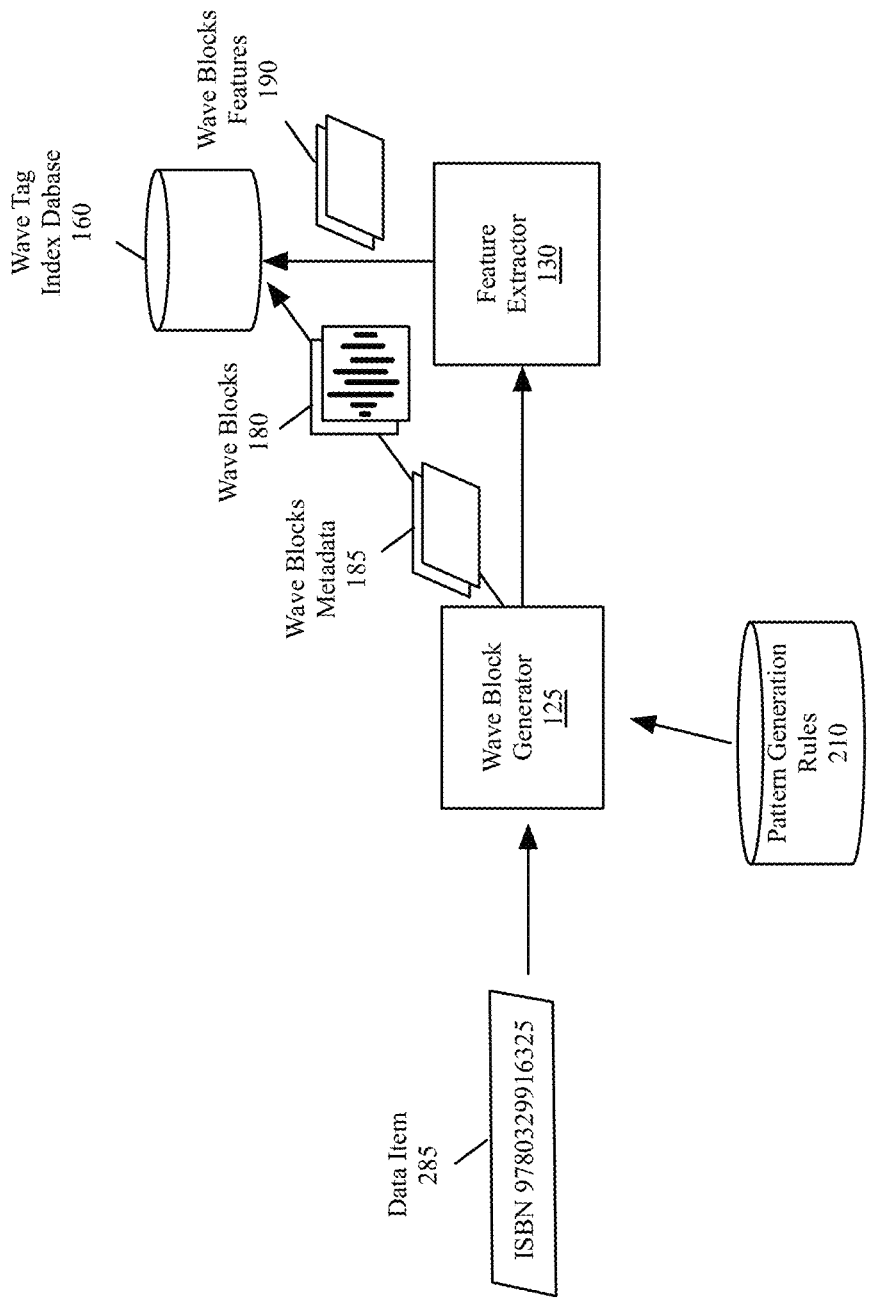
FIG. 2D is a functional diagram illustrating an example method of generating wave blocks from the same data that the wave blocks are going to represent, according to various aspects of the present disclosure.

FIG. 2D is a functional diagram illustrating an example method of generating wave blocks from the same data that the wave blocks are going to represent, according to various aspects of the present disclosure. With reference to FIG. 2D, the data item 285 may be the same data that the generated wave blocks and their associated wave tag(s) are going to represent. For example, the data may be a unique identifier, such as, for example, and without limitations, an ISBN as shown in FIG. 2D, a phone number, a web address, a bar code, a QR code, or any other item for which a client may want to generate wave blocks and wave tags. The data may also be what is referred herein as short data. Short data may be a brand name, a moto or slogan, a sentence, or any data item that a wave tag owner may wish to be used as a signature for generating wave blocks and to be identified by a wave tag created from a combination of one or more of the resulting wave blocks.

One advantage of the short data or unique identifier wave tags is that the wave tags may be reserved or generated to represent specific public data, such as brand names, ISBNs, domain names, company names, etc. Therefore, when wave tags are requested to be used as public wave tag to represent a unique identifier or short data, the same wave tags may be repeatedly used without assigning a new unassigned wave tags for each request received for the same data. For example, some embodiments may use only one public wave tag for the same phone number anytime it is requested. One way is to reserve specific schemas and/or signaling blocks to represent short data or unique identifiers as a standard and represent these public data by using them. Any time for example a specific phone number requested, a wave tag from this standardized wave tags may be provided instead of reserving a new random wave tag from unassigned wave tags. Using this approach, redundant wave tags may be avoided. For example, if the same phone number is requested a thousand times as a public wave tag, only one wave tag may be used instead of a thousand different wave tags representing exactly the same data.

The method used by the wave block generator 125 may be similar to the method described above with reference to FIG. 2A, except that the signature used to generate the wave blocks is not a randomly generated unique signature and is rather the same data or transformation of data (e.g., to ensure uniqueness of wave tags) that is going to be represented by the wave blocks and their associated wave tag(s). In other words, the data item 285 may be a meaningful item rather than a randomly generated string. The wave block generator 125 may generate several wave blocks from the same data item 285, each with unique features that are distinguishable from the other wave blocks. Other components of FIG. 2D, may be similar to the corresponding components of FIGS. 2A-2C.

Although one wave block generator 125 is shown in FIGS. 2A-2D, it should be understood that different wave block generators 125 may be used, depending on the wave blocks' wave type. For example, a wave block generator 125 may be used to generate sound wave blocks, a wave block generator 125 may be used to generate light wave blocks, a wave block generator 125 may be used for each different type of mechanical wave blocks or EM wave blocks.

It should be understood that the methods of generating wave blocks with reference to FIGS. 2A-2D are given as example and other embodiments may use other methods using different signatures or different features to generate pools of wave blocks. Furthermore, some embodiments may use multiple pools of wave blocks. These embodiments may, therefore, include the same wave block in different pools but not in same pool. This method may help in both search performance and wave block scalability.

B. Generation of Wave Tags from Wave Blocks

Some embodiments may provide wave tags as a combination of one or more wave blocks to represent different items and/or different actions. The wave tags are a non-printed standardized identification tags representing different items and/or different actions. The wave tags are highly distinguishable and may obey predefined rules when created and may be recognized by precise accuracy during the capturing operation.

Each wave tags, in some embodiments, may include one or more wave blocks. Each wave block may represent all or a portion of the information or data of the wave tag. The wave blocks, in some embodiments, may include signaling wave blocks and/or body wave blocks. The signaling wave blocks may include one or more signaling patterns that may trigger the capturing device to perform an operation and/or may convey some information to help interpret the wave tag, and/or to extract the mapping data. The signaling wave blocks may include, for example, and without limitations, one or more starting wave blocks to indicate the start of a wave tag, one or more ending waves block to indicate the end of a wave tag, and/or one or more signaling blocks to provide performance enhancements and scalability (e.g., to reduce searching delays by providing searching hierarchy, load balancing information, etc.).

In some embodiments, the first wave block in a wave tag may be one or more starting signaling wave block that includes wave patterns to indicate the start of the wave tag. The wave tag structure, including the signaling wave blocks, may provide additional information that may help interpreting the wave blocks, may help interpreting the associated wave tag, and/or may convey some meaning or action without the need to be decoded, reversed, or converted back to data. The wave tag may include one or more ending signaling wave blocks that may include wave patterns to indicate the end of the wave tag. The starting and ending signaling wave blocks may include unique wave characteristics and/or may include unique wave patterns.

FIGS. 4A-4D illustrate several examples of the metadata 180 (FIGS. 2A-2D) and features data 190 stored for the signaling and body wave blocks, according to various aspects of the present disclosure. With reference to FIG. 4A, data stored for the starting signaling wave blocks may include the identification of the wave block 401, the wave block fingerprint 402, and/or the type data 403 identified by the corresponding wave tag.

The wave block fingerprint 402 may include the unique features that are extracted from wave blocks in order to distinguish them from other wave blocks. The extracted features may be included in column 402 or alternatively, column 402 may include a link or a pointer to a file that stores the extracted features.

The data type 403 identified by the corresponding wave tag may be used for search optimization and performance enhancement. For example, a starting signaling wave block with a fingerprint S2 419 may indicate that the wave tag that includes this starting wave block is used to identify an item that is a URL. Therefore, when a starting wave block with the fingerprint S2 is detected by a capturing device, the search to identify the corresponding body wave blocks features may be limited to a certain table, a certain tables, and/or a certain field that store the information about the wave tags that are mapped to URL.

With reference to the table 400, the data type identified by the wave tags that correspond to different starting signaling wave blocks may be different products 421, may be specific types items 422-426, may be specific items that belong to different entities (427-428), may be short data 429, or any item 430 not included in categories 421-429.

It should be noted that the items shown in the table 400 are examples and different embodiments may have starting signaling wave blocks that may be used in wave tags that identify different data types. Some embodiments may have more or fewer types of starting signaling blocks than shown in the table 400.

With reference to FIG. 4B, data stored for the body wave blocks in table 440 may include the identification of the wave block 441 and the wave blocks fingerprint 442. The wave blocks fingerprint 442 may include the unique features that are extracted from the wave blocks in order to distinguish them from other wave blocks. The extracted features may be included in the column 442 or alternatively, the column 442 may include a link or a pointer to a file that stores the extracted features. It should be noted that the body wave blocks shown in the table 440 do not carry the data that is identified by the corresponding wave tag. Rather, the extracted features from the wave patterns in the wave blocks of a wave tag that is using one or more wave blocks from the table 440 may be used to search a database to find a matching wave tag, which is then mapped to a data item (e.g., the identification of a URL, a phone number, a bar code, etc.) that is wave tag is used to indirectly represent.

With reference to FIG. 4C, the table 450 may be generated by the wave block generator 125 of FIG. 2D, where the data represented by the wave tag is used as the signature to generate the body wave blocks. In the example of FIG. 4C, each of the wave blocks 454-456 are generated, respectively, from the data items 457-459 that the wave blocks are generated to identify. The body wave blocks shown in the table 450 are examples of what is referred herein as short data.

With reference to FIG. 4D, data stored for the ending signaling wave blocks may include the identification of the wave block 471, the wave block fingerprint 472, and/or the type data 473 identified by the corresponding wave tag. The wave block fingerprint 472 may include the unique features that are extracted from wave blocks in order to distinguish them from other wave blocks. The extracted features may be included in column 472 or alternatively, column 472 may include a link or a pointer to a file that stores the extracted features.

The data type 473 identified by the corresponding wave tag may be used for search optimization and performance enhancement. For example, to match an ending signaling wave block with a corresponding starting signaling wave block. With reference to the table 470, the data types 481-490 identified by the wave tags that correspond to different ending signaling wave blocks may correspond to the data types of the corresponding starting signaling wave blocks. It should be noted that the items shown in the table 470 are examples and different embodiments may have starting signaling wave blocks that may be used in wave tags that identify different data type. Some embodiments may have more or fewer types of ending signaling blocks.

Figure 5:
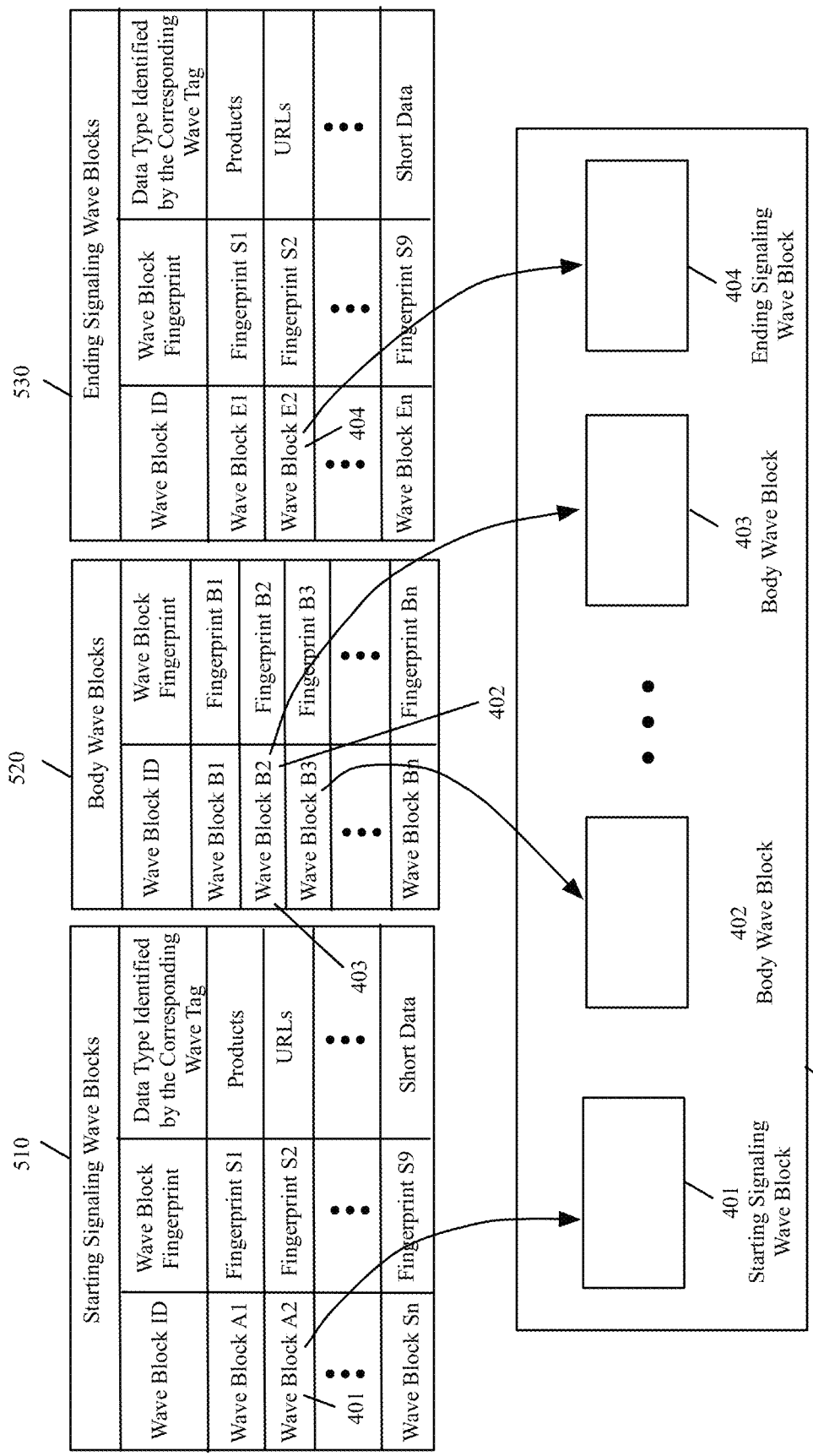
FIG. 5 is a functional diagram illustrating an example of generating a wave tag from a specific combination of one or more wave blocks, according to various aspects of the present disclosure.

FIG. 5 is a functional diagram illustrating an example of generating a wave tag from a specific combination of one or more wave blocks, according to various aspects of the present disclosure. A wave tag may be a specific combination of one or wave blocks. In the example of FIG. 5, the wave tag 500 may include the starting signaling wave block 421, the body wave blocks 402 and 403, and the ending signaling wave block 404. The wave blocks listed in tables 510, 520, and 530 may include similar data as described above with reference to FIGS. 3A-3D and may be generated by the wave block generator 1250, described above with reference to FIGS. 2A-2D.

Figure 6:
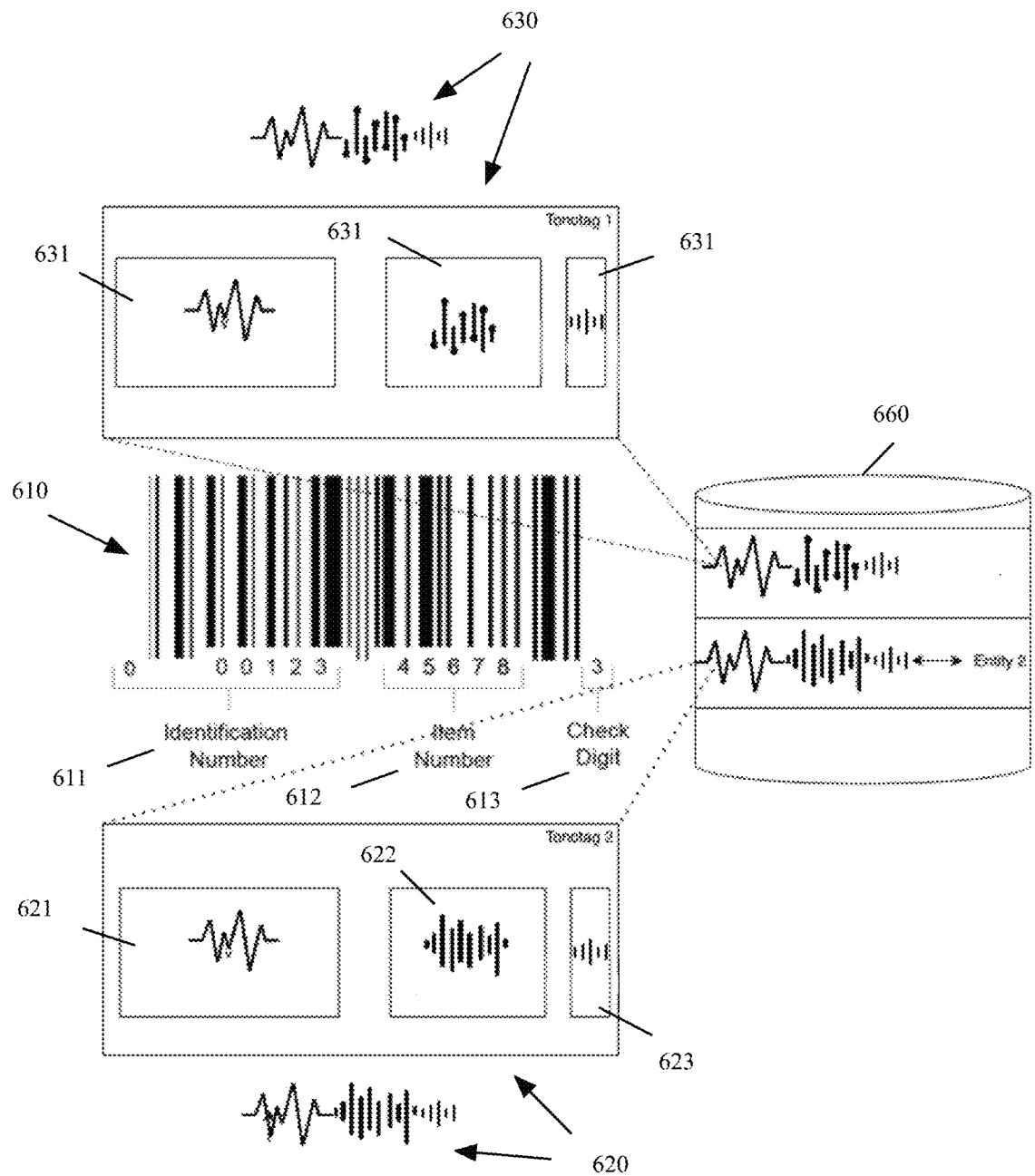
FIG. 6 illustrates is functional diagram illustrating an example of how wave blocks may be used to generate a wave tag, according to various aspects of the present disclosure.

FIG. 6 illustrates is functional diagram illustrating an example of how wave blocks may be used to generate a wave tag, according to various aspects of the present disclosure. The example of FIG. 6 shows how an entity such as a bar code may be classified and represented by a non-printed wave tag. A barcode 610 may be used for representing different entities according to a standard. A barcode may include multiple sections 611-613 to describe a specific product. For example, the identification number 611 may represent an organization identification, the item number 612 may represent a product in that organization, and the check digit 613 may be used to make sure a barcode reader may correctly read the barcode and the barcode is a valid barcode.

The present embodiments may use unique signaling and body wave blocks from signaling and body wave block tables. Different wave blocks or different combination of wave blocks may be used to represent a different number for each section in barcode. For example, in FIG. 6, the wave block 621 may identify the organization, the wave block 622 may identify the entity in that organization, and the wave block 623 may be used to increase the accuracy of detecting the wave tag 620 as a valid wave tag and find the right match in the fingerprint database with more accuracy. Since the wave tag 620 does not carry the data and is mapped to an entity in a database such as the database 660, any other wave tag, such as the wave tag 630, which is not assigned to an entity may be used instead of the wave tag 621 to represent the barcode 610.

When the fingerprint of a wave tag 620 is taken as the fingerprint of the three wave blocks 621-623, the unique fingerprint of the wave tag 620 is generated. The wave tag 620 may, therefore, be non-printed synthetic identifier that may represent an entity in organization similar to a what a barcode does.

1. Example of Different Types of Wave Tags

One example of the type of wave tags of the present embodiments is a sound tag. When the wave blocks and the wave tags are made of sound wave patterns, it is preferable that the predetermined signaling tones of the wave blocks have a pattern that may be distinguishable from other sounds, voices, or noises in the environment. The wave blocks may include customized wave patterns to be used in different context and different environments (e.g., as described below with reference to FIG. 11).

The sound wave blocks may have different tones which represent all or part of information or data for interpreting the corresponding sound tag. The combination of different sound wave blocks with different tones or occurrence represent fundamental building blocks of the sound tags. The characteristics of the sound wave blocks, including but not limited to fastness of the sound wave blocks, may change the interpretation of the corresponding sound tag.

When the same sound wave tags occur multiple times, they may represent a different sound tag. The interpretation of the sound tags may, therefore, change by changing the tone, the occurrence and/or the fastness of the corresponding sound wave blocks. The sound tags may include one or more signaling sound wave blocks. The signaling sound wave blocks may include, for example, and without limitations, starting signaling wave blocks and ending signaling wave blocks. The rest of the sound wave blocks in a sound tag may represent the data or body section of the sound tag. There may be one or more series of timing tones including specific sound patterns which repeat many times for a sound tag. The timing tones may be used to ensure that an actual sound tag is encountered.

Another example of the wave tags of the present embodiments is a light tag. In a light tag, it is preferable that the predetermined signaling waves have a pattern that are distinguishable from other lights in the environment. The light tags may include light wave blocks that may have different frequencies, patterns, or characteristics which represent all or part of information or data for interpreting the corresponding light tag.

Among the characteristics that may generate unique light wave blocks representing different interpretation are wavelength, color, spectra or frequency of occurrence, or order of appearance of different type of light patterns. The combination of different light wave blocks with different tone or occurrence represent fundamental building blocks of light tags. A light tag may include one or more signaling light wave blocks including but not limited to start signaling light wave blocks and end signaling light wave blocks. The rest of the light wave blocks in a light tag may represent data or body section of the light tag. The light tags are preferably made of light patterns in the visible light spectrum in order that they may be captured and analyzed by devices such as camera or light sensors.

There may be a series of timing tones including specific light patterns or light types which may repeat many times for a light tag. Timing tones may be used to ensure that an actual light tag is encountered. Light tags may be stored as media files. For example, recording a light pattern using camera as one or multiple videos or images showing the light pattern in multiple scene may be used as media files to be processed and capture the light tags. These media files may be used to broadcast or generate the light pattern corresponding the light tag later when needed. For example, light tags may be short videos with unique visual patterns. Another example to represent a light tag is using a light tag descriptor. The descriptor for example may be a simple text file showing on-off pattern for an LED through time. Another way of creating light tag media files with unique light pattern artificially, is to generate different combination of colors for each light tag using video or consequence image. For example, different frame rates may create different light tags.

Other types of mechanical or EM wave tags may be similar to the sound tags or light tags but they are usually unique by having different wave characteristic such as different frequencies. These wave tags may not necessarily work in wavelengths detectable by humans. These wave tags may be created from wave blocks, which may have different tones or characteristics. Among the characteristics that may generate unique wave tags representing different interpretation, are wavelength or frequency of occurrence or combination and order of appearance of different type of wave patterns. There may be a series of timing wave tones including specific wave pattern or wavelengths which may repeat many times for a wave tag. Timing tones may be used to ensure that an actual wave tag is encountered.

2. Wave Tag Schemas

Some embodiments may use several different schemas for assigning wave blocks to a wave tags. A particular schema may be selected based on different criteria, such as, for example, and without limitations, how many wave tags may be needed for a specific entity (e.g., wave tags requested by a corporation, by an educational institution, by a governmental institution, by private organizations, by individual persons, etc.), how many wave blocks may be needed to identify certain types of data, how many signaling blocks may be needed to facilitate detection, performance optimization, search optimization, etc.

Figure 7:
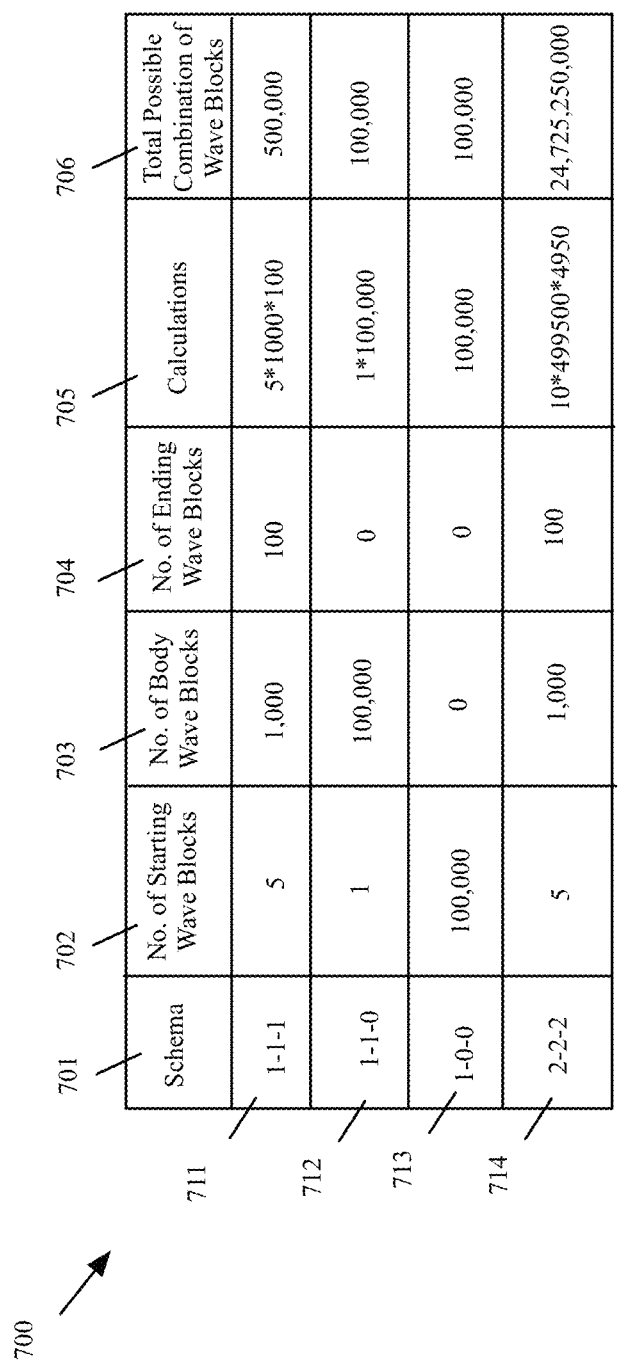
FIG. 7 is a functional diagram illustrating examples of several different schemas that may be used to assign wave blocks to wave tags, according to various aspects of the present disclosure.

FIG. 7 is a functional diagram illustrating examples of several different schemas that may be used to assign wave blocks to wave tags, according to various aspects of the present disclosure. with reference to FIG. 7, the table 700 shows different schemas 701 that may be used for assigning wave blocks 702-704 to wave tags. Each row of the table 700 also specifies the number of available wave blocks for each type of wave block 702-704. The table 700 also specifies the total possible combination 705 of wave blocks for each schema.

For example, the schema 711 is 1-1-1, indicating that wave tags that are generated based on this schema should assign one wave block as the starting signaling wave block, one wave block as the body wave block, and one wave block as the ending signaling wave block. The schema 712 is 1-1-0, indicating that wave tags that are generated based on this schema should assign one wave block as the starting signaling wave block, and one wave block as the body wave block. This schema does not require and ending signaling wave block.

The schema 713 is 1-0-0, indicating that wave tags that are generated based on this schema should assign one wave block as the starting signaling wave block. This schema does not require body wave blocks or ending signaling wave blocks. The schema 714 is 2-2-2, indicating that wave tags that are generated based on this schema should assign two wave block as the starting signaling wave block, two wave block as the body wave block, and two wave block as the ending signaling wave block. The total combination of the wave blocks may be calculated by using the combination formula in Eq. (1):

$$C(n, r) = \binom{n}{r} = \frac{n!}{(r!\,(n-r)!)} \qquad \text{Eq. (1)}$$

where n is the number of objects, r is the number of samples, and ! is the factorial operator. The value of combinations for each cell of the table may be found by inserting the number of the objects specified by the schema and the number of available samples in equation EQ. (1). The total number of combinations may be found by multiplying the non-zero values (as shown in column 705) to reach to the value indicated in column 706.

As shown, if the number of objects in the schema changes, the total number of possible combination may also change. For example, the schemas 711 and 714 have the same number of available samples for each type of wave block but the schema 714 requires two wave blocks for each type of wave block while the schema 711 require only one. As a result, the total number of possible combinations for the schema 714 is much larger than the total number of possible combinations for the schema 711.

The total number of possible combinations in schema may also change based on the available samples for each type of wave blocks. For example, if the number of available samples for the starting signaling wave blocks 702 for the schema 711 is increased from 5 to 50, the total number of possible combination changes from 500,000 to 5,000,000.

The wave tags are, therefore, combinations of unique wave blocks, which may be signaling and/or body wave blocks. Each wave tag may be created by interleaving signaling and body wave blocks in different ways according to a particular schema.

Figures 8A, 8B:
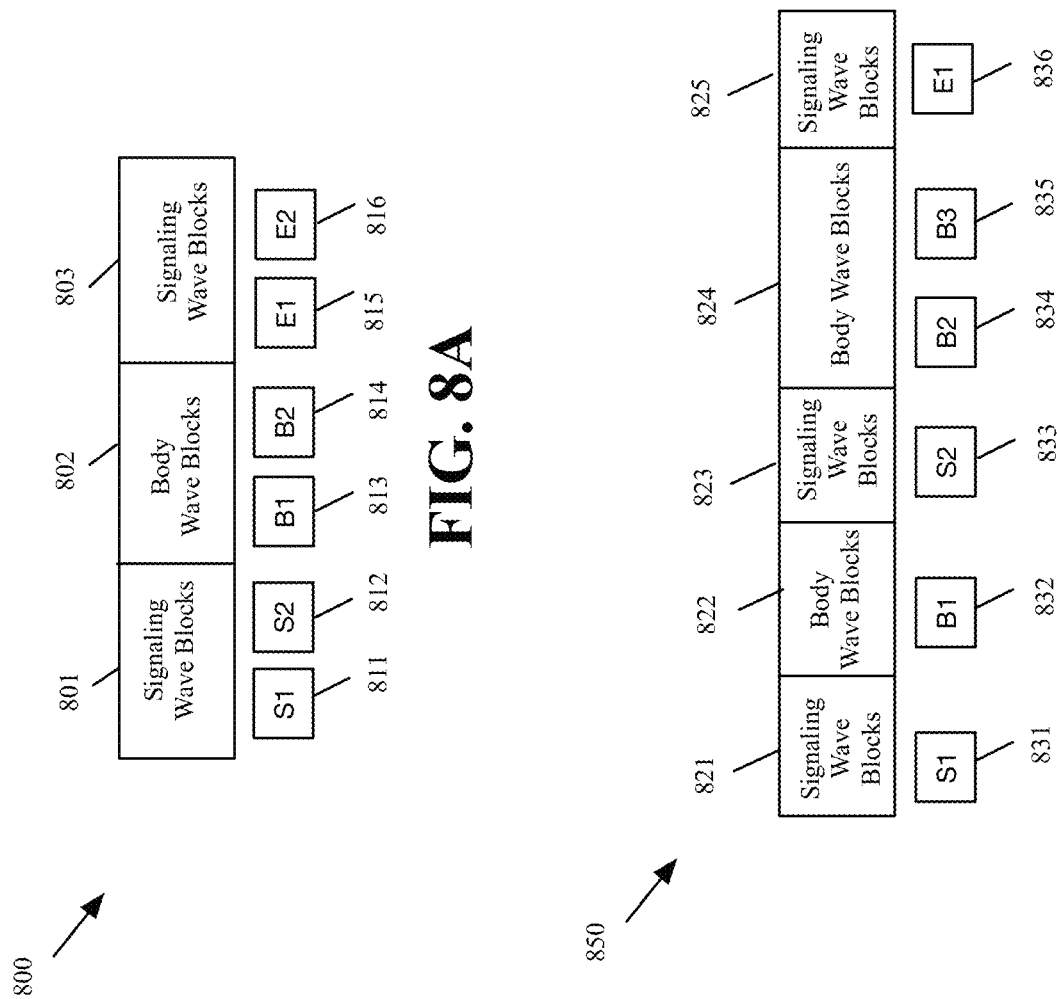
FIGS. 8A and 8B illustrate example of wave tags generated based on two different schemas, according to various aspects of the present disclosure.

FIGS. 8A and 8B illustrate example of wave tags generated based on two different schemas, according to various aspects of the present disclosure. With reference to FIG. 8A, the wave tag 800 may be generated based on the schema 714 of FIG. 7, namely a 2-2-2 schema. As shown in FIG. 8A, the signaling wave blocks 801 include two starting wave blocks 811-812. The body wave blocks 802 include two wave blocks 813-814 and the signaling wave blocks 803 include two ending wave blocks 815-816

With reference to FIG. 8B, the wave tag 850 may be generated based on a 1-1-1-2-1 schema. The wave tags generated based on this schema should have one starting signaling wave block 831, followed by one body wave block 832, followed by one signaling wave block 833, followed by two body wave blocks 834-835, followed by one ending signaling wave block 836. The signaling wave block 833 may be instead at the middle of the wave tag 850 may be used to provide performance enhancements and scalability (e.g., to reduce searching delays by providing searching hierarchy, load balancing information, etc.).

2. Assignment of Wave Blocks to Wave Tags

FIG. 9 illustrates a sample wave block assignment table for constructing classifying standardized wave tags, according to various aspects of the present disclosure. Table 900 shows the assignment of starting signaling wave blocks 901, body wave blocks 902-904, and ending signaling wave blocks 905 to different entities.

With reference to FIG. 9, the starting signaling wave block S1 911 along with the specific ending signaling wave block E1 912 are reserved to represent short data entities 913. Therefore, anytime the two signaling wave blocks 911 and 912 are present in a wave tag, the wave tag is a short data wave tag. The wave block Sb 921 may be reserved for organization A 922. Therefore, anytime the starting signaling wave block 921 is present in a wave tag, the wave tag is known to belong to organization A 922 and based on the rest of the wave blocks in the wave tag, a search may be made in a particular database or a particular area of a database that stores the mapping information for organization A's wave tags in order to find the item identified by the wave tag.

With further reference to table 900, the combination of the starting signaling wave block Sd 931 and the ending signaling wave block Ed 932 may be reserved for organization B 933. However, as shown in table 900, not all wave tags that include the starting signaling wave block Sd may belong to organization B. Instead, wave tags that include the starting signaling wave block Sd 931 and the ending signaling wave block Ep 941 may belong to organization C 942. The wave tags of organization B 933, therefore, has to include both the Sd and the Ed signaling wave blocks in order to belong to organization B.

FIG. 10A illustrates an example arrangement of wave blocks for a specific organization, according to various aspects of the present disclosure. With reference to FIGS. 10A-10B, the table 1000 may have a similar structure as the table 90 of FIG. 9. With reference to FIG. 10A, the wave tag arrangement table 1000 may be used, for example, by the organization A 922 of FIG. 9 to represent the organization's entities. The structure shown in table 1000 allows organization A to define an internal assignment of the wave tags to different entities.

Since the starting signaling wave block Sb 921 is reserved for the organization A 922, the organization A 922 may, for example, decide to assign body wave block B6 1011 and the ending signaling wave block E6 1012 to wave tags that identify their products 1013. Therefore, whenever the body wave block B6 1011 and the ending signaling wave block E6 1012 are present after the starting signaling wave block Sb 921 in a wave tag, the wave tag is known to identify a product of organization A.

With further reference to table 1000, whenever the body wave block B32 1021 is present after the starting signaling wave block Sb 921 in a wave tag, the wave tag is known to identify a URL of organization A. The internal or intra-classification of the present embodiments allow organizations to integrate the capturing embodiment and decide which parts of the mapping table are required inside the organization's internal hardware or software or which parts to acquire as plugin so the organization may be able to do the mapping in real-time without accessing remote servers.

FIG. 10B illustrates an example arrangement of wave blocks in wave tags based on the table of FIG. 10A to identify different items associated with a specific organization, according to various aspects of the present disclosure. With reference to FIG. 10B, table 1050 shows assignments of wave block to different wave tags 1051 to identify organization A's items 1052. The wave blocks used to generate the wave tags 1051 are assigned based on the organization specified in table 1000 of FIG. 10A.

A technical advantage of using signaling wave blocks is various signaling wave blocks may be used for different schemas. The signaling wave blocks themselves may, therefore, be indicative of the type of wave tags and the schema that is used. For example, the signaling wave blocks used for the 1-1-1 schema may be clearly distinguishable from the signaling wave blocks used for the 1-0-0 schema. Another technical advantage of the present embodiments' wave tag structure and assignment strategy is that if there are two separate isolated organizations and there are no conflict or mutual entity between the two organizations, exactly same wave tags may be used for different internal entities of two organizations.

Figure 11:
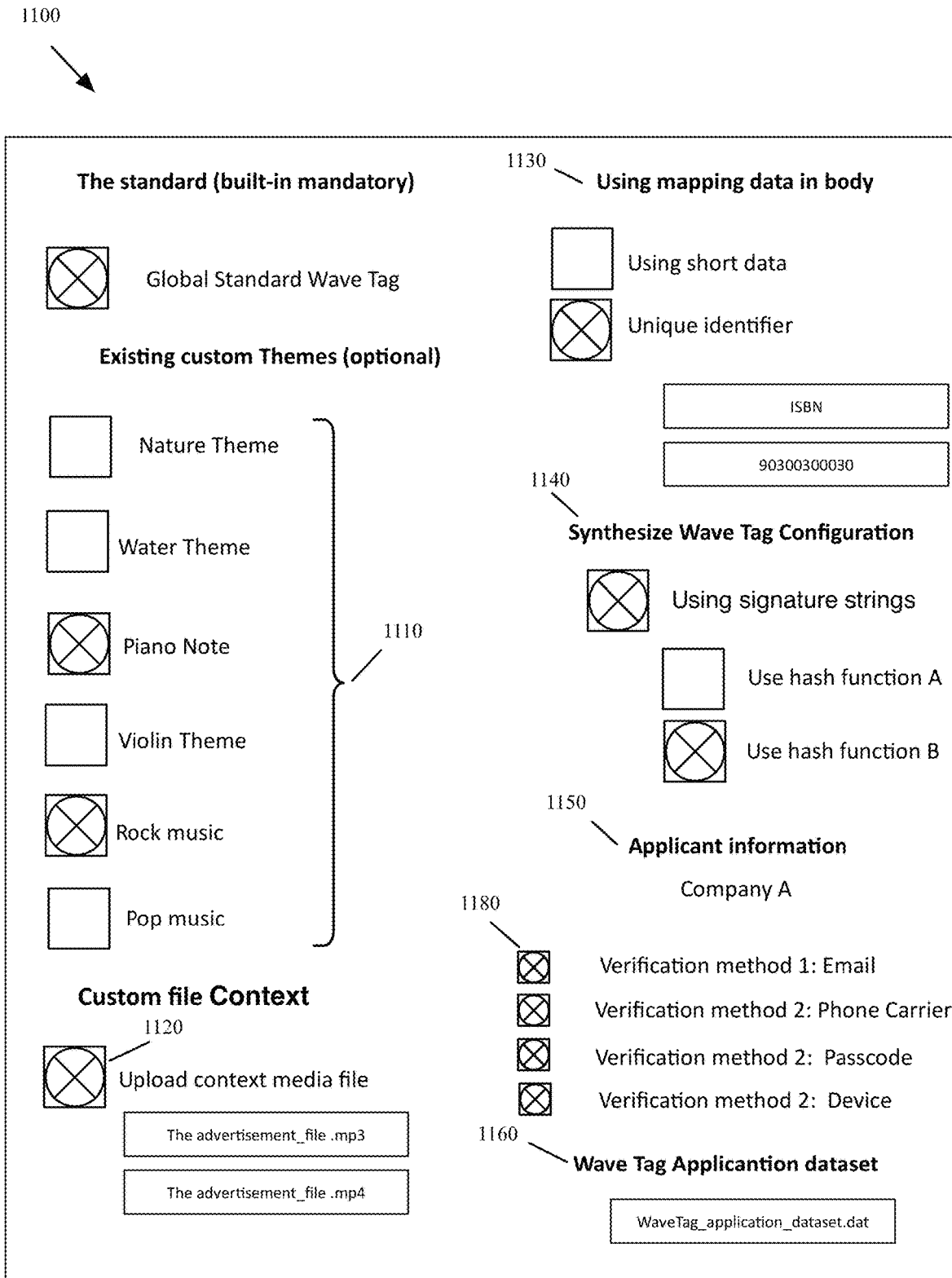
FIG. 11 is a schematic front view of a computing device that may include an application program for customizing wave tags and wave blocks, according to various aspects of the present disclosure.

Some embodiments may provide a user interface for customizing the wave tags and wave blocks for different entities such as organizations or individuals. FIG. 11 is a schematic front view of a computing device that may include an application program for customizing wave tags and wave blocks, according to various aspects of the present disclosure. With reference to FIG. 11, the user interface (UI) 1100 may be used to select default or desired customized wave blocks to create wave tags for an entity to be used in different context.

There may be built in wave blocks that are included whenever any wave block is created. The wave blocks may be used in global or local wave tags or just for quality assurance. There may be existing themes 1110 for the wave blocks. For example, an entity may want one of its wave tags to sound like water or piano or rock music, etc. The entity may use an existing theme for generating wave blocks (e.g., as described above with reference to FIG. 2B). The UI 1100 may allow the upload (as shown by 1120) of media files including, but not limited to, video, audio, or text files. Some embodiments may generate wave blocks from the uploaded files as the building blocks for the wave tags (e.g., as described above with reference to FIG. 2C).

The UI 1100 may provide an option 1130 to use mapping data as signature string for creating wave tags (e.g., as described above with reference to FIG. 2D). The UI 1100 may provide an option 1040 for using random hash string as signature for creating unique media files (e.g., as described above with reference to FIG. 2A).

As shown, the UI 1100 may also provide an option 1150 for the entity that is requesting the wave blocks and wave tags to provide its information along with the dataset 1160 containing information such as the instruction or description of their desire assignment strategy and the mapped data. The UI may also provide options 1180 for different verification methods to be used as parameters in access management and private or public wave tags. The example user interface 1100 of FIG. 11 shows customization of acoustic wave blocks and wave tags. Some embodiment provide similar user interfaces for other types of mechanical or EM wave blocks and wave tags, such as light wave blocks wave tags, etc.

Figure 12:
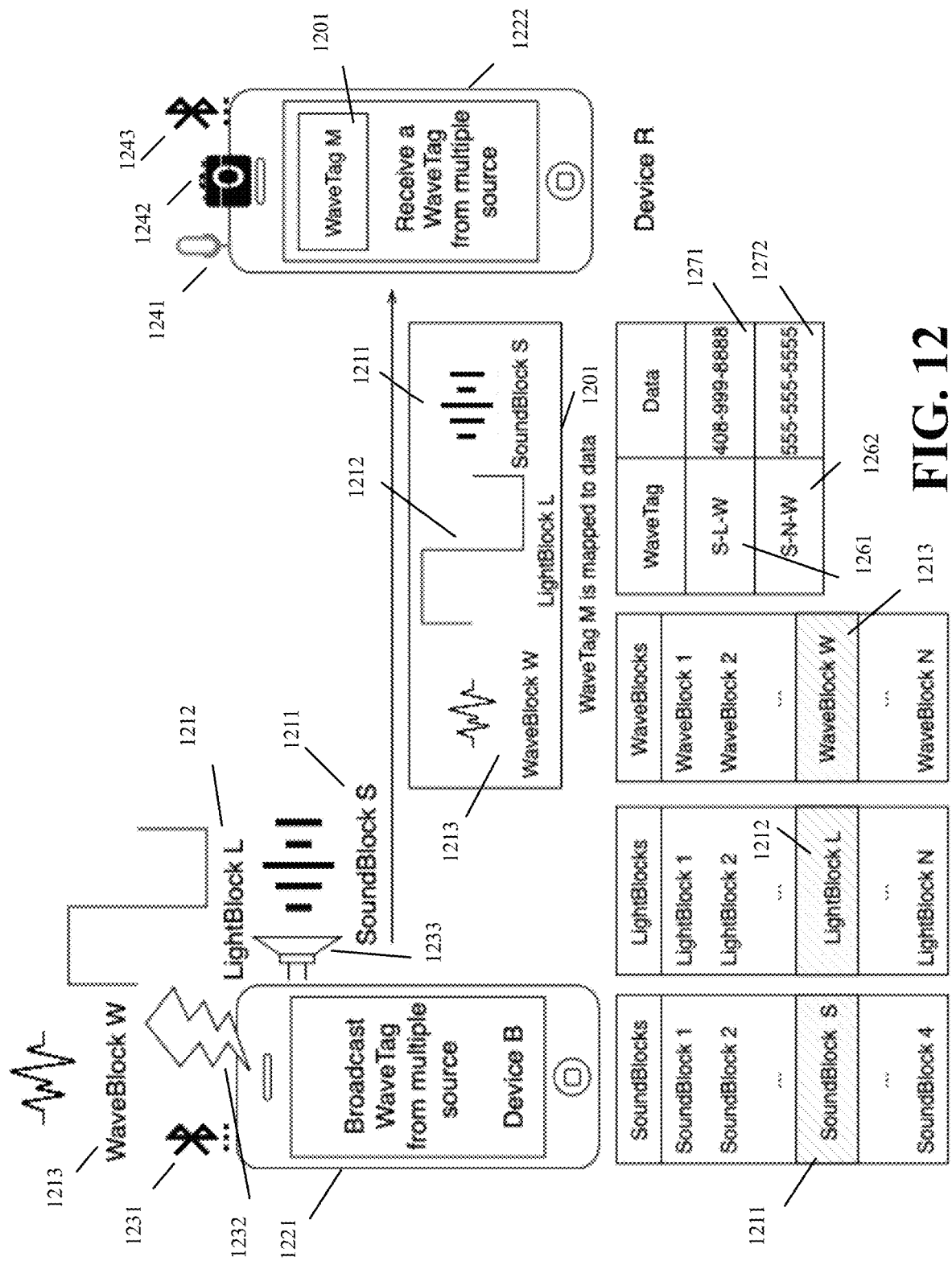
FIG. 12 is a diagram illustrating an example of generating wave tags using a combination of wave blocks of different type, according to various aspects of the present disclosure.

FIG. 12 is a diagram illustrating an example of generating wave tags using a combination of wave blocks of different type, according to various aspects of the present disclosure. With reference to FIG. 12, the wave tag M 1201 my include of a sound wave block as starting signaling wave block (sound block S 1211), a light wave block (light wave block L 1212) as body, and a Bluetooth wave block (Bluetooth wave block W 1213) as the ending signaling wave block.

As shown, the broadcaster device (device B 1221) may use Bluetooth 1231 to broadcast the wave block W 1213, may use the flashlight 1232 to broadcast the light block L 1212, and may use the speaker 1233 to broadcast the sound block S 1211 for the wave tag M 1201. The device R 1222 may receive the sound stream using the microphone 1241, may receive the flashlight pattern using the camera 1242, and may receive the incoming Bluetooth wave signals using the Bluetooth receiver 1243. A sliding window, as described below with reference to FIG. 19, may be used to process the incoming stream to extract the wave blocks.

The wave block W may be reserved as the starting signaling block for the mix nature wave tags and the sound Block S may be reserved as the ending signaling wave block for mix nature wave tags. Once the device R 1222 extracts the wave block W 1213 through the Bluetooth 1243 and extracts the sound block S 1212 through the microphone 1241, device R 1222 may search in for the light blocks 1212 as the wave tag's body blocks.

The wave tag (S-L-W 1261) may be reserved for the phone number 408-999-8888 1272 in this example. Different signaling or body wave blocks may represent different data or actions. For example, extracting the light block N instead of the light block L for the wave tag S-N-W 1262, may map to a different phone number 555-555-5555 (item 1272). As described above, the signaling wave blocks may describe the schema, the structure, and/or the method of interpretation of the wave tags. The mix nature the wave tags media file may result in a set of media files with one or more formats. The wave blocks inside a mix nature wave tag may be extracted independently from one or more wave source or media files. For example, the wave tag may be extracted as shown in FIG. 12 from three different channels independently. Alternatively, the wave tag may be extracted from a video file by processing visual and audio parts for different wave blocks. As another example, the wave tags may be extracted from the radio wave signals and sound signals from a radio receiver.

Figure 13:
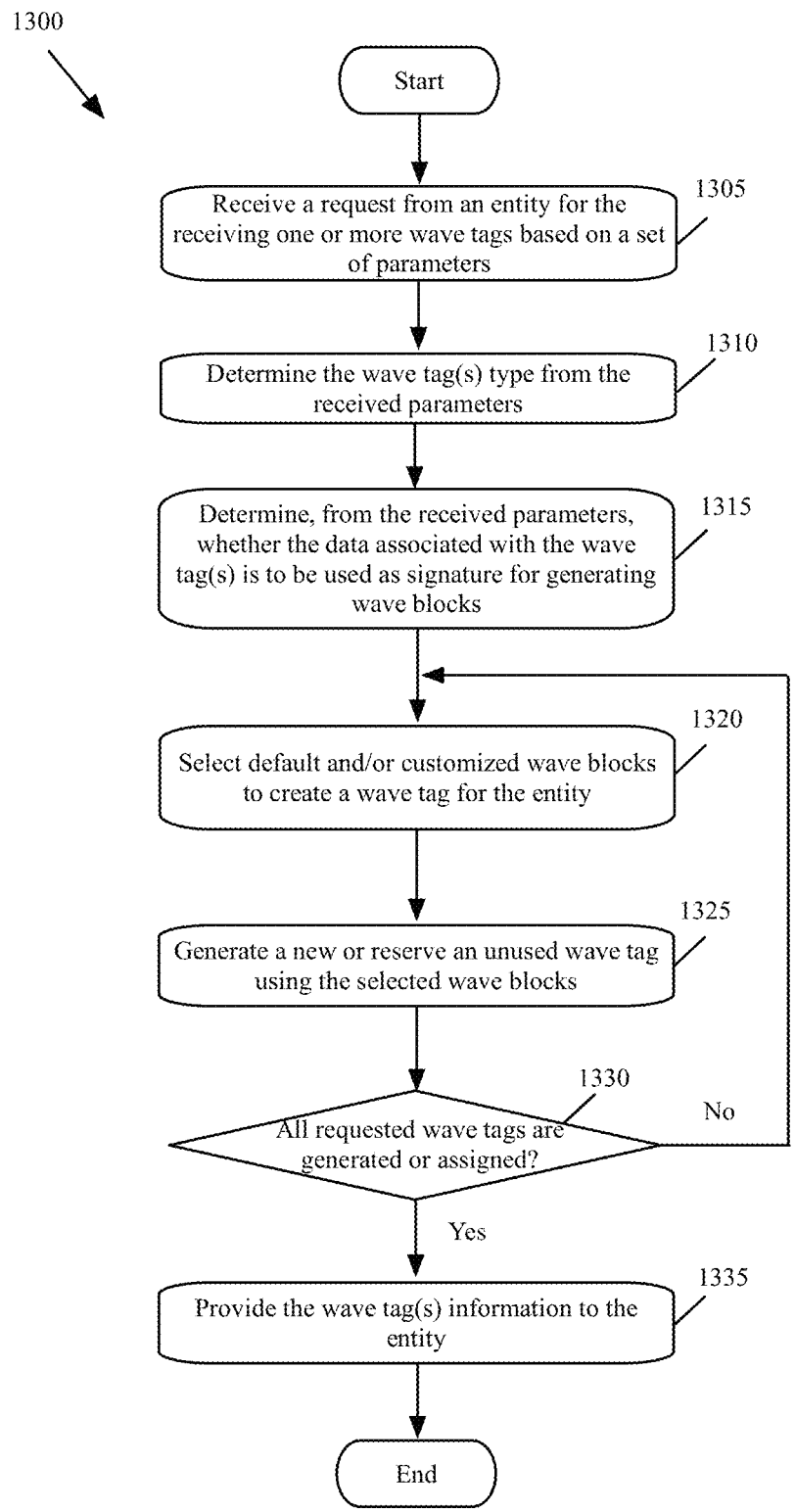
FIG. 13 is a flowchart illustrating an example process for generating new, or using unassigned wave tags, based on parameters received from a wave tag requestor, according to various aspects of the present disclosure.

FIG. 13 is a flowchart illustrating an example process 1300 for generating new, or using unassigned wave tags, based on parameters received from a wave tag requestor, according to various aspects of the present disclosure. The process 1300, in some embodiments, may be performed by a processor of a computing device that executes a wave tag manager program 100. The process 1300, in some embodiments, may be performed by a processor of the wave tag requesting device 155, or by a processor of the broadcasting device 158 when these devices include software, hardware, and/or data to generate wave tags (FIG. 1).

With reference to FIG. 13, a request may be received (at block 1305) from an entity for receiving one or more wave tags based on a set of parameters. For example, as described above with reference to FIG. 11, a request for wave tags may include the identification of one or more custom themes 1110, a custom file context 1120, the identification of mapping data 1130, the configuration of the wave tag 1140, the identification of the requester 1150, the identification of one or more verification methods 1180, and/or a wave tag application dataset 1160.

The wave tags type may be determined (at block 1310) from the received parameters. For example, the wave tags may be determined to be sound tags, light tags, other types of wave tags, and/or a combination of several types of wave tags.

Next, it may be determined (at block 1315), from the received parameters, whether the data item associated with the wave tag is to be used as signature. For example, as described above with reference to FIG. 11, an option 1130 may be provided to indicate the data item associated with the wave tag (e.g., short data or a unique identifier) is to be used as signature for generating wave blocks for the wave tag(s).

Default and/or the customized wave blocks may be selected (at block 1320) from the received parameters to create a wave tag for the requesting entity. Next, a new wave tag may be generated (at block 1325) or an unused wave tag may be reserved (at block 1325) by using the selected wave blocks. The customization data may specify which approaches to take to generate customized wave blocks for the entities included in the dataset 1160 received from the requester. Further details of block 1325 are described below with reference to FIG. 14.

Next, a determination may be made (at block 1330) whether all requested wave tags are generated or assigned. If no, the process 1300 may proceed to block 1320, which was described above. Otherwise, the wave tag(s) information may be provided (at block 1335) to the requester. For example, the wave tags(s) and/or the descriptor(s) for the wave tag(s) may be provided to the wave tag requesting device 155, as described above with reference to FIG. 1. The process 1300 may then end.

Figure 14:
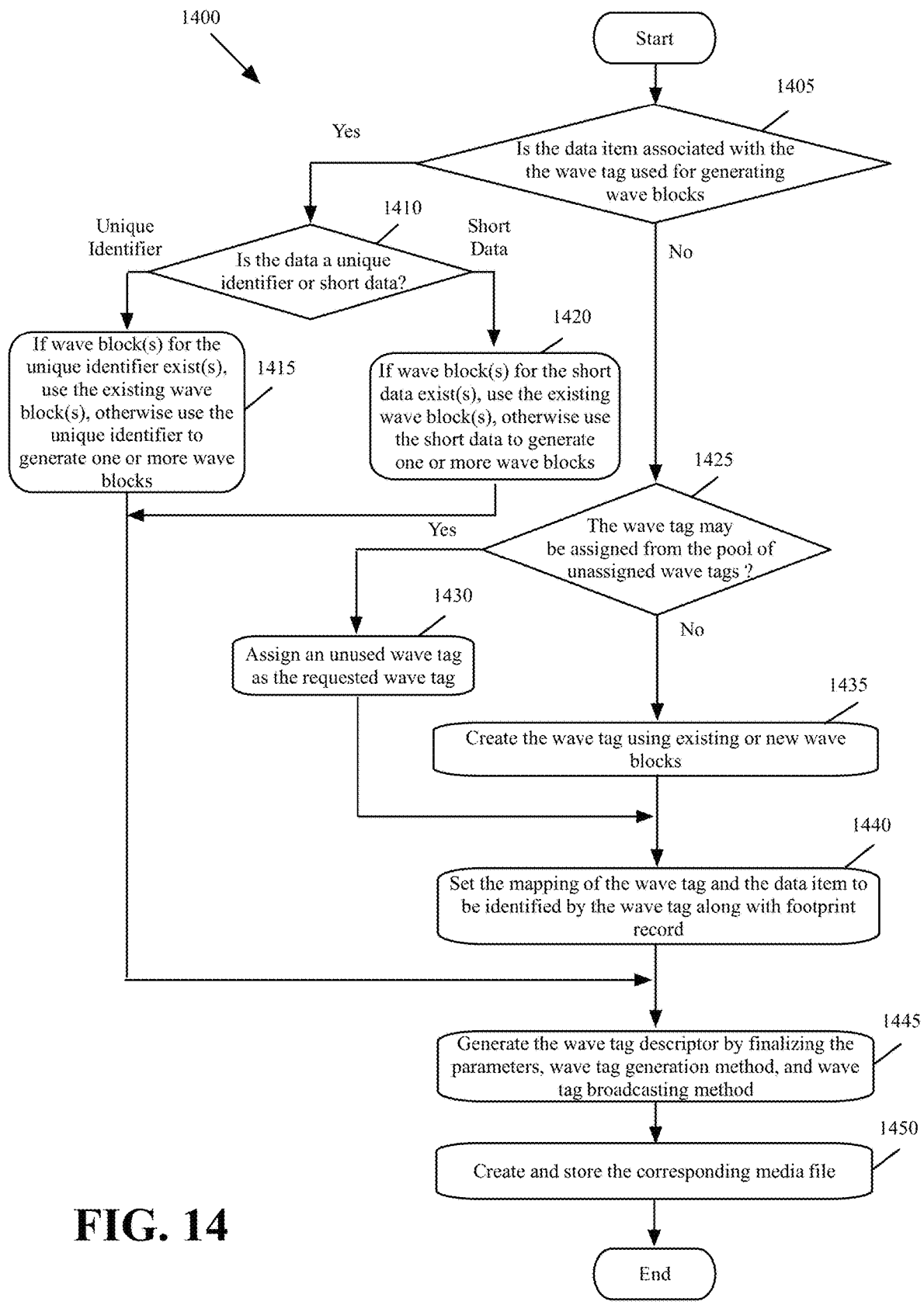
FIG. 14 is a flowchart illustrating an example process for generating new, or using unassigned wave tags for a given application data, according to various aspects of the present disclosure.

FIG. 14 is a flowchart illustrating an example process 1400 for generating new, or using unassigned wave tags for a given application data, according to various aspects of the present disclosure. The process 1400, in some embodiments, may be performed by a processor of a computing device that executes a wave tag manager program 100. The process 1400, in some embodiments, may be performed by a processor of the wave tag requesting device 155, or by a processor of the broadcasting device 158 when these devices include software, hardware, and/or data to generate wave tags (FIG. 1). The process 14 provides further details of block 1325 of the process 1300 (FIG. 13).

With reference to FIG. 14, a determination may be made (at block 1405) whether the data item associated with the wave tag is to be used for generating wave blocks. As described above with reference to FIG. 13, the parameters received from the wave tag application may identify the data associated with the wave tag as a unique identified or short that, which may be used to generate signature blocks.

If not, the process 1400 may proceed to block 1425, which is described below. Otherwise, a determination may be made (at block 1410) whether the data is a unique identifier or short data. When the data is determined to be a unique identifier, if wave block(s) for the unique identifier exist(s), the existing wave blocks may be used, otherwise the unique identifier may be used to generate one or more wave blocks for the wave tag. For example, one or more wave blocks may be generated as described above with reference to FIG. 2D. When data is a unique identifier and is used as a common format as public wave tag, the generation of the wave blocks may be skipped (at block 1415) to avoid creating redundant wave tags. The corresponding unique identifier wave tag may be provided (at block 1415) instead of assigning a new wave tag for the same unique identifier. Depending on implementation, some embodiments may generate new wave tags for unique identifier (at block 1415) while other embodiments may provide the corresponding unique identifier wave tag, for example to improve performance, increase efficiency, or for technical reasons. The process 1400 may then proceed to block 1445, which is described below.

When the data is determined to be short data, if wave block(s) for the short data exist(s), the existing wave blocks may be used, otherwise the short data may be used to generate (at block 1420) one or more wave blocks for the wave tag. For example, one or more wave blocks may be generated as described above with reference to FIG. 2D.

When data is a short data and is used as a common format as public wave tag, such as, a brand name, or a public short data, the generation of the wave blocks may be skipped (at block 1420) to avoid creating redundant wave tags. The corresponding short data wave tag may be provided (at block 1420) instead of assigning a new wave tag for the same short data. Depending on implementation, some embodiments may generate new wave tags for short data (at block 1420) while other embodiments may provide the corresponding short data wave tag, for example to improve performance, increase efficiency, or for technical reasons. The process 1400 may then proceed to block 1445, which is described below.

When a determination is made (at block 1405) that the data item associated with the wave tag is not to be used for generating wave blocks, a determination may be made (at block 1425) whether the wave tag may be assigned from the pool of unassigned wave tags. When a wave tag requester requests a highly customized wave tag, it may not be possible to assign an existing unused wave tag to the requester. For example, if the wave tag application 1100 (FIG. 11) includes a custom file content 1120, or requires particular themes, custom wave tags may have to be generated to meet the requested customization.

When a determination is made (at block 1425) that the wave tag may be assigned from the pool of unassigned wave tags, an unused wave tag from the pool of unused wave tags may be assigned, or reserved, (at block 1430) as the requested wave tag. For example, an unused wave tag may be assigned, as described above with reference to FIGS. 7-10 or an unused wave tag may randomly be assigned.

The process 1400 may then proceed to block 1440, which is described below. Otherwise, one or more wave tags may be created using the existing or new wave blocks. For example, one or more wave blocks may be generated as described above with reference to FIGS. 10A-10C and add them to the wave block pool. Then the assignment tables may be used, as described above with reference to FIGS. 7-10 to generate the wave tag from the generated wave blocks. Alternatively, the generated wave tags may be randomly used to create the wave blocks.

Next, the mapping of the wave tag to the data item to be identified by the wave tag may be set (at block 1440) along with the footprint record. Next, the wave tag descriptor may be generated (at block 1445) by using the parameters for generation and broadcasting of the wave tag, the wave tag generation method, the wave tag broadcasting method, etc. The descriptor may be used to provide information regarding how the wave tag may be reproduced. The wave tag descriptor may be as simple as a text file showing which wave blocks to use, how the wave blocks are broadcasted, and method of generating the wave blocks.

The media file corresponding to the wave tag may be created (at block 1450). The process 1450 may then end. As described above with reference to FIG. 1, some embodiments may provide the wave tags 170 as media files to the wave tag requesting device 155. Other embodiments may provide the wave tag's descriptor and the necessary hardware and/or software to the requestor and/or to the wave tag capturing device 140 to generate the wave tags based on their descriptors.

The specific operations of the process 1400 may not be performed in the exact order shown and described. Furthermore, the specific operations described with reference to FIG. 14 may not be performed in one continuous series of operations in some embodiments, and different specific operations may be performed in different embodiments. For example, in some of the present embodiments, the data item associated with the wave tag may not be used as the signature to generate wave blocks. In these embodiments, the process 1400 may not include blocks 1405-1420.

In some aspects of the present embodiments, a media file may not be generated for at least some of the wave tags (e.g., the wave tags that may be generated by the requesting device, or the wave tags that may be generated by the broadcasting device, the wave tags that identify unique identifiers, or the wave tags that identify short data). In these aspects of the present embodiments, the process 1400 may not perform block 1450. When the wave tag is a unique identifier or short data, the mapping data, the identification of the mapping data, or a transformation of data may be used in generating the wave blocks.

It should be noted that the present embodiments do not use a reversible encoding and decoding of the data that is identified by the wave tag into the wave tag's wave blocks. Instead, the present embodiment provide several novel ways of identifying the short data or unique the wave tags are used to identify. One approach, used by some embodiments, for handling the wave tag assignment to short data or unique identifiers when the wave tag is used as a common format as public wave tag is to skip the generation of the wave blocks (at block 1415) to avoid creating redundant wave tags. The corresponding unique identifier or short data wave tag, that already exists, may be provided (at block 1415) instead of assigning a new wave tag for the same unique identifier or short data. The process 1400 may then proceed to block 1445. Accordingly, these embodiments may provide the existing wave tag any time a wave tag requester requests for a public unique identifier or an existing public short data. These embodiments use one wave tag per public unique identifier or short data. The data or a transformation of data may be used as signature data (FIG. 2C), but the data is not used for encoding/decoding purpose and instead is used as a method of creating unique wave patterns.

As second approach, used by some embodiments, is to only use the signaling wave blocks that are reserved for the short data or unique identifiers (e.g., the signaling wave blocks S1 911 and E1 912 in FIG. 9) and each signaling block also attached to a specific extraction method, including but not limited to, cipher and deciphering, hide and reveal instruction from content to locate or interpret the data itself in various format. This method of handling informs the capturing device about the existence of a data and a method of extracting it from the media context. For example, a radio station may broadcast wave tags with a signaling block defined with the following extraction rule "provide five seconds after this signal is broadcasted". The radio station may place the wave tag in an advertisement audio right before or around a phone number.

Once captured, the wave tag manager 100 (FIG. 1) may extract the phone number by just clipping five seconds of the audio right after the audio signal is broadcasted and return it as the mapped data. Clearly, this extraction method is not performing encode or decoding operation on wave tag. The method provides the technical advantage of providing a simple and reliable method for extracting the data. These embodiments may provide a standardized audio file with the phone number that may be played by any audio player. These embodiments may use this method to fit the extraction rule attached to the signaling block. In this example, the rule attached to the signaling wave block is "return five seconds after this signal is broadcasted" and, therefore, the audio files are five seconds audio files. These unique identity or short data audio files may be generated automatically by a machine. In this method, if an organization needs a wave tag for a phone number, the phone number media files (media files including the data itself, such as an audio file playing the phone number) may be attached to the signaling wave block to generate wave tag. The method further provides the technical advantage of not requiring fingerprint matching, feature extraction, or any kind of encoding/decoding operation on the attached audio file; the method simply return the audio file. This method of short data/unique identifier extraction from the wave tags may happen in most form of wave tags including, but not limited to, the sound tags, wave tags, and light tags.

As another example, a TV program may broadcast wave tags with specific signaling wave blocks according to short data attached to an extraction rule, any time they want to provide the short data on screen. Assume the extraction rule "record five second video after this signal is broadcasted" is defined for the signaling wave block. The wave tag (with only signaling wave block) may then be placed in an advertisement, right before or around when a phone number is displayed on screen. The same process described above for the radio example may be used to extract the short data from the TV program. In TV example, light tags may be used as signaling wave blocks as an extractor.

The above mentioned approaches for generating or capturing short data or unique identifier wave tags may be used based on the specific usages to optimize the wave tag assignment. These approaches are only optimized for the unique identifiers in public common format and for public short data because. The flexibility of the wave tag block structure and using the signaling wave blocks enables performing different approaches based on the mapping entities in both generation and capturing processes.

There may be multiple signaling wave blocks reserved for short data, each mapped to different method of extraction to specify the method of data placement in, or extraction from, the content when detected in a context. One or more signaling wave blocks for various unique identifier data types such as ISBN, phone number, etc., may also be reserved. Therefore, when the wave tag identifies a unique identifier or short data, the body wave block(s) or the wave tag may be used to locate, extract and interpret the mapping data. The wave tag descriptor for these wave tags may include information including, but not limited to, the reserved signaling wave blocks and the data interpreter/locator/extractor function(s).

Figure 15:
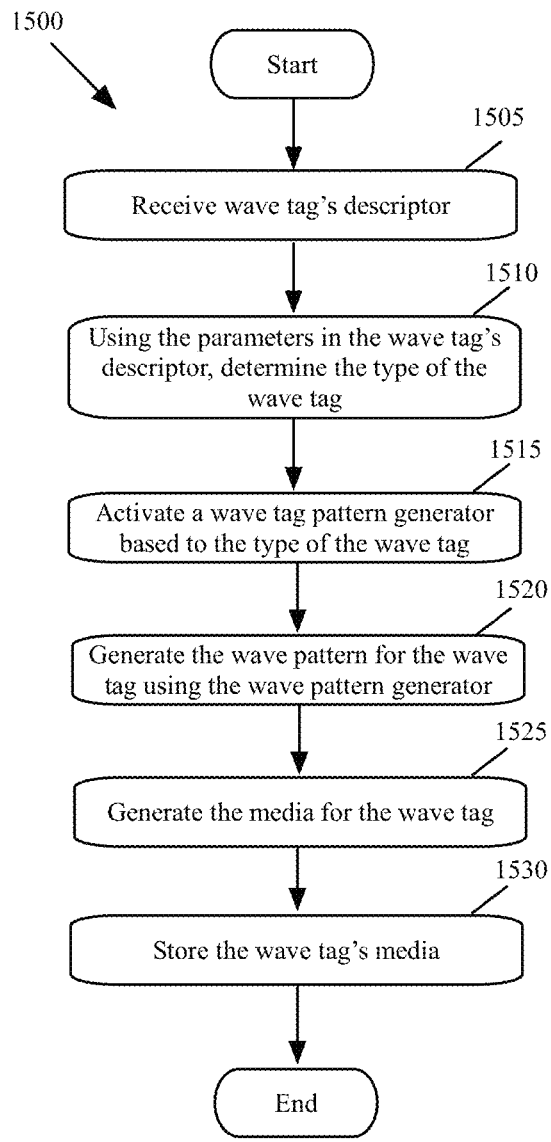
FIG. 15 is a flowchart illustrating an example process for generating a wave tag from the wave tag's descriptor, according to various aspects of the present disclosure.

FIG. 15 is a flowchart illustrating an example process 1500 for generating a wave tag from the wave tag's descriptor, according to various aspects of the present disclosure. The process 1500, in some embodiments, may be performed by a processor of a computing device that may generate wave tags, for example a processor of a computing device that executes the wave tag manager program 100. The process 1500, in some embodiments, may be performed by a processor of the wave tag requesting device 155, or by a processor of the broadcasting device 158 when these devices include software, hardware, and/or data to generate and/or broadcast wave tags (FIG. 1).

With reference to FIG. 15, the wave tag' descriptor may be received (at block 1505). For example, the wave tag' descriptor may be retrieved from the wave tag index database 160 of FIG. 1. Using the parameter in the wave tag's descriptor, the type of the wave tag may be determined (at block 1510). For example, the wave tag may be determined to be a sound tag, a light tag, another type of wave tag, or a combination thereof.

A wave pattern generator may be activated (at block 1515) based on the type of the wave tag. Further details of block 1515 are provided below with reference to FIG. 17. The wave tag's wave pattern may be generated (at block 1520) by the wave tag pattern generator. The wave tag generator, in some embodiments, may generate the wave pattern without actually emitting the waves. For example, to generate sound wave patterns, the wave pattern generator, in some embodiments, may digitally generate a media file by inserting music notes without actually playing the notes during the wave pattern generation. In other embodiments, the music may be played and recorded by the wave pattern generator in a media file. For example, the wave pattern generator, in some instance, may have to play a specific video clip, a specific soundtrack, etc., from which a wave tag requestor wants the wave tags to be generated.

A media file may be generated (at block 1525) for the wave tag. The wave tag's media file may be stored (at block 1530). The process 1500 may then end.

Figure 16:
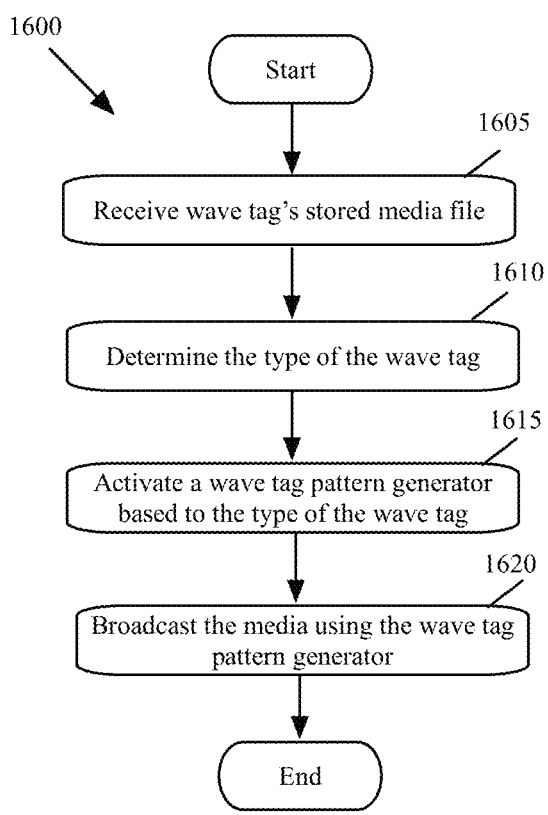
FIG. 16 is a flowchart illustrating an example process for broadcasting a wave tag from a media file, according to various aspects of the present disclosure.

FIG. 16 is a flowchart illustrating an example process 1600 for broadcasting a wave tag from a media file, according to various aspects of the present disclosure. The process 1600, in some embodiments, may be performed by a processor of a computing device that may generate wave tags, for example a processor of a computing device that executes the wave tag manager program 100. The process 1600, in some embodiments, may be performed by a processor of the wave tag requesting device 155, or by a processor of the broadcasting device 158 when these devices include software, hardware, and/or data to generate and/or broadcast wave tags (FIG. 1).

With reference to FIG. 16, the wave tag's media file may be received (at block 1605). For example, the wave tag' descriptor may be retrieved from the wave tag index database 160 of FIG. 1. Using the parameter in the wave tag's media file, the type of the wave tag may be determined (at block 1610). For example, the wave tag may be determined to be a sound tag, a light tag, another type of wave tag, or a combination thereof.

A wave tag pattern generator may be activated (at block 1615) based on the type of the wave tag. For example, the wave tag generator may be similar to the wave tag generator described above with reference to FIG. 15. Further details of block 1615 are provided below with reference to FIG. 17. The wave tag's media file may be broadcasted (at block 1620) by the wave tag pattern generator. For example, the media file associated with the wave tag may have previously been generated and stored as described above with reference to FIG. 15. The stored media file may be retrieved and used at block 1620 to broadcast the wave file. The process 1600 may then end.

Figure 17:
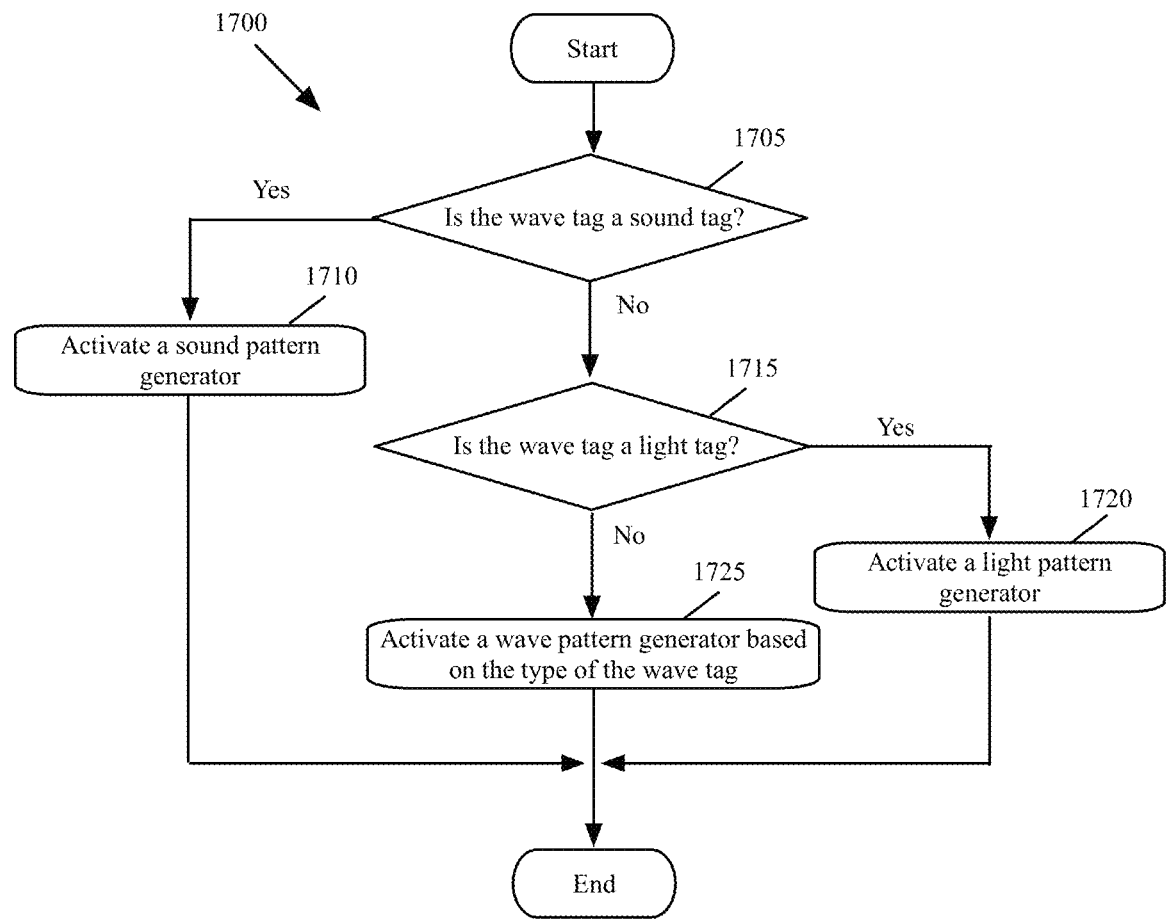
FIG. 17 is a flowchart illustrating an example process for broadcasting a wave tag by a wave pattern generator, according to various aspects of the present disclosure.

FIG. 17 is a flowchart illustrating an example process 1700 for broadcasting a wave tag by a wave pattern generator, according to various aspects of the present disclosure. The process 1700, in some embodiments, may be performed by a processor of a computing device that may generate wave tags, for example a processor of a computing device that executes the wave tag manager program 100. The process 1700 provide further details of the blocks 1515 and 1615 of FIGS. 15 and 16, respectively. The process 1700, in some embodiments, may be performed by a processor of the wave tag requesting device 155, or by a processor of the broadcasting device 158 when these devices include software, hardware, and/or data to generate and/or broadcast wave tags (FIG. 1).

With reference to FIG. 17, a determination may be made (at block 1705) whether the wave tag is a sound wave tag. For example, the type of the wave tag may be determined from the wave tag's descriptor as described above with reference to FIG. 14. When the wave tag is a sound tag, a sound pattern generator may be activated (at block 1710). Sound pattern generator may include a vibrating member (e.g., a diaphragm) to produce sound. Sound pattern generators may include, for example, and without limitations, speakers, musical instruments, etc. The process 1700 may then end.

When a determination is made (at block 1705) that the wave tag is not a sound wave tag, a determination may be made (at block 1715) whether the wave tag is a light wave tag. When the wave tag is a light tag, a light pattern generator may be activated (at block 1720). Light pattern generators may include, for example, and without limitations, electronic display screens, flashlights, LED lights, etc. The process 1700 may then end.

When a determination is made (at block 1715) that the wave tag is not a light wave tag, a wave pattern generator may be activated (at block 1725) based on the type of the wave tag. For example, depending on the type of the wave, a Bluetooth wave generator, a radio wave generator, a microwave generator, an ultrasound wave generator may be activated. Examples of such wave generators, may include, for example, and without limitations, radio stations, satellites, computing devices that may include hardware and software for generating Bluetooth signals, WiFi signals, radio signals, etc. The process 1700 may then end.

Figure 18:
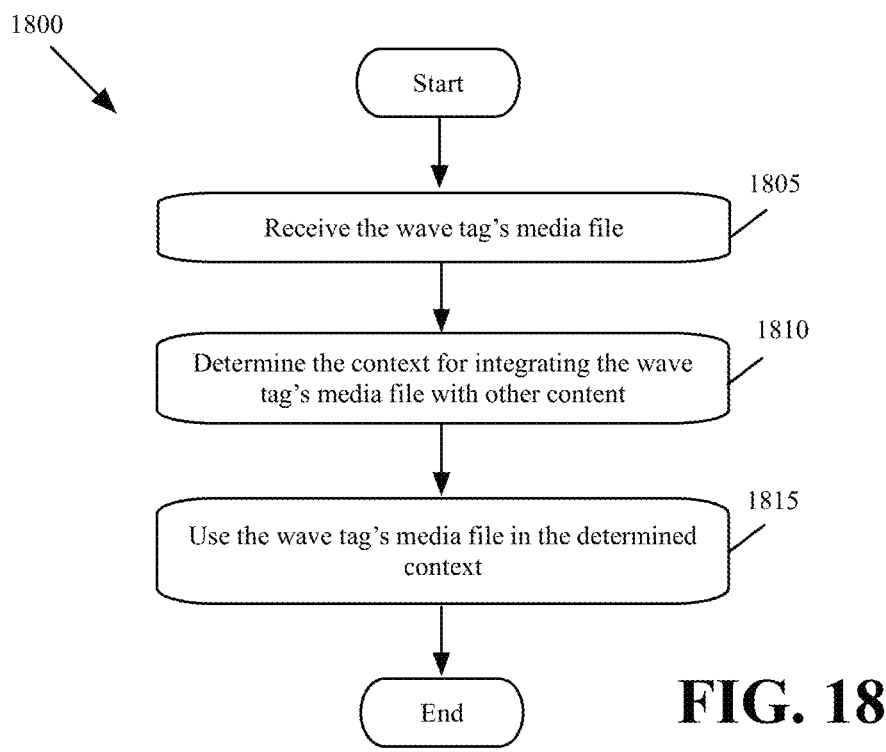
FIG. 18 is a flowchart illustrating an example process for integrating wave a tag media file in context, according to various aspects of the present disclosure.

FIG. 18 is a flowchart illustrating an example process 1800 for integrating wave a tag media file in context, according to various aspects of the present disclosure. The process 1800, in some embodiments, may be performed by a processor of a computing device that may generate wave tags, for example a processor of a computing device that executes the wave tag manager program 100. The process 1800, in some embodiments, may be performed by a processor of the wave tag requesting device 155, or by a processor of the broadcasting device 158 when these devices include software, hardware, and/or data to generate and/or broadcast wave tags (FIG. 1).

With reference to FIG. 18, the wave tag's media file may be received (at block 1805). For example, a media file may be generated and stored for a wave tag, as described above with reference to FIGS. 14 and 15. The context for integrating the media file with other content may be determined (at block 1810). For example, the time of broadcasting the media file and/or the place of integrating the wave tag's media file with another content file may be determined. Alternatively, the media file may be broadcast on demand, based on the context of another program. Some embodiments may provide a user interface for a person to determine the time of broadcasting and/or the place of integrating the wave tag's media file with another content file.

Next, the wave file's media file may be used (at block 1815) in the determined context. For example, the media file may be broadcasted (e.g., as described above with reference to FIG. 16) at the determined time or on demand. Alternatively, the media file may be inserted at the determined location in the other content file, for example, to be broadcasted at a later time. The process 1800 may then end. It should be noted that when customized wave tags are created from the content itself (e.g., based on example methods described herein with reference to FIGS. 2C and 26), there may be no need for inserting the wave tag into the content and the wave tags may be detected from the context.

C. Extraction and Detection of Wave Blocks and Wave Tags

Figure 19:
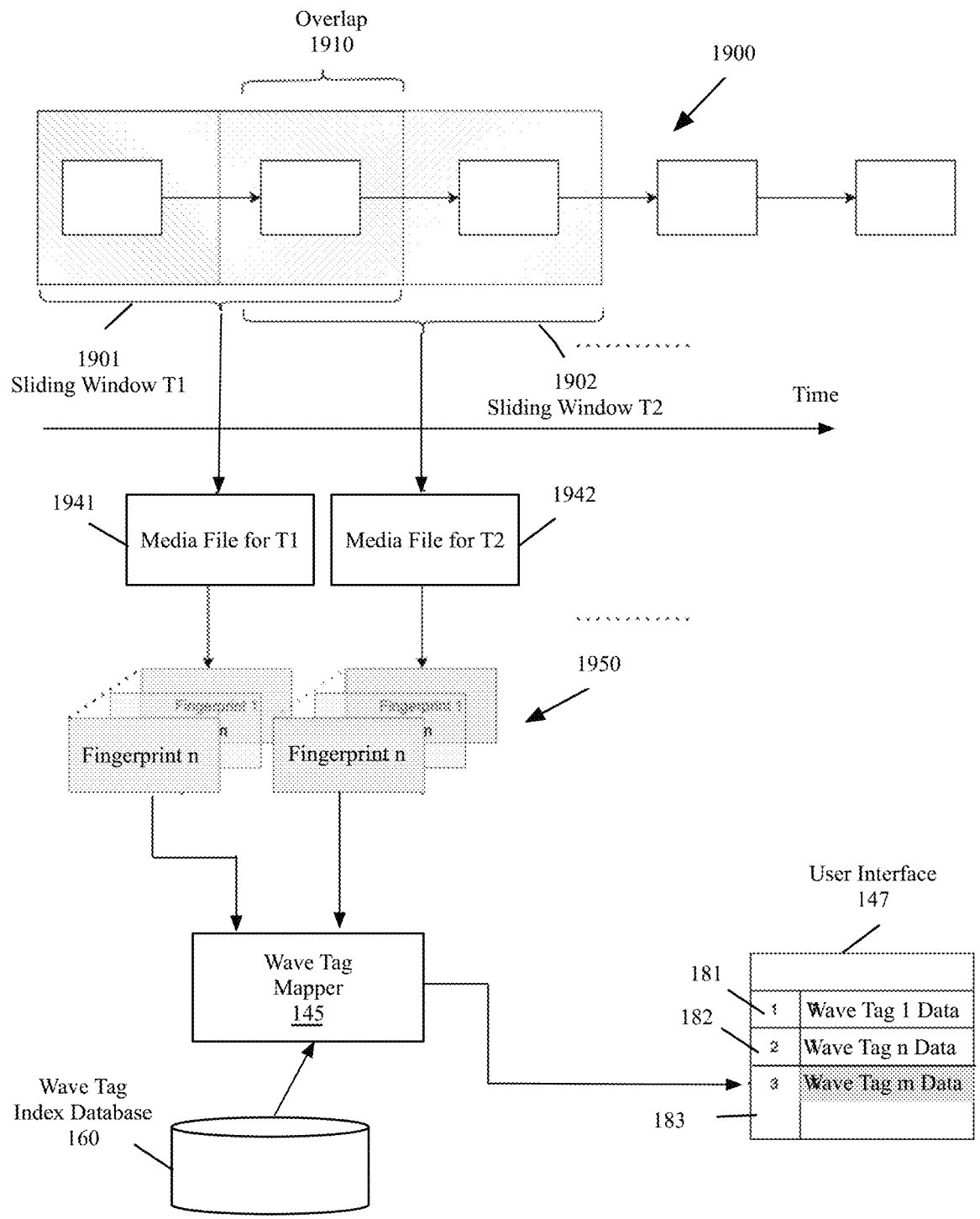
FIG. 19 is a functional diagram illustrating an example extraction method using overlapping or nonoverlapping sliding windows, according to various aspects of the present disclosure.

In order for a wave tag to be mapped to a data item, a wave tag capturing device, such as the wave tag capturing 140 of FIG. 1 has to detect the wave blocks of the wave tag among other wave patterns in the environment. FIG. 19 is a functional diagram illustrating an example extraction method using overlapping or nonoverlapping sliding windows, according to various aspects of the present disclosure.

With reference to FIG. 19, a signal 1900 may be received over time. The signal 1900 may, for example, and without limitations, be sound waves, light waves, or another particular type of mechanical or EM wave, among which a reading device is looking for wave tags. The signal may be processed in a sequence of slots generated by a sliding window 1910.

Each instance 1901-1902 of the slicing window may include a length of X time units and may move every Y time units to continuously look for new wave blocks. Y may be chosen in such a way that Y is smaller than X in order to check (as shown by 1910) overlapping windows of the signal 1900 for wave blocks. The overlapping windows may decrease the possibility of missing wave blocks, if the wave blocks are in the middle of non-overlapping windows.

Some embodiments may process a window 1901-1902 multiple times with different parameters or setups, if it is not possible to clearly decide if a wave block is present in the signal 1900 due to other factors, such as, noise or overlapping waves (e.g., voice, light, etc., depending on the type of the signal 1900) while the wave block(s) of a wave tag is/are broadcasted. Some embodiments may change the parameters X and Y in real-time based on environment or based on previously detected wave tags.

For example, some embodiments may use specific starting signaling wave blocks or trigger signals to indicate the existence of multiple tags in future, in order for the reading device to tune the parameters including X and Y. Each window 1901-1902 may be processed to detect the existence of wave blocks that may make a wave tag.

In order to process all windows, some embodiments may create one or more buffers 1941-1942 to temporarily store media file generated by recording signals in one or more sliding windows. The buffers 1941-1942 may be reused as the sliding window moves in time. The media files in the buffers 1941-1942 may be processed in parallel or in a first-in first-out (FIFO) basis.

Unique features, such as, the fingerprints 1950 of each media file may be extracted, for example, as described above with reference to FIG. 3. The media files in the buffer(s) 1942 may be processed in one or more passes, possibly with different fingerprinting setups. The wave tag mapper 145 may compare the extracted fingerprints with the fingerprints of the existing wave blocks stored in a database (e.g., the wave tag index database 160) to identify a wave tag corresponding to one or more detected wave blocks, as described below with reference to FIGS. 20 and 21. A user interface 147 on the reading device may display the data 181-183 corresponding to the detected wave tags, as described above with reference to FIG. 1.

Figure 20:
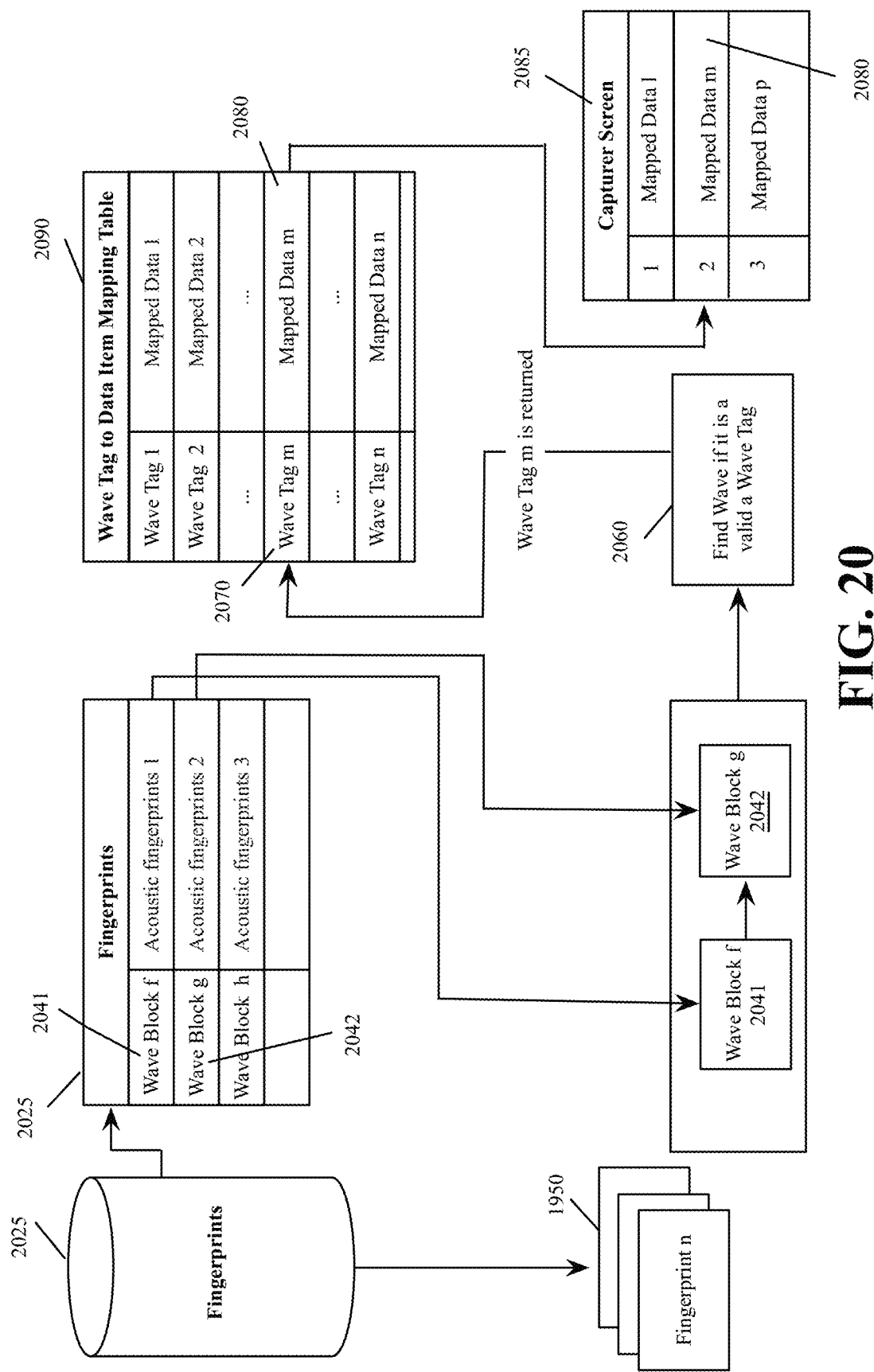
FIG. 20 is a function diagram illustrating an example of a wave tag validation process using fingerprinting and the extracted wave blocks from the window slots of FIG. 19, according to various aspects of the present disclosure.

FIG. 20 is a function diagram illustrating an example of a wave tag validation process using fingerprinting and the extracted wave blocks from the window slots of FIG. 19, according to various aspects of the present disclosure. Once the feature extraction or media file fingerprints are done, the fingerprints 1950 of the current sliding window 1911-1912 has to be matched with the fingerprints of the wave blocks stored in a fingerprint table 2025 with high accuracy (e.g., and without limitations with an accuracy of more than a 95% threshold).

In the example of FIG. 20, the wave block f 2041 and the wave block g 2042 are matched to a portion of the received signal in the current media file 1941-1942 (FIG. 19). Next, a determination is made (at block 2060) whether the combination of the wave block f 2041, followed by the wave block g 2042 is a valid wave tag, as described below with reference to FIG. 21. In the example of FIG. 20, the combination of the wave block f 2041, followed by the wave block g 2042 is the valid wave tag m 2070. Next the mapping data 2080 to the wave tag m 2070 may be retrieved from the mapping table 2090 if the wave tag 2070 is accessible by the capturing device or its' operator (e.g., if the wave tag is a public wave tag or a private wave tag associated with the capturing device or it's operator). Finally, the mapping data 2080 may be listed on the capturing device's screen 2085.

Figure 21:
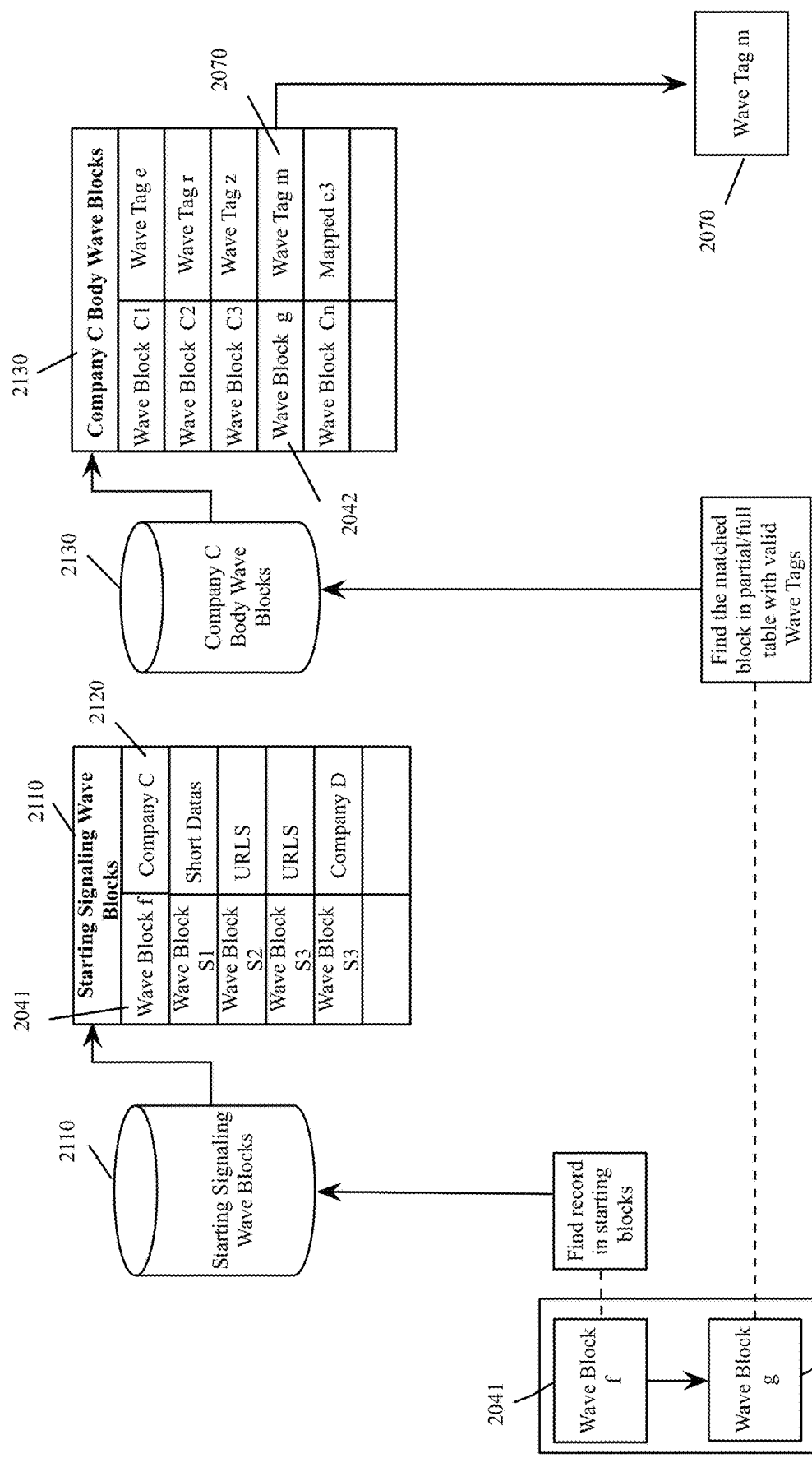
FIG. 21 is a function diagram illustrating an example of a wave tag searching process using a combination of the extracted wave blocks, according to various aspects of the present disclosure.

FIG. 21 is a function diagram illustrating an example of a wave tag searching process using a combination of the extracted wave blocks, according to various aspects of the present disclosure. After the wave block f 2041 and the wave block g 2042 are extracted from the time slot of the current sliding window (as described above with reference to FIG. 20), a search may be made to find a matching wave tag that includes the wave blocks f 2041 and g 2042.

First, a search may be made for the signaling wave blocks (in this example, the wave block f 2041) and the results may be interpreted to provide information that may facilitates the search for a matching wave tag. For example, the wave block f 2041 may be a signaling wave block and a search in a table 2110 for the starting signaling wave blocks may find a match, indicating that the wave tags starting with the wave block f 2041 belong to company C 2120. In addition, other information may be acquired from the starting wave block, including but not limited to, the wave tag schema, the interpretation method, the accessibility (e.g., public or private), the type or category, the verification method, the type of wave blocks in the wave tag (e.g., light, sound, other types of waves), etc. On the other hand, if a search for the wave block f 2041 fails to find a match, the wave block f 2041 may be discarded and the process may continue with the next detected signaling wave block (if any).

This process may continue until all detected signaling wave blocks (in this example, the wave block f 2041) are matched and interpreted. By using the information found for the signaling wave blocks, a more efficient search may be made for a match for the rest of the extracted wave blocks. For example, based on the signaling wave blocks it may be possible to narrow dawn the search to a specific group of wave blocks without searching other groups. In the example of FIG. 21, by knowing that, if a matching wave tag exists, it belongs to Company C 2120, the search for the wave tags may be limited to search in the table(s) 2130 that may include the wave tags that belong to company C.

As shown in FIG. 21, the wave block g 2042 may point to the wave tag m 2070 in the table 2130 that stores the wave blocks for company C. The figure, for simplicity shows only one body block for each wave tag. However, it should be understood that each wave tag in the table 2130 may correspond to a sequence of more than one wave block. Once the wave tag m 2070 is identified as a valid matching wave tag, the mapping table 2090 of FIG. 20 may be used to retrieve the data item 2080 identified by the wave tag m 2070.

Figure 22:
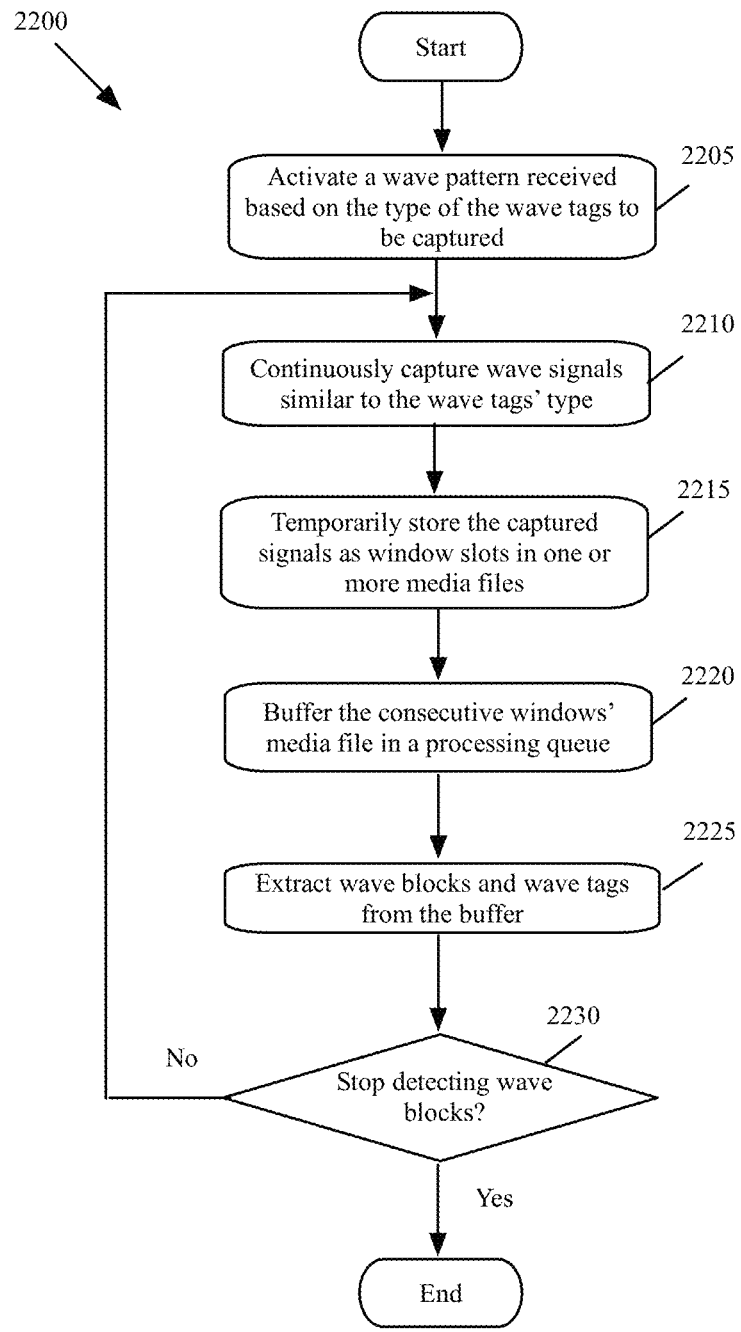
FIG. 22 is a flowchart illustrating an example process for detection, extraction, and capture of wave tags and their mapping data from streaming signals, according to various aspects of the present embodiments.

FIG. 22 is a flowchart illustrating an example process 2200 for detection, extraction, and capture of wave tags and their mapping data from streaming signals, according to various aspects of the present embodiments. The process 2200, in some embodiments, may be performed by a processor of a computing device that may capture wave tags, for example a processor of a computing device that executes the wave tag manager program 100. The process 2200, in some embodiments, may be performed by a processor of the wave tag requesting device 155, or by a processor of the broadcasting device 158 when these devices include software, hardware, and/or data to capture wave tags (FIG. 1).

With reference to FIG. 22, a wave pattern receiver may be activated (at block 2205) based on the type of the wave tags to be captured. Further details of block 2205 are provided below with reference to FIG. 23. The wave signals similar to the wave tags' type may then be continuously captured (at block 2210). For example, as described above with reference to FIG. 19, the signals 1900 may continuously be captured. The wave signals may, for example, and without limitations, be sound waves, video signals, etc.

The captured signals may temporarily be stored (at block 2215) as window slots in one or more media files. For example, as described above with reference to FIG. 19, one more sliding windows 1901-1902 may be used store the captured signals 1900 in one or more buffer 1941-1942. The consecutive windows, in some embodiments, may be overlapping with each other in order to ensure all possible wave blocks in the signals are captured and processed.

Next, the consecutive window's media files may be buffered (at block 2220) in a processing queue. For example, the consecutive window's media files may be buffered in a processing queue as described above with reference to FIG. 19.

Next, the wave blocks and wave tags in the buffer may be extracted (at block 2225). Further details of the wave tags' detection are provided below with reference to FIGS. 24A-24B. A determination may be made (at block 2230) whether detecting wave blocks has to be stopped. If not, the process 2200 may proceed to block 2210, which is described above. Otherwise, process 2200 may end. For example, the process 2200 may end when the wave pattern receiver may be turned off or, in some embodiments, the process 2200 may not continue if the processing queue becomes empty.

Figure 23:
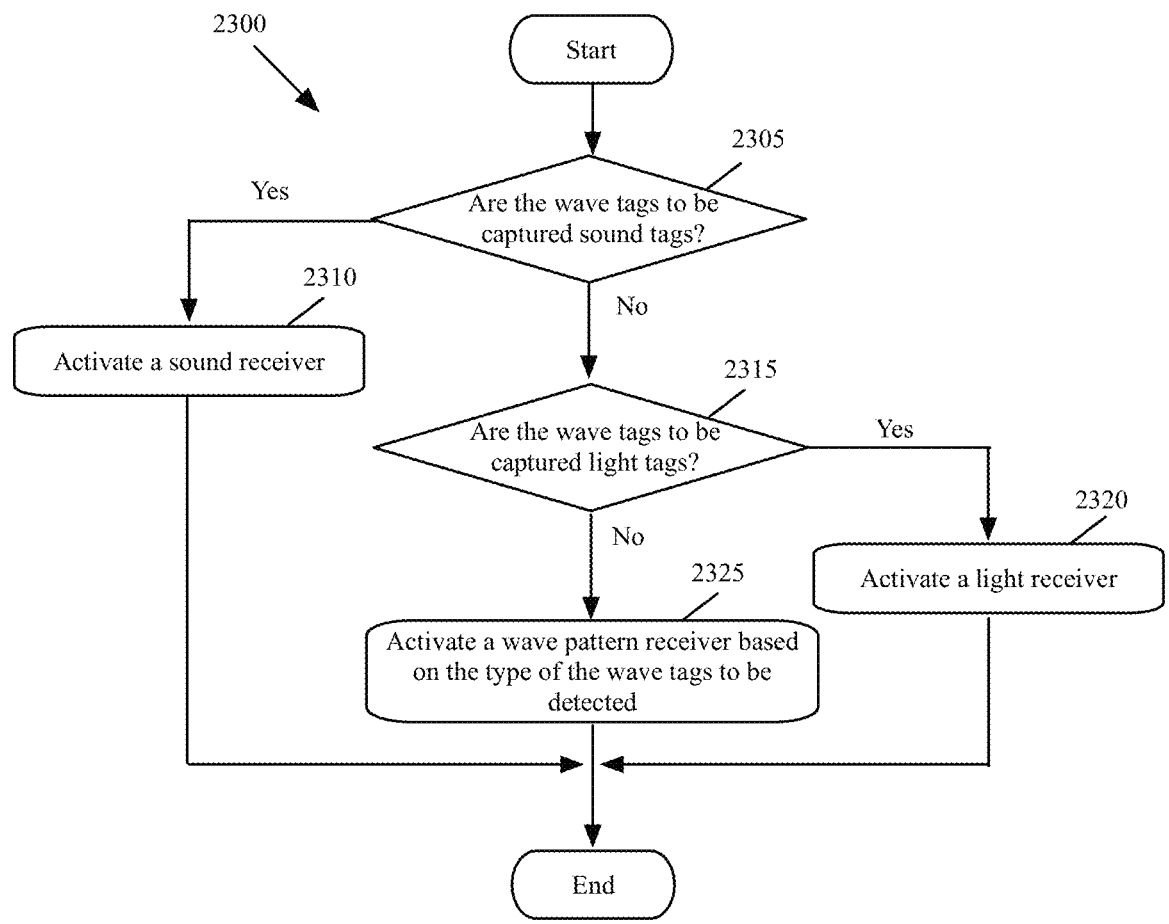
FIG. 23 is a flowchart illustrating an example process for loading a wave tag receiver based on the type of the wave tags, according to various aspects of the present embodiments.

FIG. 23 is a flowchart illustrating an example process 2300 for loading a wave tag receiver based on the type of the wave tags, according to various aspects of the present embodiments. The process 2300, in some embodiments, may be performed by a processor of a computing device that may capture wave tags, for example a processor of a computing device that executes the wave tag manager program 100. The process 2300, in some embodiments, may be performed by a processor of the wave tag requesting device 155, or by a processor of the broadcasting device 158 when these devices include software, hardware, and/or data to capture wave tags (FIG. 1).

With reference to FIG. 23, a determination may be made (at block 2305) whether the wave tags to be captured are sound wave tags. When the wave tags to be captured are sound tags, a sound received may be activated (at block 2310). Sound receivers may include, for example, and without limitations, microphones. The process 2300 may then end.

When a determination is made (at block 2305) that the wave tags to be detected are not sound wave tags, a determination may be made (at block 2315) whether the wave tags to be detected are a light wave tags. When the wave tags to be detected are light wave tags, a light recorder may be activated (at block 2320). Light recorders may include, for example, and without limitations, cameras, light sensors, etc. The process 2300 may then end.

When a determination is made (at block 2315) that the wave tags to be detected is a light wave tags, a wave recorder may be activated (at block 1725) based on the type of the wave tags to be detected. For example, depending on the type of the wave, a receivers or transceiver attached to one or more antennas may be activated to capture radio, waves signals, Bluetooth signals, microwave signals, etc. The process 2300 may then end.

Figure 24A:
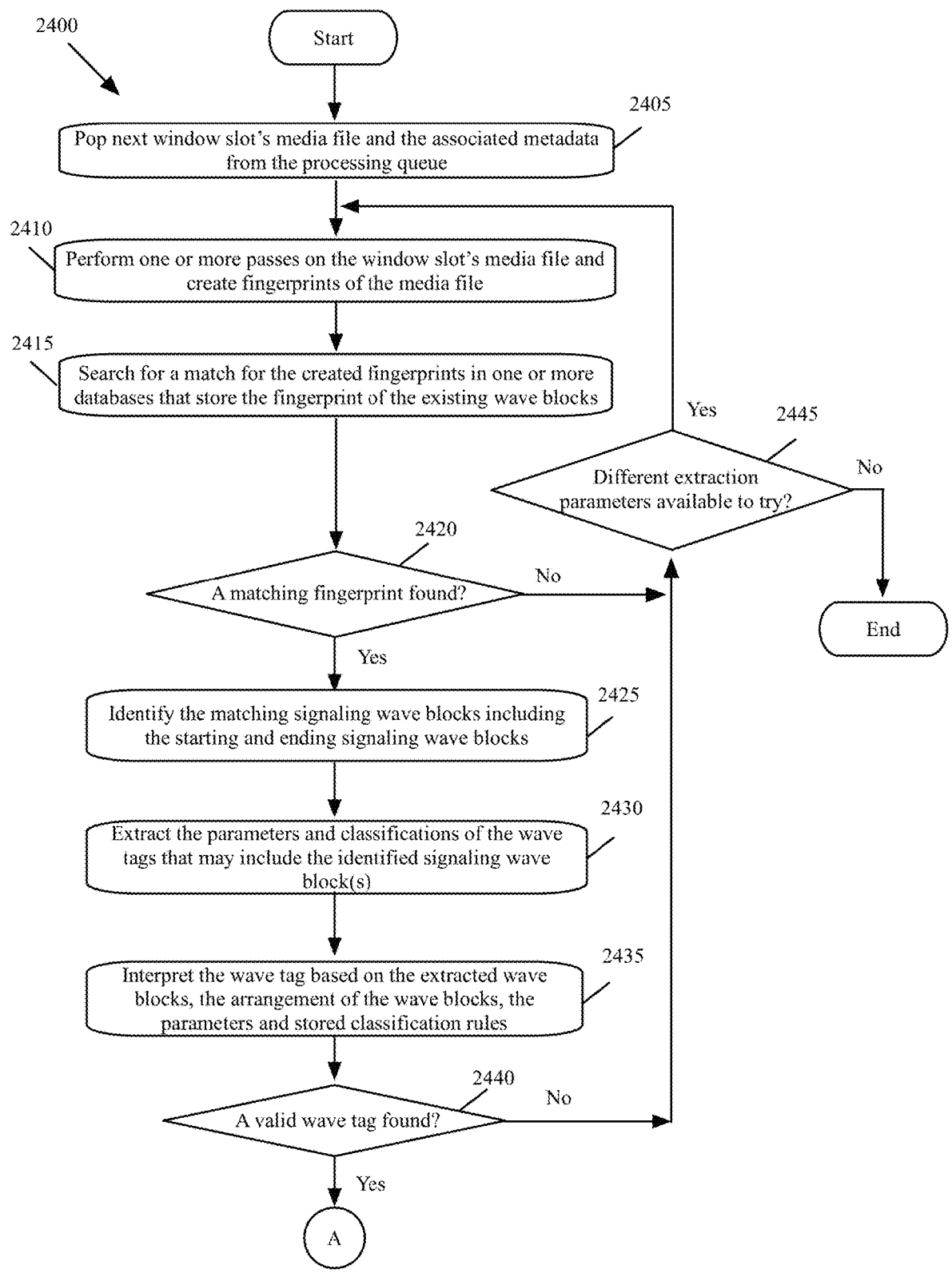
FIGS. 24A-24B are a flowchart illustrating an example process for extracting wave blocks and interpretating wave tags for each window slot in a buffered media file, according to various aspects of the present embodiments.
Figure 24B:
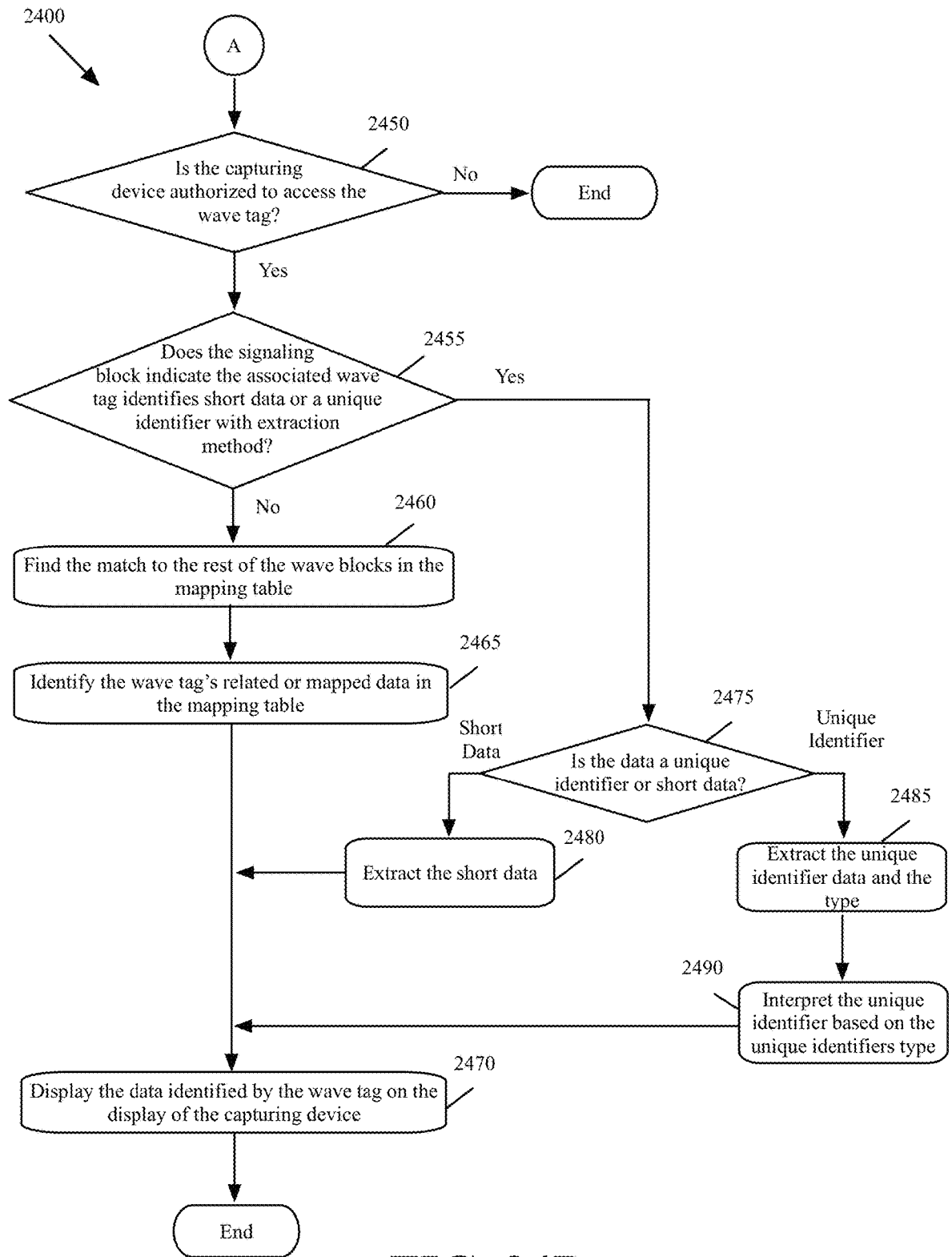

FIGS. 24A-24B are a flowchart illustrating an example process 2400 for extracting wave blocks and interpretating wave tags for each window slot in a buffered media file, according to various aspects of the present embodiments. The process 2400 provides further details of block 2225 of FIG. 22. The process 2400, in some embodiments, may be performed by a processor of a computing device that may capture wave tags, for example a processor of a computing device that executes the wave tag manager program 100. The process 2400, in some embodiments, may be performed by a processor of the wave tag requesting device 155, or by a processor of the broadcasting device 158 when these devices include software, hardware, and/or data to capture wave tags (FIG. 1).

The process 2400 provides further details of block 2225 of FIG. 22. With reference to FIG. 24, the next window slot's media file and the associated metadata may be popped (at block 2405) from the processing queue. One or more passes may be performed (at block 2410) on the window slot's media file and fingerprints of the media file may be created (at block 2410).

A search may be performed (at block 2415) for a match for the created fingerprints in one or more databases that store the fingerprint of the existing wave blocks. Each pass may generate different fingerprint records as described above with reference to FIG. 19. A determination may be made (at block 2420) whether a matching fingerprint is found. For example, the matching fingerprints may be found as described above with reference to FIGS. 19-21.

If a matching fingerprint is not found, the process 2400 may proceed to block 2445, which is described below. Otherwise, the matching signaling wave blocks, including, but not limited to, the starting and ending signaling wave blocks, may be identified (at block 2425). For example, the signaling wave blocks may be identified as described above with reference to FIG. 20. The Extracted signaling wave blocks may provide information about their associated wave tags, including, but not limited to, the wave tags parameters, classification data, access data, applicant data, etc. (as described above with reference to FIGS. 20-21).

The parameters and classifications of the wave tags that may include the identified signaling wave blocks(s) may be extracted (at block 2435). For example, the parameters and classifications of the wave tags may be extracted as described above with reference to FIG. 21. The wave tags may be interpreted (at block 2435) based on the extracted wave blocks, the arrangement of the wave blocks, the parameters, including but not limited to, the related software or hardware parameters on the capturing device, the verification parameters, the parameters provided by the wave tag application 1100 (FIG. 11), and/or the stored classification rules including but not limited to signaling block assignment rules (as described above with reference to FIGS. 20-21).

A determination may be made (at block 2440) whether a valid wave tag is found. For example, the valid wave tags may be found as described above with reference to FIG. 21. If the wave tag is valid, the process 2400 may process to block 2450, which is described below. Otherwise, a determination may be made (at block 2445) whether different extraction parameters are available to try. For example, as described above with reference to FIG. 19, several different sets of parameters may be used to extract wave blocks with an accuracy threshold. When different extraction parameters are not available to try, the process 2400 may end. Otherwise, the process 2400 may proceed to block 2410, which is described above.

At block 2450, a determination may be made on whether the capturing device is authorized to access the wave tag. The wave tag's metadata, configuration data, and/or the customization data from the wave tag's assignment process (as described above with reference to FIGS. 11-14) may be used to determine whether the capturing device is authorized to access the wave tag. When the capturing device is not authorized to access the wave tag, the process 2400 may end.

Otherwise, a determination may be made (at block 2455) whether the data associated with the wave tag has been used for generating the wave blocks. For example, as described above, by examining the signaling wave blocks or the wave tag's metadata stored in the database, a determination may be made whether the wave tag identifies a short data or a unique identification. As described above with reference to FIGS. 6, 9, 10A-10B, and 19, some embodiments may reserve some of the signaling wave blocks for the wave tags that identify short data or unique identifier. Detecting these signaling wave blocks, in these embodiments, indicates that the associated wave tag identifies a unique identifier or short data. The signaling wave blocks may also identify the type of the unique identifiers, such as URL, phone number, barcodes, etc.

When the data associated with the wave tag has been used for generating the wave blocks, the process 2400 may proceed to block 2475, which is described below. Otherwise, the match for the rest of the wave blocks may be found (at block 2460) in the mapping table. The data identified by the wave tag may be found in the mapping table may be identified (at block 2465). The data identified by the wave tag may be displayed (at block 2470) on the display of the capturing device. For example the data 181-183 identified by the wave tag may be displayed on a user interface 147 of the capturing device 140, as described herein with reference to FIGS. 1 and 29. The process 2400 may then end.

At block 2475, a determination may be made whether the data identified by the wave tag is a unique identifier or short data. When the data identified by the wave tag is a unique identifier, the unique identifier, the unique identifier data and the type of the unique identifier may be extracted (at block 2485) from the wave tag. For example, the unique identifier data and the type of the unique identifier may be extracted by decoding the wave pattern in the wave tag. The type of the unique identifier may be, for example, and without limitations, a URL, an ISBN, a telephone number, an IP address, a barcode, etc.

The unique identifier may be interpreted (at block 2485) and may identified based on the unique identifier's type, which may allow the data represented by the unique identifier (e.g., a product identified by an ISBN or a barcode) to be displayed on the capturing device. Accordingly, for the unique identifiers, the optional extra step of block 2485 may result in identifying and displaying the entity that the unique identifier represents, for example the book cover and title associated with an ISBN may be displayed on the capturing device screen.

The process 2400 may then proceed to block 2470, which was described above. When the data identified by the wave tag is short data, the short data may be extracted (at block 2480). Examples of the extraction approaches are described with reference to block 1410 of FIG. 14. The process 2400 may then proceed to block 2470, which was described above.

The specific operations of the process 2400 may not be performed in the exact order shown and described. Furthermore, the specific operations described with reference to FIG. 24 may not be performed in one continuous series of operations in some embodiments, and different specific operations may be performed in different embodiments. For example, in some of the present embodiments, the data item associated with the wave tag may not be used as the signature for generating the wave blocks. In these embodiments, the process 2400 may not include blocks 2455 and 2475-2490.

D. Viewing, Customizing, and Managing the Wave Tags

Figure 25:
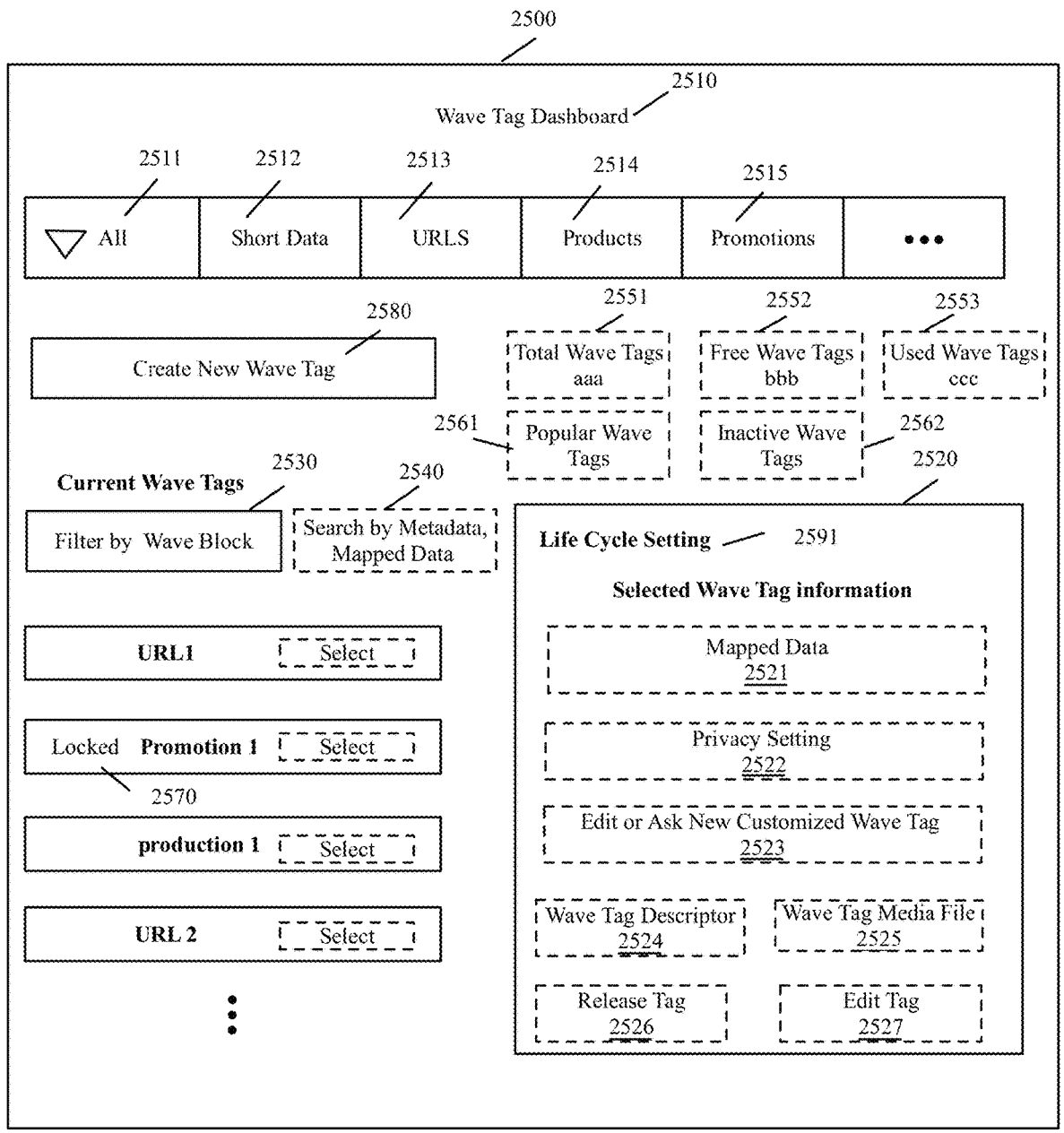
FIG. 25 is a schematic front view of a computing device that may display a user interface for managing wave tags, according to various aspects of the present disclosure.

FIG. 25 is a schematic front view of a computing device that may display a user interface for managing wave tags, according to various aspects of the present disclosure. With reference to FIG. 25, the UI 2500 may be used, for example, by a person associated with the wave tag issuer (e.g., the wave tag manager 100 of FIG. 1) and/or by a person associated with an entity that has received, and has control over, one or more wave tags.

The UI, referred herein as wave tag dashboard 2510, may provide options for taking different actions on one or more wave tags. The actions may include, but are not limited to the followings. The actions may include listing all 2511 or a group 2512-2515 of the used/free wave tags. The UI may provide an option 2580 for creating a new wave tag.

The actions may include selecting a wave tag and selecting and viewing and/or editing data 2520 corresponding to the select wave tag. The wave tag data may include, for example, and without limitations, mapping data 2521 and privacy data 2522. The wave tag data may also be edited and customized (e.g., by selecting the option 2523).

The actions may include selecting and viewing the wave tag descriptor 2524 that shows information about the wave blocks and information about how to generate the wave tag. The UI 2500 may also provide an option 2527 to download the wave tag media file to use wherever the media file is need. The UI 2500 may provide the option 2526 to release the wave tag to free up the wave tag such that the wave tag does not map to any data The UI 2500 may provide an edit option 2527 to change some of the wave tag data, such as, the mapping data of the selected wave tag. The UI 2500 may provide an option 2530 to filter or group wave tags by specific wave blocks, such that the UI 2500 may only show wave tags starting or including specific wave blocks.

The UI 2500 may provide a search option 2540 to search the listed wave tag based on the mapping data (for example filtering phone numbers with specific area code) or the wave tag metadata (for example filtering belong to company C, filtering sound tags, filtering wave tags of 1-1-1 schema, etc.). The UI 2500 may also display statistics including but not limited to the total 2551, the used (or assigned) 2552, and the free (or not assigned) 2553 wave tags. Monitoring the wave tags may provide some insight on the wave tags. The UI 2500 may provide the options to list popular wave tags 2561, to list inactive wave tags 2562, or to filter wave tags access by location or time and do desire action including but not limited to limiting access. The wave tags issuers, owner, or users, in some embodiments, may have different interface based on their permissions. Some wave tags may be issued as locked (e.g., as shown by 2570), permanent, or nonmutable in order to prevent editing or releasing the wave tags after they have been issued. Some embodiments may allow locking specific aspects of wave tags, such that a part of a wave tag may not be changeable and another part of the wave tag may be changeable.

The UI 2500 may provide a lifecycle setting option 2591 to manage the wave tag lifecycle. For example, by default the wave tags may be static and may be assigned to specific data as long as the data is not changed or released by the wave tag requester or the wave tag manager 100 (FIG. 1). Alternatively, the wave tag may be set to dynamically change after each usage (for example as described with reference to items 2801-2803 of FIG. 28) or may expire after one-time usage (for example as described with reference to items 2804-2806 of FIG. 28). The frequency of usage of the wave tag may be specified. For example, and without limitations, after 100th usage the wave tag may be released automatically.

E. Example Generation of Custom Wave Blocks

Figure 26:
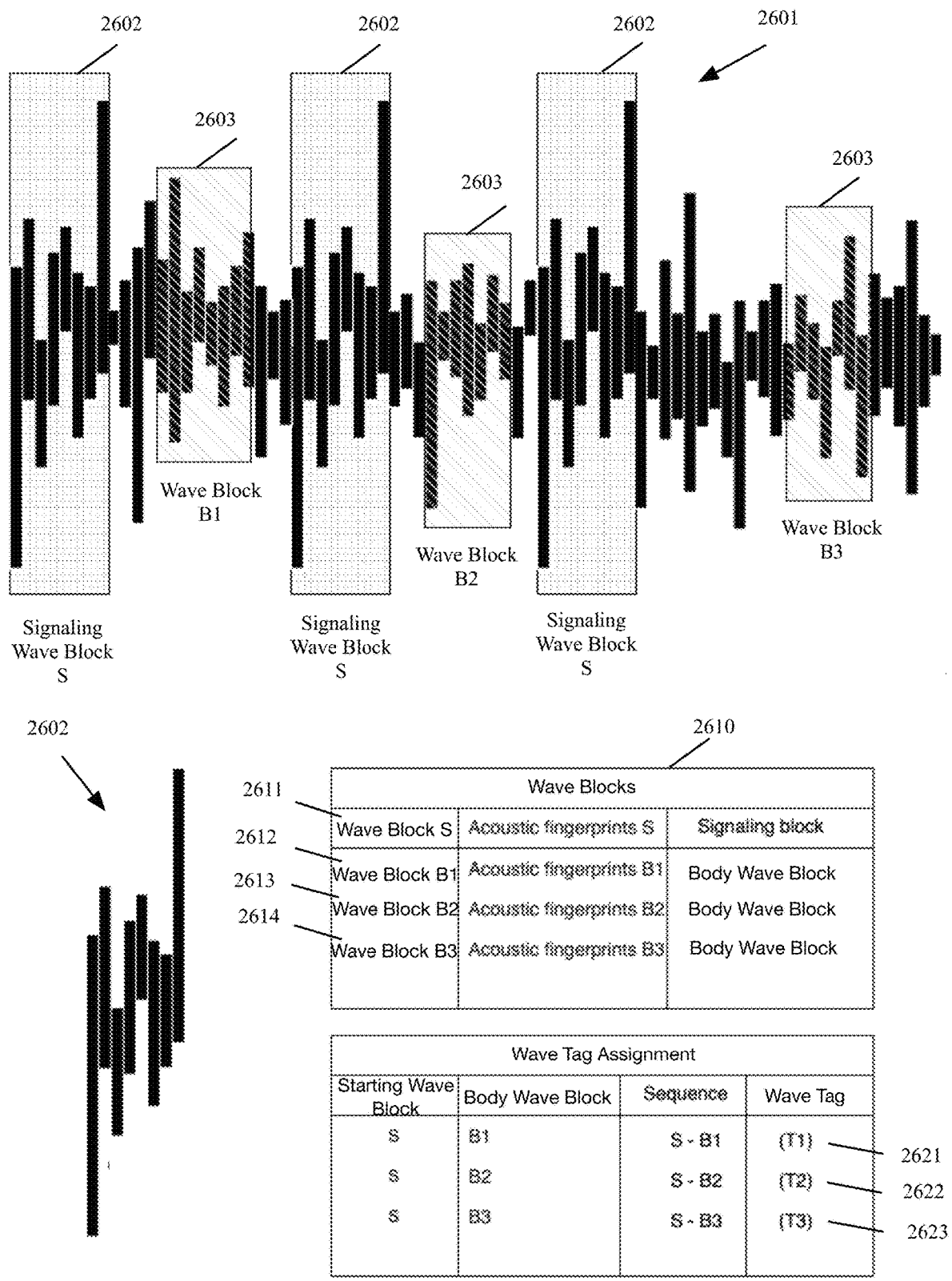
FIG. 26 is a functional diagram illustrating an example of using the system of FIG. 2C for generating custom wave blocks, according to various aspects of the present embodiments.

FIG. 26 is a functional diagram illustrating an example of using the system of FIG. 2C for generating custom wave blocks, according to various aspects of the present embodiments. With reference to FIG. 26, a main content signal 2601 with repeating chunks during the content, for example, a melody in the background music, a scene in a video, an image in an image sequence, or a wave signal in broadcasting signals may be used as customized signaling wave block for some of company C wave tags.

For example, assume the portion of the signal 2601 displayed in FIG. 26 is an X minute music that is playing either as standalone or as a background music in an advertisement. Company C may provide the advertisement file using an interface such as the UI 1100 of FIG. 11 and may request for customized wave tags for advertisement. The file may be processed by the wave tag manager 100 (FIG. 1) and may generate one or more wave blocks by using that file. For example, if the music 2601 is playing in the background, the music may have a short melody 2602, for example, a three seconds piece of music that repeats during the playing of the music 2601. The repeating short piece of music 2602, may be a very good candidate to be used as a customized signaling wave block.

The rest of the music 2601 may be used to create one or more wave blocks as the body wave blocks, preferably the pieces 2603 right after each signaling block are very good candidates if they create unique fingerprints. However, since sliding windows and multiple passes with different setups may be used to extract wave blocks from each window, and a search is made for all matches in the wave block database and not for the wave tags independently, it is fine to choose any other piece of music as the body wave blocks.

As shown in table 2610, three body wave blocks 2611-2613 and one signaling wave block 2614 may be generated from the music/advertisement sound or visuals. Therefore, with the schema 1-1-0 (item 712 of FIG. 7), there may be three possible wave tags 2621-2623 to represent entities. Using this generation method, if someone watches or listens to the advertisement, they may just hear the music and may not know if any wave tags are being broadcasted. In other words, the wave tags are implicit not explicit. Alternatively, specific themes close to the content and not the content itself may be used. For example, if the music is pop, any existing pop wave blocks may be used for the wave tags. In this case the wave tags may be placed or broadcasted along with the main content such that the listener may slightly distinguish the wave tag from the content. Some embodiments may use light blocks, sound blocks, or other types of wave blocks together to create wave tags when there are multiple signal types are available, for example during a TV program where both light tags (visuals) and sound tags (sound) may be used.

F. Example Uses of the Wave Tags

Figure 27:
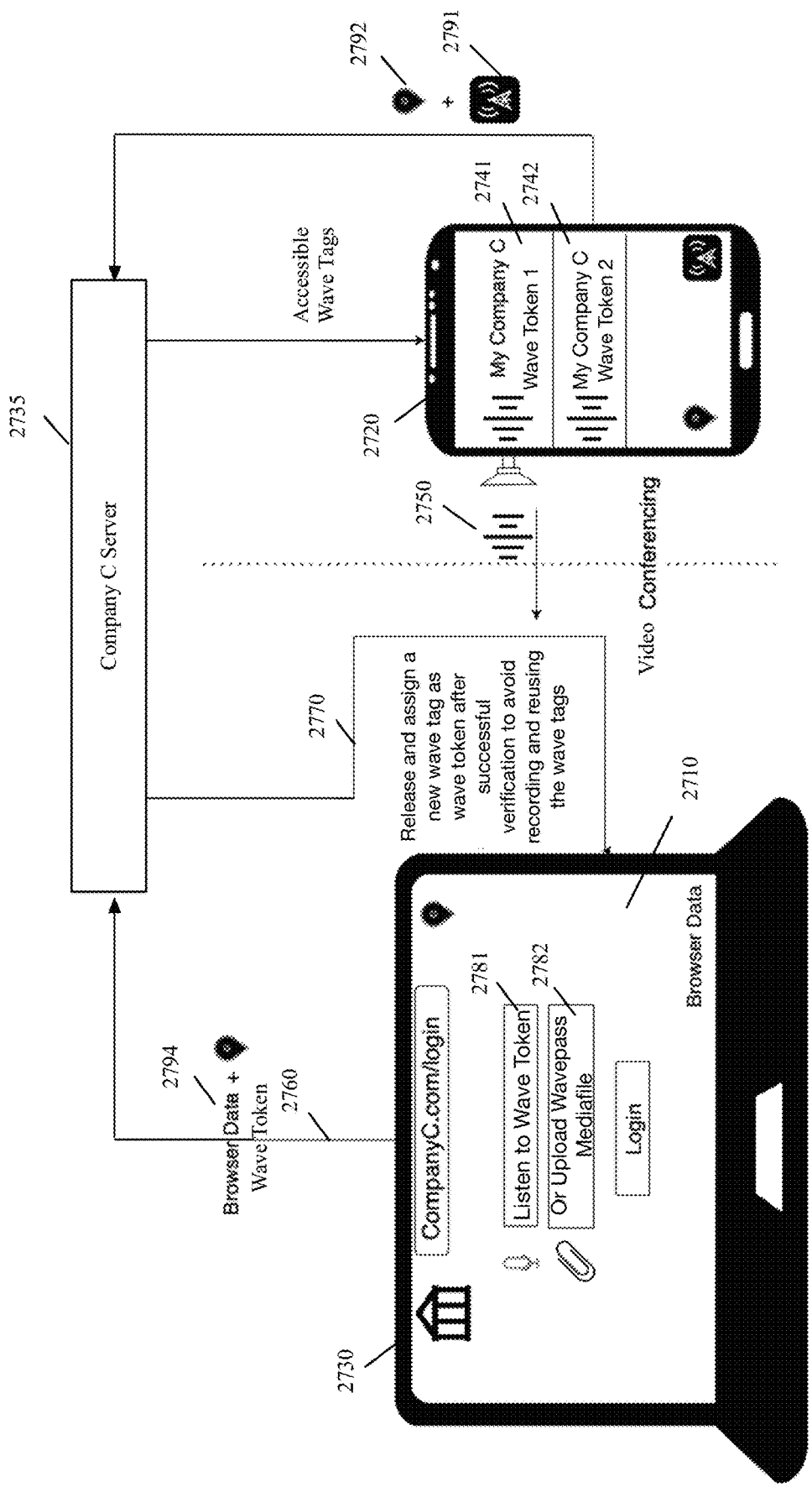
FIG. 27 is a functional diagram illustrating an example use of private wave tags, according to various aspects of the present embodiments.

Several example uses of the wave tags are described in this section. FIG. 27 is a functional diagram illustrating an example use of private wave tags, according to various aspects of the present embodiments. With reference to the example of FIG. 27, the website "companyC.com" login page 2710 may include an extra authentication process by using a private wave tag as a token, referred herein as a wave token, for the users to authenticate their devices. In this example, company C my assign unique wave tags as wave tokens to their users and may map the wave tags to specific data including, but not limited to, verification data such as carrier data 2791 or geolocation data 2792 from the authorized broadcasting or/and capturing devices to be compared later with the parameters provided by the broadcasting or/and the capturing devices involved in the authentication process.

With reference to FIG. 27, there may be a call and/or a video conference between the phone 2720 and the laptop device 2730. An employee of company C that is using the laptop 2730 may want to use a private wave tag of company C, which is assigned to the employee by the company, to be used to authenticate the employee and/or other participants to participate in the call/video conference session.

The phone 2720 may authenticate itself to a server 2735 associated with company C and may receive the private wave tags 2741-2742. The phone may broadcast (as shown by 2750) company C's private wave tag 2741 and the laptop 2730 may capture the private wave tag. The broadcast may be done by playing the wave tag, if the two devices 2720 and 2730 are nearby or may be transmitted electronically using a media file from the device 2720 to the device 2730 and played on the device 2730.

The laptop 2730 may send (as shown by 2760) the wave tag along with other verification parameters 2794, to the server 2735. The verification parameters may include the parameters related to any software or hardware on the capturer or broadcaster devices (e.g., geolocation of the device 2730, browser data such as cookies, identification of device 2730 such as Media Access Control (MAC) identification of the device 2730, etc.). If the wave tag is verified by the server 2735, the laptop's 2730 authentication is successful.

To avoid recording of the wave tag and using it in an unauthorized device, the company C server 2735 may, optionally, release the used wave tag and assign a new wave tag as a wave token (as shown by 2770) every time a wave token is used for authentication in order for the wave token to be used only once after the wave token is issued for verification. The login page 2710 may provide an option 2781 for the device 2730 to listen to the broadcasted wave token (as described above) and an option 2782 to instead upload the media file to the server 2735.

Figure 28A:
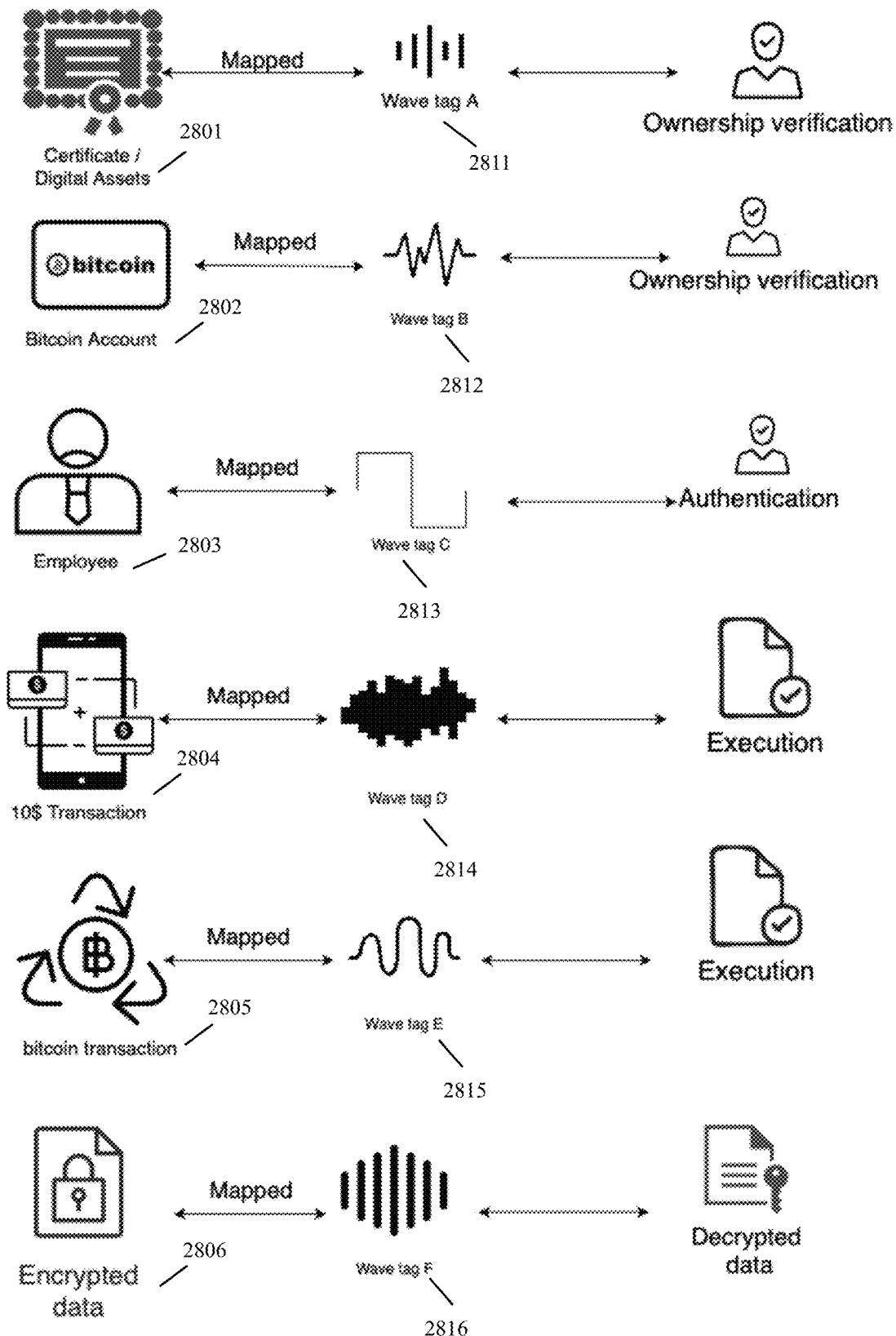
FIG. 28A is a functional diagram illustrating several examples uses of wave tags, according to various aspects of the present disclosure.

FIG. 28 is a functional diagram illustrating several examples uses of wave tags, according to various aspects of the present disclosure. The figure shows several exemplary uses of wave tags for different purposes, such as, ownership verification, authentication or one-time transaction executions, etc., are described. The wave tags 2811-2812 may be used for authentication, authorization verification, transaction clearance, etc., similar to the example described with reference to FIG. 27.

FIG. 28 shows a method of using wave tags for performing financial transaction. For example, the data identified by wave tag E 2815 may be a promotion for the receiver to transfer $10 to a specific bank account. The wave tag D 2814 may be mapped to a $10 transaction 2804 that may be executed once the wave tag D 2814 is provided. The owner of the account may deposit funds in escrow which is authorized and connected to the wave tag manager 100 and may reserve a transaction wave tag with specific amount similar to a gift card amount.

Anytime the wave tag is captured, the amount may be redeemed by the capturer device into the capturer's bank account choice. The wave tag may be a one-time use wave tag (refer to the lifecycle setting 2591 described in FIG. 25) and may be automatically released and be added back to the unassigned wave tag pool to ensure that only one transaction may happen using that wave tag.

However, the wave tag owner (e.g., the wave tag requesting device 155 of FIG. 1) may set the frequency number to allow the transaction to be done X times. For example, only the first 100 devices that captured the wave tag may be able to perform the transaction. The wave tag restrictions in private wave tags may limit the execution of the transaction to specific devices, to specific locations, or to verified affiliated device or people. Assigning wave tags for the transactions may also follow the steps described in the processes of FIG. 13-14. When requesting a wave tag for a financial transaction (e.g., as described above with reference to FIG. 11 and FIG. 13 blocks 1305-1315), the requested wave tag may be known to be a financial transaction.

Knowing that the wave tag is associated with a financial transaction, the wave tag assignment may be done such that reproducing the wave tag by non-authorized parties is less probable. The accuracy threshold for matching the captured wave patterns to the wave tag's pattern (or the wave tag's wave blocks patterns) may also be set to a high threshold. For example, using a very big pool of possible transaction wave tags (e.g., one of millions of possible wave tags), using an unpredictable and continuously changing signature generator (hash functions), or using different wave pattern generator logics described in FIG. 2A, using very unpredictable existing wave media files as described above with reference to FIG. 2B, and/or using combination of blocks generated using different approaches as described in FIG. 2A-2D may help avoiding unauthorized reproduction of the wave tags.

The transaction wave tags (or other high security wave tags) have several advantages over other wave tags of the present embodiments as well as other traditional ways of doing transactions. First, the transaction wave tags may be used as extra authentication step, for example, in a two-step authentication process, since the randomness in generating the wave blocks of the transaction wave tags makes them very good candidates for validation before the transaction is executed.

Second, in some situations, using the traditional ways of doing a transactions may not be possible. For example, radio or TV programs have no idea who the audience that listen to, or watch, their programs are at any moment. If they want to make sure the transaction is made on the audience devices in the moment in fair way at same time, in these situation wave tag might be the only option.

Third, the wave tag holder may transfer the money without even having the bank information to initiate the transaction because the wave tag may be public, and the transfer may be complete by just capturing the wave tag. The receiver may also not need to know the holder's bank information to accept the payment since the wave tag provides the funds from the screw. However, the wave tag holder may connect to the wave tag holder's account and authorize the wave tag manager 100 (FIG. 1) to withdraw from the account as alternative way.

Fourth, the transaction wave tags may provide a contactless transaction in situations (such as pandemics, epidemics, diseases or other dangerous situations), where contacts may preferably be avoided. For example, a wave tag capturing embodiment may be implemented in an automated teller machines (ATMs) or in a similar hardware and/or software in public places. The bank customers may reserve a private transaction wave tag that is only executable on the ATM hardware from bank (using interface such as the interface 1100 of FIG. 11) and may set up a desired or default amount and emit the wave tag in front of the ATM without using credit cards.

Similarly, a bitcoin transaction 2805 (e.g., transferring one or more bitcoins) may be executed once the wave tag E 2815 is provided or captured. The wave tag holder. Wave tag can be used as a private key to unlock a transaction or as one of multi-owner transactions. So, once all wave tags are captured the transaction is executed. The wave tag may send specific amount to receiver bitcoin account in similar method described for bank transactions.

With reference to FIG. 28, the owner of the bitcoin account 2802 may verify the owner's ownership using the wave tag B 2812. For example, the account owner may reserve a wave tag for their private key and anytime that the wave tag is provided, the private key may be provided. The account owner may decide to dynamically change the wave tag after each use (e.g., as described with reference to the lifecycle setting of FIG. 13) to increase security.

Memorizing the private key may almost be impossible and losing the private key and losing access to accounts is very common. Alternatively, the account holder may verify their account with the wave tag manager 100 through an interface such as the interface 1100 of FIG. 11 and in return the wave tag manager 100 may provide the wave tag (dynamic, static 2591) to allow the account holder to verify their account in similar approach described with reference to FIG. 27. Alternatively, account verification may happen by a simple encryption/decryption test by the account holder's private key so there is no need for the private key itself to be stored in the wave tag manager's 100 databases 160. Similarly, an employee 2803 may authenticate to use an organization's resource by providing the wave tag C 2813 is similar way as described with reference to FIG. 27.

With further reference to FIG. 28, an organization may use wave tags as a certificate, as a digital asset, or as an ownership verification method. For example, a person owning a certificate 2801 may verify her ownership by broadcasting or providing the wave tag A 2811. The certificate issuer may provide wave tags to be used similar to the example of FIG. 27. The wave tag may map to official certificate number or the certificate content. One implementation method is to use hash of the certificate content as signature string to create certificate so we also can verify the content to be enact and original by comparing to the signature string. In this approach we won't need to change wave tag dynamically anymore. Anyone can verify if the certificate is original by just broadcasting corresponding wave tag and see compare the content hash to signature string. Wave tags may be reserved for digital assets including but not limited to non-fungible assets like blockchain fungible tokens. Wave tags may be used to provide information about the asset through channels, such as, radio, TV and places where using printed barcodes is not efficient or is impossible. Some version of wave tag transaction 2804 may be used for transferring digital assets.

With reference to FIG. 28, the key for decrypting an encrypted data 2806 may be provided once the wave tag 2816 is captured or provided. The wave tag owner 155 or wave tag manager 100 may reserve set of wave tags (dynamic or static 2591) as decryption key holder. One implementation method is mapping the decryption key to the wave tag 2816. Anytime someone needs to read the encrypted data 2806, they have to broadcast the wave tag in order to receive the decryption key. The decryption key may be a private key used to encrypt the data. Alternatively, two different wave tags (dynamic or static 2591) may be used, one reserved for the encrypted data and one for the decryption key.

Capturing the first wave tag may bring the encrypted data and the second wave tag may decrypt the data so user may read the data. One or more wave tags may be used in the process and may create a multilevel encryption for securing the encryption. It should be noted that the present embodiments are not performing any encryption/decryption over the wave tag itself and instead mapping data of the sequence of the wave tags. This method may be used in other wave tag use cases to provide security enhancement or privacy.

The present embodiments provide a technical advantage compared to the methods that provide the decryption key without a tag. For example, radio or TV programs may want to provide information to a specific part of their audience. They may, broadcast the wave tags which are mapped to an encrypted data. The audience with access to the decryption key which is itself a mapping data for other wave tag may use the key to see the decrypted information. Alternatively, the radio or TV programs may provide some encrypted content online and, during the program, they may broadcast a wave tag with the decryption key in order to decrypt and show the encrypted content. This use case may also be used in combination with other use cases, including but not limited to, the transaction wave tags or wave tags mapped to the sensitive or private data.

With reference to FIG. 28, any of the method and use cases mentioned in the diagram may be used in combination and by using a sequence of wave tags. For example, one or more decryption 2816 wave tags may be used before the ownership verification 2811 or the transaction execution 2804 use cases. As another example, an ownership verification 2811 wave tag may be used before a transaction execution 2804 wave tag. an important technical advantage the disclosed methods is that the data is independent of the wave tag itself and the methods do not use any kind of encryption or decryption on the wave tags themselves.

Figure 28B:
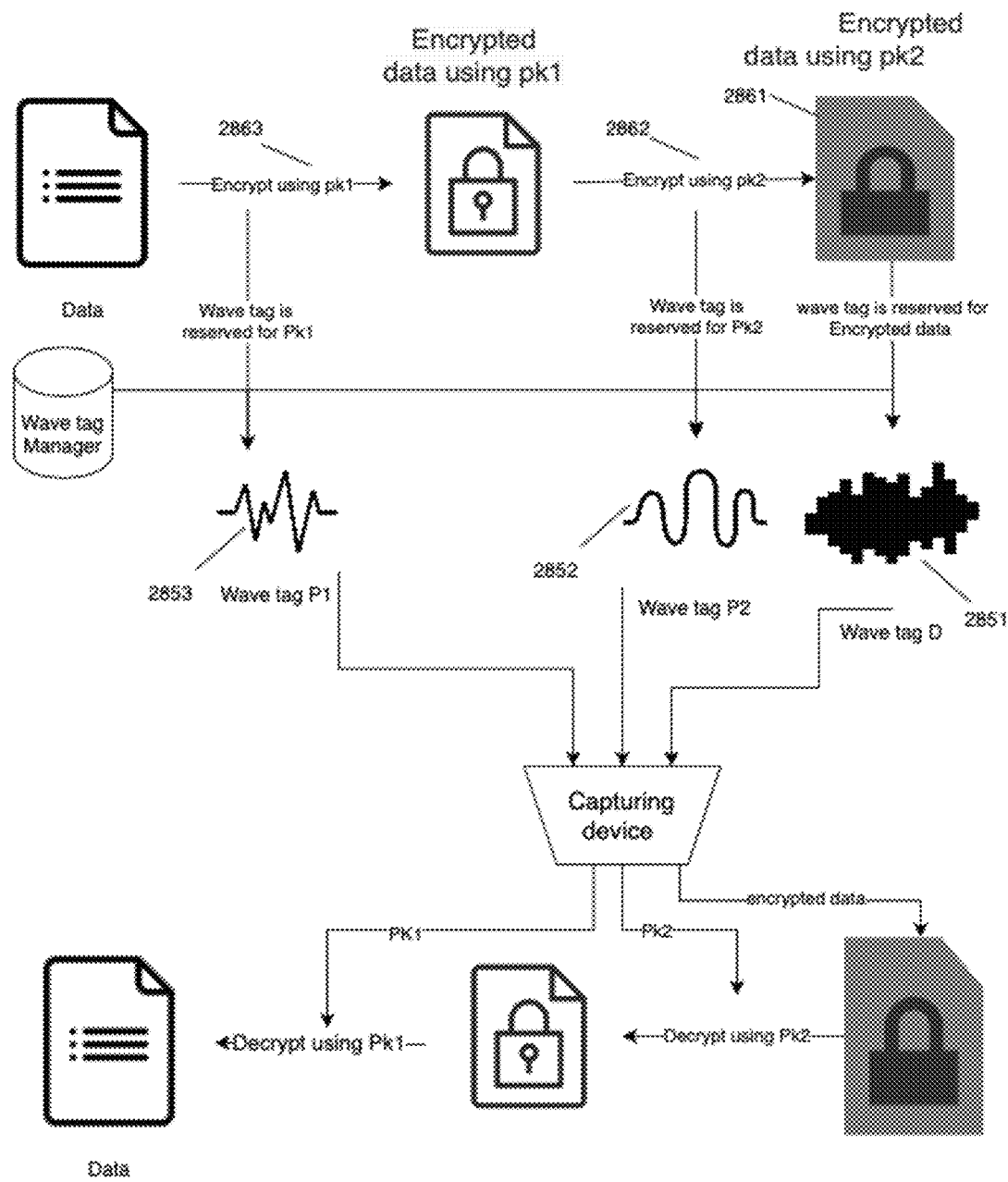
FIG. 28B is a functional diagram illustrating an example uses of wave tags, according to various aspects of the present disclosure.

FIG. 28B is a functional diagram illustrating an example use of encryption and decryption using wave tags for a two-level encryption and decryption of data, according to various aspects of the present disclosure. The example of FIG. 28B shows the way wave tag 2851 may be used to broadcast a two-level encrypted data 2861, first by using the encryption key Pk1 2863 and second by using the encryption key Pk2 2862 as mapping data using 2851 and in the other hand, decrypt the encrypted data by capturing sequence of wave tags 2852 and 2853 that are mapped to the encryption keys (2862 and 2863 respectfully). For an N-level encryption a set of N+1 wave tags may be used, N wave tags for the encryption keys and one wave tag for the encrypted data. Some embodiments may perform encryption and decryption using algorithms, such as, for example, and without limitations, RSA (Rivest-Shamir-Adleman). Encryption keys used in the RSA algorithm are (public, private) key pairs.

Figure 29:
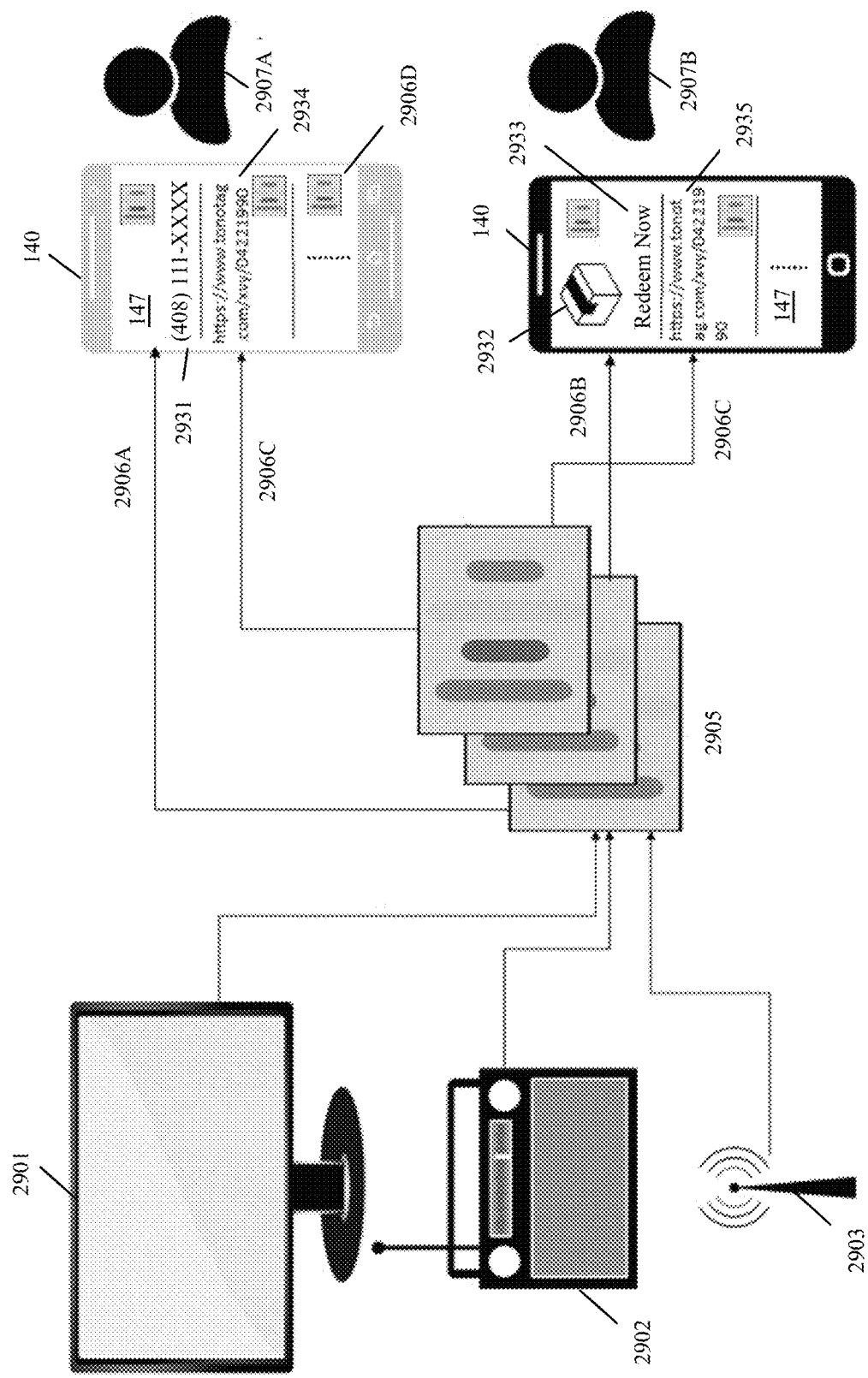
FIG. 29 is a functional diagram illustrating an example process of generating and capturing of the wave tags, according to various aspects of the present disclosure.

FIG. 29 is a functional diagram illustrating an example process of generating and capturing of the wave tags, according to various aspects of the present disclosure. The example of FIG. 29 shows the generation and use of the sound tags. The sound tags are highly applicable for radio stations and radio programs. The radio stations 2903 communicate with their audience through sounds and audio. Among the usual radio programs, there are audio storytelling, music playing, audio talk shows, etc. There are a variety of special topic radio stations, such as, religion-based or scientific-based radio programs.

Including among these programs, there may be radio advertisements. Radios 2902 are great ways to communicate and broadcast different kind of information among a wide range of audience since people usually spend considerable part of their daily time driving or using public transportation. In addition, there are many places in which the main communication channel with the population is by using radio or audio-based communication.

Obviously, identifiers such as 1-D barcodes or 2-D barcodes (e.g., QR codes) or any other type of printable product identifier codes do not work in audio communications. All of the existing standardized codes are in printed format and need to be scanned at least once by using an optical code reader. This limitation prevents radio stations to interact with their audience efficiently and in a two-way format.

Using the wave tags of the present embodiments, the radio stations may receive or and/or may generate different types of audio (or acoustic) wave tags 2905 to interact with their audience. In some embodiments, the radio station may be the wave tag generator. For example, the wave tag manager 100 (FIG. 1) of some embodiments may provide the software and/or the data required for generating wave tags to the radio station along a user interface, such as the user interface 2500 of FIG. 25 to allow the radio station to create, customize, and/or manage the associated wave tags.

The audience 2907A-2907B may setup their wave tag capturing devices 140 to listen and capture sound wave blocks and identify the associated wave tags, for example, as described above with reference to FIGS. 19-21. The identified wave tags 2905 may be displayed (as shown by 2906A, 2906B, and 2906C) on a UI 147. Each wave tag may identify the item it is represents on the UI 147. Selecting each display item associated with a wave tag may trigger another action 2933, activity 2931, and/or services.

Examples of the important data items that may be identified by the wave tags in radio station programs may include, for example, and without limitations, URLs 2934-2935, phone numbers 2931, addresses, products 2932, services, promotions, barcode and QR codes, etc. The item associated with a sound tag may be an item internal to a private or public organization such that all or part of the audience would understand what the item is (2906A for 2907A and 2906B for 2907B). The sound tags may be used as ports to give the audience more information or showing the specific interfaces so that they may ask audience to input or initiate some kind of tasks, activities.

When the radio is on and the program is on air, the current program may also broadcast related or non-related sound tags in order for the audience sound tag capturing devices 140 to capture the sound tags and display the additional information, to initiate some tasks, and/or to provide required information for the playing radio programs. The sound tags may, therefore, provide a full two-way communication between the radio program and may enable the listeners to receive additional information and/or to perform additional activities in addition to listening to the radio program.

Some embodiments may enable the audience to capture the sound tags for later use, for example to check the item associated with the sound tags at the right time and/or at the right place (2906D). The audience may, therefore, be still connected to the radio program after the program ends.

TV programs may also be able to use sound tags as well as light tags with the same mechanism. The use cases for TVs 2901 may be similar to the radio uses cases described above or may be different applications.

Sound tags may provide unique ways for radio marketing, referred herein as interactive radio marketing. The followings are some non-limiting examples of the characteristics of the interactive radio marketing. The sound tags are non-printed code that may be captured by the audience's capturing devices and provide additional information to the audience while the radio program continues. The audience may be able to use the user interface on their capturing devices and/or other electronic devices to get information about products and services, buy or pre-order products or service either while the radio program is being broadcasted or afterwards.

The sound tags enable the possibility of triggering the inquiry or the purchasing of products or services immediately after capturing the corresponding sound tags. The action triggered by sound tags may allow the audience to subscribe to products or services identified by the sound tags.

Figure 30:
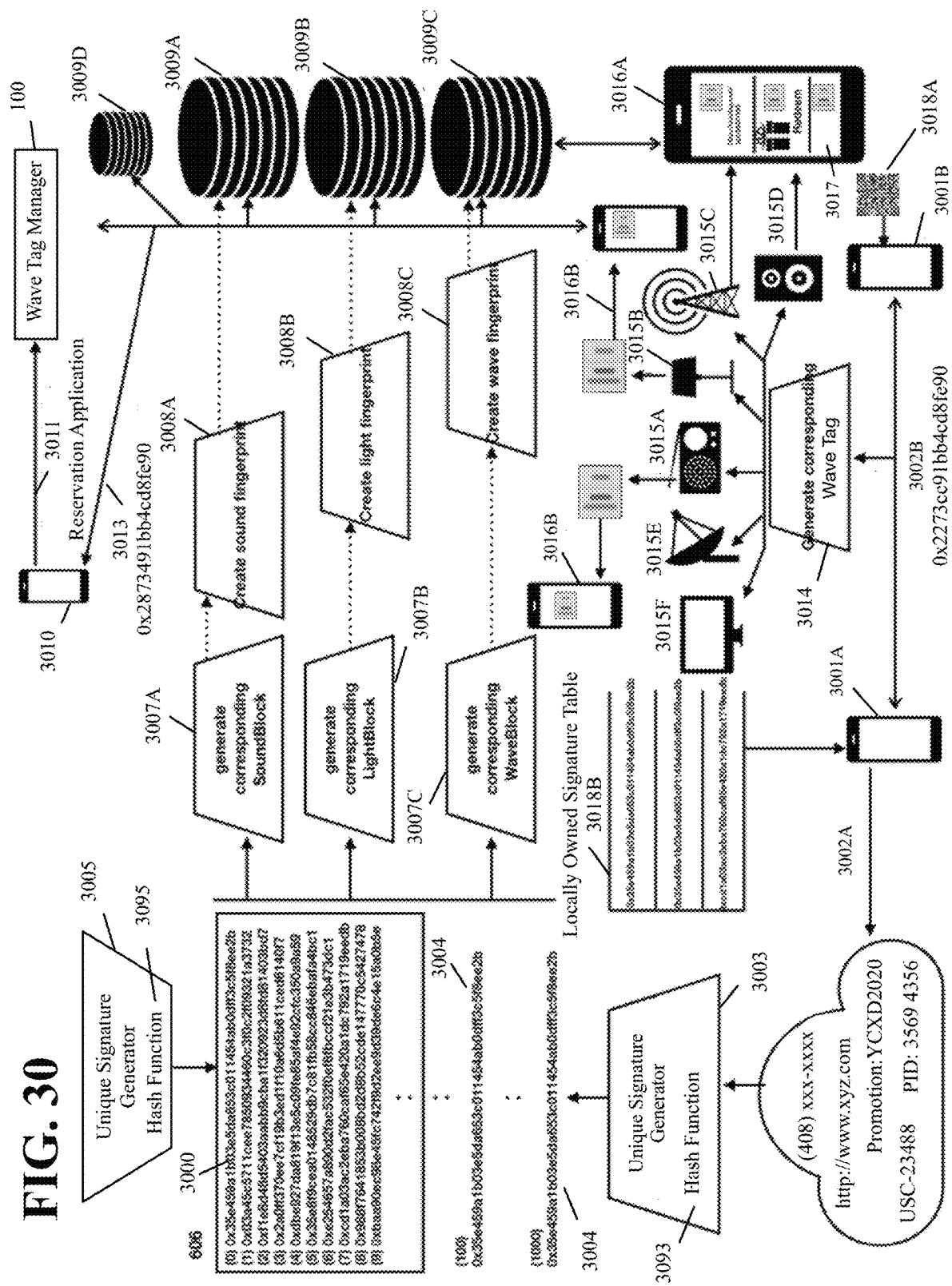
FIG. 30 illustrates a functional diagram showing the life cycle of wave tags, according to various aspects of the present disclosure.

FIG. 30 illustrates a functional diagram showing the life cycle of wave tags, according to various aspects of the present disclosure. In the example of FIG. 30, the non-printed synthesized wave tags may be generated using the method described above with reference to FIG. 2A. For example, the unique signatures may be unique strings, such as for example, and without limitations, hexadecimal code 3000 or the like, which may have a predefined length a customized length. The unique signatures 3000 may be used to generate wave blocks that are used to create wave tags. The unique signatures 3000 do not have any relationship to the data entities that may be identified by the resulting wave tags.

The unique signature string 3000 may be created as hexadecimal codes by one or more hash functions. The unique signature 3000 may be used as the foundation for building wave blocks as described above with reference to FIG. 2A. The unique signatures contribute to generating unique identifiable non-printed synthesized wave tags to identify different items. The unique signatures, in this example the hexadecimal signatures 3000, may be input to wave block generators 3007A-3007C to generate the corresponding unique wave blocks such as, sound blocks for generating sound tags, light blocks for generating light tags, and wave blocks for generating other types of wave tags (e.g., microwave tags, ultrasound wave tags, etc.).

The unique signatures may be created in several different ways. For example, and without limitations, unique signatures may be created using a hash function 3005. The unique signature generator 3005 may use a hash function 3095 may generate unique strings 3000 that may be used to generate wave blocks. The wave blocks may be used at a later time to be assigned to, and used in, wave tags.

Alternatively, the unique signatures 3000 may be created by hashing any unique data in the real world, for example, a university ID, a website link such as a URL, a promotion code, or a phone number through a signature block generator 3003 that may include a hash function 3093, using the unique data in the real world to corresponding hexadecimal values 3004 with a unique signature. The signature generator 3003 may use different parameters to create highly distinguishable signatures 3004 which may reduce the rate of collision to the least. In this approach, if the real world data belong to a particular entity, the resulting unique signature may or may not be used to generate wave blocks to be assigned to the particular entity.

It should be noted that the result of hash functions are not reversible. Therefore, when a unique data, such as, a phone number, a URL, etc., is used by a hash function to generate a hashed string, the resulting hashed string is not reversible into the original unique data. The present embodiments may use the hashed strings to generate wave blocks and to build wave tags that are then used to map to different data items.

Figure 31:
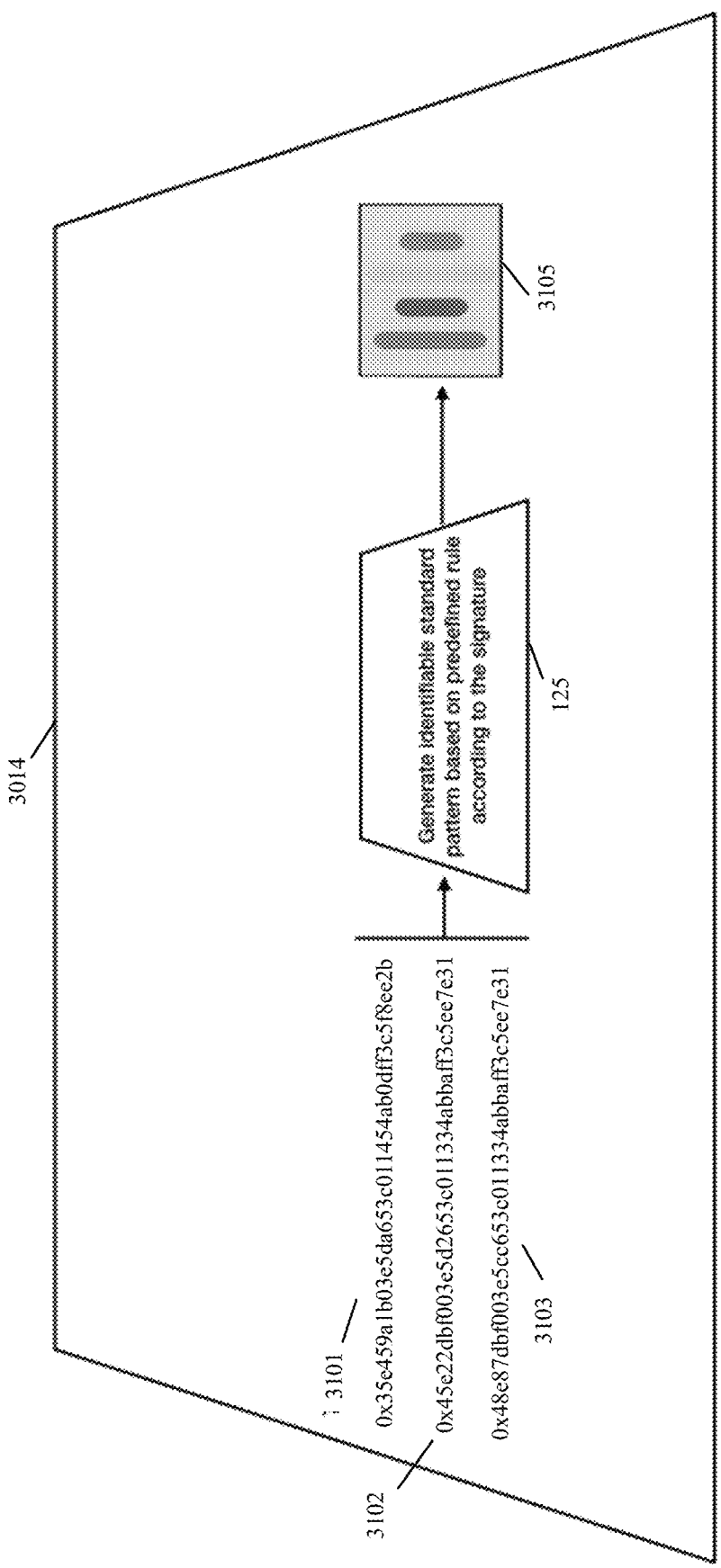
FIG. 31 is a functional diagram illustrating an example embodiment of the wave tag generator of FIG. 30.

The input (hexadecimal signatures) passed to one or any of sound, light, and wave block generators 3007A-3007C may be the same, which may generate their corresponding sound, light and wave respectively based on a set of rules, for example as described with reference to FIGS. 10A and 31. After the generation of sound wave blocks, light wave blocks, and other types of wave blocks, they wave blocks may be passed to a fingerprinting function, namely the sound fingerprinting function 3008A, the light fingerprinting function 3008B, and the other type of wave fingerprinting function 3008C, which may extract the unique features and characteristics of the wave blocks and may record the sound fingerprints in the sound fingerprint database 3009A, the light fingerprints in the light fingerprint database 3009B, and the other wave fingerprints in the other wave fingerprint database 3009C.

With further reference to FIG. 30, the data regarding each group of wave blocks and wave tags (e.g., sound tags, light tags, etc.) may be stored in different databases and may have different interpretation or use cases in their group. Another database 3009D may be maintained to store the records of permissions, type of application, relating signatures, etc.

Any entity 3010, such as an organization or a person, may submit a request to receive one or more wave tags to be used unique non-printed synthesized identifier for identifying items. The requester 3010 may apply for a reserved space of signatures. A reservation application 3011 (e.g., as described above with reference to FIG. 11) may assign one or more unique wave blocks, or reserve a set of signaling wave blocks for the applicant usage, which is specifically used for applicant's entities.

There may be other parameters along with the reservation application. For example, access policy, interpretation parameters, the expiry dates for the wave tags or the signatures, sharing policy, the forms of the wave tags (e.g., light/sound/other type of wave), and/or reserved hash functions. Reservation response may include the wave tag signatures 3013 assigned to the applicant 3010 along with possible parameters that may be stored in a locally owned signature table 3018B or the wave tag media files.

The wave tag broadcasters 3001A and 3001B may able to generate wave tags according to their accessible signatures 3002B or by requesting (as shown by 3002A) directly or indirectly to have their desired signatures. For example, the broadcaster 3001A may be able to generate any of its wave tags according to its local signature table 3018B or directly sending request for signature and generating the corresponding wave tags. A broadcaster, such as 3001B may have access to barcodes or QR codes 3018A containing a hexadecimal signature and may generate the non-printed synthesized identifier using the wave tag generator 3014.

Signatures may be shared freely or according to their sharing policy among broadcasters. The generated wave tags may be broadcasted through one or more media or device such as radios 3015A, radio stations, televisions 3015F, light sources 3015B, speakers 3015D, signal transmitters 3015C, satellites 3015E, etc. Every device in an emitting wave tag's coverage, may receive the wave tag. However not all receiving devices may extract the item identified by the wave tag, unless the wave tag is a public wave tag.

A public wave tag is a wave tag that may be detected by any device, whereas a private wave tag, may be detected in receiver who knows its trigger (e.g., a signaling wave block trigger 3016B). A wave tag emitted through a radio receiver 3015A or a speaker 3015D, in this case a sound wave tag, may be received by a device with a sound receiver 3016B. A light tag emitted by a light source, a conventional lamp or alike may be received by a device with a light receiver, and other types of wave tags emitted with a signal or wave generator 3015C may be received by any device with a corresponding wave or signal receiver. The devices 3016A that receive the wave tags may map the wave tags to their corresponding entities either directly 3016B or by querying the wave tag databases 3009A, 3009B, 3009C, and/or 3009D and may recognize the items that the wave tags represent and list the received wave tags and their interpretation in an interface 3017.

The wave tag generator 3014 may deal with at least three main signatures, trigger signature (for start signaling wave blocks), body signature (for body wave blocks) and terminator signature (for end signaling wave blocks). There may be verity of signatures representing different triggers or terminators. FIG. 31 is a functional diagram illustrating an example embodiment of the wave tag generator of FIG. 30. With reference to FIG. 31, a wave tag 3105 is a synthesized identifier pattern that may be created by inputting three signatures in a sequence preferably trigger 3101, body 3102, and terminator 3103 signatures into the wave block generator 125, which may generate the wave tag's 3105 pattern based on predefined rule and according to the input signature (e.g., example by using different note or frequency). In addition, there may be some timing signatures and one or more body signatures (e.g., as described above with reference to FIG. 8B).

Figure 32:
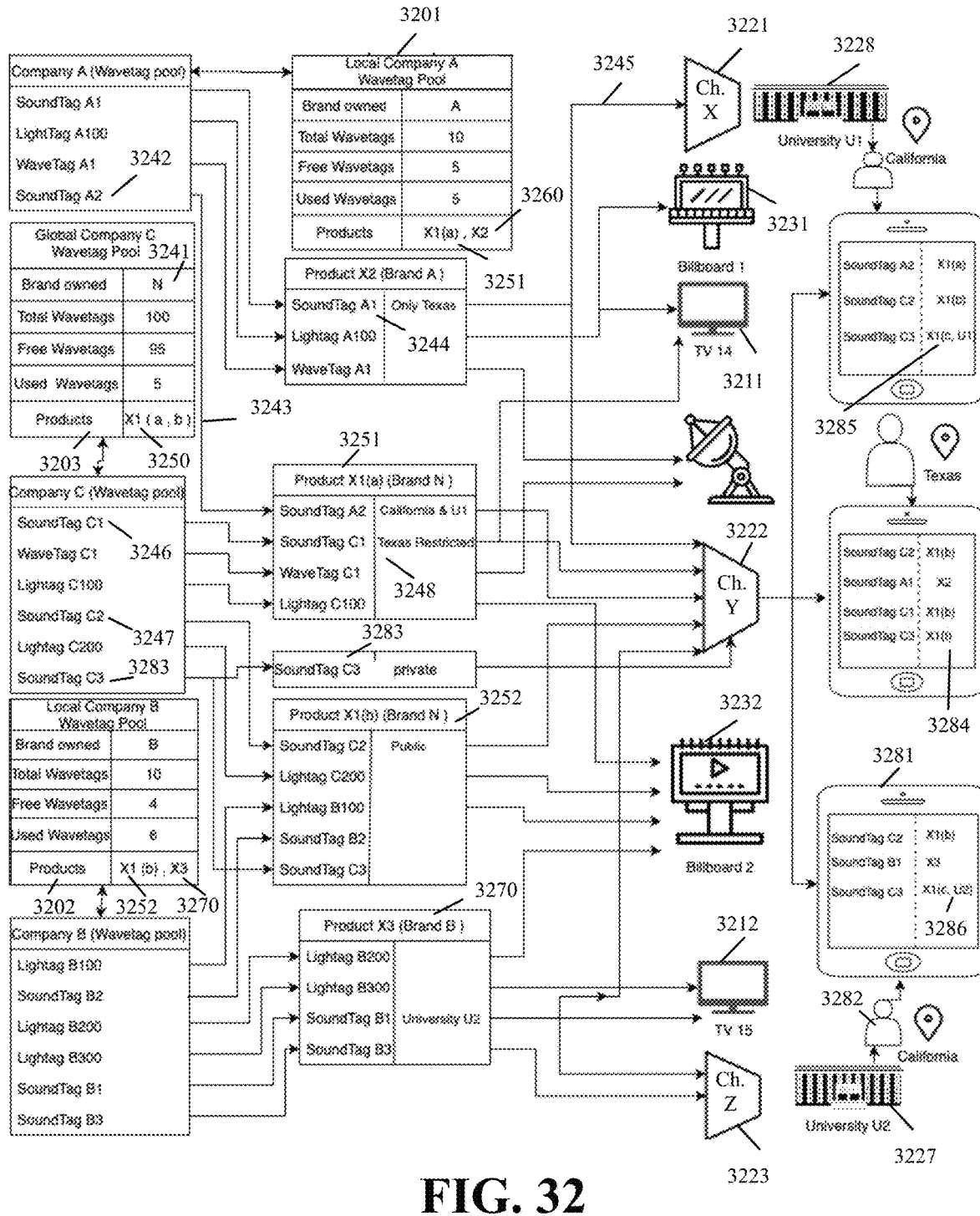
FIG. 32 is a functional diagram illustrating an exemplary process of assigning and using wave tags, according to various aspects of the present disclosure.

FIG. 32 is a functional diagram illustrating an exemplary process of assigning and using wave tags, according to various aspects of the present disclosure. With reference to FIG. 32, company C 3203 may be a global company owning the brand N 3241 and may offer well-known products or services globally for example product X1 3250. There may also be many local companies such as company A 3201 and company B 2902 that are selling company C's products or services separately. Company A 3201 and company B 3202 may be two separate local companies with different company information, such as, phone, address, website, products, and/or services. Company A and company B may have exclusive range of products and/or services for their business (e.g., product X2 3260 for company A, product X3 3270 for company B). Both company A and company B may offer some products or services produced by company C, such as, product X1 3250. For example, product X1 (a) 3251 is product X1 listed on company A's website and product X1(b) 3252 is product X1 listed on company B's website). Company A 3201 may be planning to promote their products through channel X 3221 and channel Y 3222 radio stations along with channel 14 TV station 3211 located in California area. Company B may be planning to promote their products through channel Y 3222 and channel Z 3223 radio stations and Channel 15 TV station 3212 located in Texas area.

Company C 3203 may be planning to promote their products and services and their brand N 3241 globally across various international radio, TV or billboards. Company C may use the wave tag manager 100 (FIG. 1) of the present embodiments to request 100 sound, light, and one other type of wave (e.g., ultrasound) tags for each one of their current or future products or services. Since company C 3203 is a global brand, they would request 50 public and 50 private (or restricted) wave tags representing entities in their business including products, services, company information, promotions, coupons, redemption links, and/or their brand name.

The wave tag manager 100 (FIG. 1) may assign 100 unassigned wave tags or generate new unique wave tags on demand for company C 3203. Company C or wave tag manager 100 (FIG. 1) may map some of the reserved wave tags for current usages and may leave the rest of the wave tags for future uses. In case a specific entity in company C is discontinued, they may easily release the corresponding wave tag and may assign the wave tag to a different entity in company C 3203 using an interface such as the interface 2500 of FIG. 25.

Wave tags may be defined to have expiration time and may be put back in the wave tag pool to be assigned to different entities when company C reserves them for short-term purposes. The wave tag manager 100 may also dedicate all tags with specific start or end signaling wave blocks to specific company so any tag that starts and/or ends with a specific pattern may indicate the company owning the tags (as described above with reference to FIG. 9).

After reserving tags and assigning them to the entities in their business, for example, sound tag A2 3242 may be assigned to (assignment is shown by arrows such as 3243) product X1 listed on company A's website (represented with X1(a) 3251), the companies may be able to broadcast the appropriate wave tags anytime through appropriate channel or media. For example, company C 3203 may use their tags in their radio, TV or billboard advertisements. For example, sound tag A1 3244 may be broadcasted (3245) in the Texas area radio station channels, such as, channel X 3221. Any radio or TV channel playing the advertisement may also broadcast the wave tags and the audiences' reading devices may capture the wave tags and may find the corresponding entities that have been assigned to the wave tags. The radio or TV stations may also broadcast the sound tags on demand using audio files (as described above with reference to FIG. 16) or broadcast it using application or website on demand (as described above with reference to FIG. 15).

In digital billboards, such as the billboard 2 (item 3232), a recorded video of a light tag may be played or the light tag pattern may be generated in real-time using LED or video visual scenes. In this case, there may be mixed nature tags (e.g., light only, sound only, a mix of sound and light wave blocks, etc.) broadcasted through LED and recorded video. In non-digital billboards, such as billboard 1 (item 3231), a LED on-off sequences may be played representing the light tag.

Company A 3201 and company B 3202 are local business using company C 3203 products or services (3250) may use company C's wave tags in their own promotions (sound tag C1 3246, sound tag C2 3247, etc.). However, if company A wants to have exclusive tag representing the same product X1 3250, they may request a new tag for the same product (sound tag A2 3242) that is only valid for product X1 3250 listed on company A (X1(a) 3251) and not valid for product X1 listed on company B (X1(b)). Accordingly, different waves tags may be for the same entity.

Company C 3203 may request some private or restricted tags, for example a promotion or coupon on X1(a) 3251 only in Texas (sound tag C1 3248), in this case, wave tags only map to their entity only if the wave tags are captured and/or broadcasted in Texas. The same tag (sound tag C1 3248) if broadcasted in California may return nothing. It is possible to verify the restrictions based on the parameters being sent along with the captured wave tag. These parameters may include, for example, and without limitations, email address, phone carrier, location, tag broadcaster, capturer device's related software or hardware parameters, etc. The starting and/or the ending signaling wave blocks in a wave tag may also be used in the verification process. Company B 3202 may have a student benefit or may offer product, services, or entities that are only accessible to university U2 3227 students. In this case, company B 3202 may also request private tags to represent these entities. For example, sound tag B1 3249 may be a private sound tag for verified affiliated devices 3281 or people 3282 to University U2 3227.

An easy way to apply the restrictions on the wave tags is to require the listener devices and/or the broadcaster devices to verify their identification or provide the required credentials before processing the mapping from the wave tag to the mapped entity. For example, a verified university email address 'joe@u2.edu' used in the capturer embodiment may be used to determine whether the listener is part of university U2 3227 or not. However, the authentication process may be done in other ways, such as, using phone carriers identification or hardware identification (as described above with reference to FIG. 27).

Company C may use the same wave tag 3283 to represent different entities. For example. sound tag C3 3283 may show different data for X1 when listed in California, show another data when listed in Texas (represented by X1(t) 3284) and show a customized promotion for X1 when listed in California for students of U1 (represented by X1(c, U1) 3285), and another customized promotion when listed in Texas for students of U2 ((represented by X1(t, U2) 3286), etc.) as multiple private tags for the two companies A and B. Company C may be using a sound tag C3 3283 for a book promotion in radio, sound tag C3 3283 may map to either a California tourist guidebook for university U2 students X1(c, U2) 3286 or a Texas tourist guidebook X1(t) 3284 based on the related broadcasting or/and capturing device parameters. FIG. 32 also shows different entities based on the authenticated user who uses the capturer embodiment. For example, if there are two capturing devices using verified email address for two different university U1 3228 and U2 3227, the wave tag may show different entities (e.g., different promotions) based on the university. The wave tags may show different customized data for X1(c,U1) and X1(c,U2) as mentioned above.

When company C 3203 is asking for tags, they may provide more information regarding the company itself and the mapping entities. The wave tag generator may use the information and may decide which tag to assign or how to generate new wave tags according to the entity information (e.g., as shown in table 1000 table in FIG. 10). The wave tag may use specific signaling blocks including the start and end signals for each case based on the provided information. For example, if the entities are unique themselves, such as, URLs, barcodes, emails, university IDs, and other unique entities, the wave tag may use specific start and/or end signaling wave blocks for each of these types of unique identifications.

Therefore, when a wave tag with 'barcode specific starting block' is captured, the capturer would know the wave tag is a barcode and may treat the mapping data as barcode and may show the product corresponding to that barcode instead of the barcode number itself (i.e., one extra level of mapping may be done). In addition, the encoded barcode may be used as a unique identifier data itself along with the signaling blocks so it is possible to just locate and possibly decode or decipher the data as what signaling block conveys in the receiver without asking for mapping data or decoding the wave tag itself (as shown in FIG. 24B, block 2485) since the mapped data is the same as the decoded data and may be extracted in other ways.

It may be possible to reserve a specific signaling block for short data type tags (FIG. 24B, block 2480). The short Data is when a company wants to map a short data to itself, for example, company C may ask for a wave tag for their brand name N. The brand N may be encoded as a body wave block and may be placed between the signaling blocks. When the short data signaling wave block is captured, the capturer recognizes it as a short data. The capturer, therefore, may treat the rest of the wave blocks as encoded short data and may locate and decode data from the content and context accordingly. However, all type of data regardless of their nature or purpose whether a unique identification, short data, or other types may be treated same way and may be randomly assigned to unassigned tags in a pool of wave tags (FIG. 24, block 2460).

Wave tags may be made of multiple blocks of wave blocks including starting and ending signaling wave blocks with possible wave blocks between them. The wave tag assignment may, therefore, be based on predefined rules or standards. For example, wave tag assignment from the wave tag pool may consider the owner, the mapping entity, the purpose, and the method of use to pick the proper wave tag from the pool instead of randomly picking one. In other words, each wave block in a wave tag may specify something about the wave tag. For example, dedicating different starting wave blocks to different companies or different types of entities so that the capturer devices may recognize the owner of the wave tag, or the mapping data type, just by looking at the first signaling unit of the wave tag. All wave tags assigned to company C 3203 may start with the same starting signaling wave block and the wave tags assigned to another company, such as company D, may start with another starting signaling wave block (as described above with reference to FIG. 9). However, the wave tag assignment may be done in a completely random way.

As mentioned above, wave tags are made of multiple blocks of pattern including starting and ending signaling wave blocks and possible wave blocks between them. These wave block units also enable company C 3203 or the wave tag manager 100 (FIG. 1) to assign their reserved tags by predefined rules. For example, for products in the company they may use wave tags with the same starting wave blocks or in case there are more than one wave block in the middle (B1 813 and B2 814 schema in FIG. 8A), or using the same second wave blocks (S2 833 schema in FIG. 8B) and so on. In this case, the capturer may recognize that the wave tag is a product and may interpret it as a product (as described above with reference to FIG. 10).

Company C 3203 may use reserved or generated wave tags in a customized format for many use cases including, but not limited to, using them in different contexts. Sometime company C 3203 may be trying to somehow blend the wave tag into the main content or use the content to generate their wave tags. For example, tag A2 3242 may be used as part of an advertisement or in background of the main content implicitly (the wave blocks may be created using method in FIG. 26). On the other hand, the user of the capturing device may easily distinguish wave tag from the content (it sounds differently) anytime even without extracting and capturing it. However, to see the mapping entity (i.e., what the wave tag means), they have to be recognized and captured by the capturer. The capturer may list any tag broadcasted during the advertisement including those in the background (implicit) or distinguishable wave tags (explicit). The implicit wave tags may be, for example, a small part of the background music (FIG. 26) so that it is difficult or impossible for the user of the capturing device to distinguish it from the main content unless the capturer is on and lists the wave tag. The light tag may be implicitly broadcasted as part of background light pattern.

The wave tag may be used as non-printed version of a barcode or QR code. If company C 2403 has requested a wave tag to be broadcasted implicitly in the targeted context, the wave tag generator may generate, broadcast, or use the wave tag based on the context in which the wave tag may be used or may use a custom tag to hide tag in the context.

For example, a small part of the background music may be used as the wave tag mapping to a different entity. Company C 2403 may send the advertisement itself along with their wave tag request and the mapping entity (as described above with reference to FIG. 11) to the wave tag manager 100. Let's assume the wave tag generator picks a three seconds part of the advertisement as public, or private sound tag and map the entity to the requested entity. However, an explicit sound tag may still be generated for the same entity. Multiple customized tags may be needed for different context for the same product X1 3250.

The same approach for light tag or other types of wave tag may be used. For example, a particular part of the main light pattern or video may be used as a wave tag representing a specific entity. For implicit wave tags that are not sound or light tags, a specific wavelength in background may be used to generate the wave tags. For example, the wave tags may be used by a radio station as a small duration of frequency change pattern.

The capturer device may keep all or part of the mapping table and the required mapping functions encrypted or as plain data and sometime mapping function locally so that the capturing device may do the mapping without accessing the database or the remote server as shown in 33.

Figure 33:
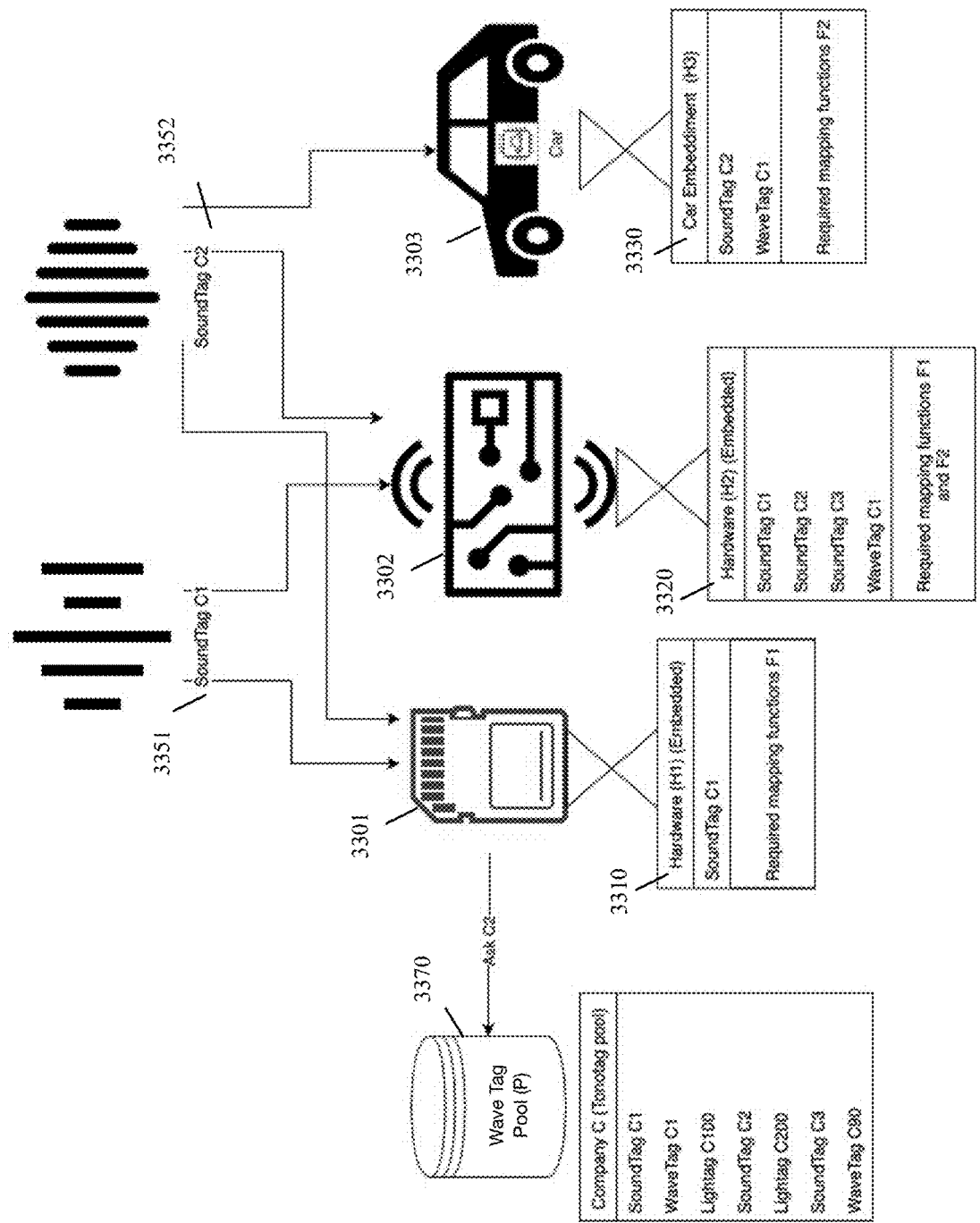
FIG. 33 is a functional diagram illustrating an example embodiments where a portion of the wave tags to the corresponding data items may be kept at the local capturing devices, according to various aspects of the present disclosure.

FIG. 33 is a functional diagram illustrating an example embodiments where a portion of the wave tags to the corresponding data items may be kept at the local capturing devices, according to various aspects of the present disclosure. With reference to FIG. 33, the sound tags 3351-3352 are broadcasted to the capturing devices 3301-3323. Each capturing device 3301-3323 may have a corresponding local table 3310-3330 that may map wave tags to the data items identified by the wave tags. The capturing devices 3301-3322 may recognize the wave tag C1 3351. The capturing devices 3301-3322 may first check their corresponding local table H1 3310 or H2 3320. If the wave tag C1 3340 is found in the corresponding local table, the wave tag C1 is used to find the data item in the local table and to return the mapping data.

Otherwise, If the wave tag C1 3340 is not found in the corresponding local table, the capturing device may request (or may perform) a search in the global mapping table 3370 maintained at a remote server until the mapping record is successfully found. An organization, such as company C, may keep all or part of reserved tags on their servers or on their capturing devices. This enables the capturing devices to process the mapping offline and without accessing the remote servers and the remote databases.

Company C may be provided a hardware loaded with the information required to recognize the captured wave tag or broadcast their reserved tags (3018B, 3016B, 3001A in FIG. 30). The hardware may be a USB, a chip, or any piece of accessory loaded with part or all of the mapping table, the mapping function, and the required parameters.

The hardware may function as an authentication embodiment, a capturer embodiment, a generator embodiment, or a combination thereof on a device such that the public, private tags may be used locally. For example, authentication embodiment may restrict the recognition of the captured private tags or the ability to broadcast specific tags. As mentioned above, the company may also be provided with a client software on a device. The Hardware or software embodiments may be restricted to be installed on one or multiple devices. In the case of wave tag, the receiver may automatically capture while receiving signals, for example the capturer may be an embodiment in the car (e.g., the item H3 3303 of FIG. 33) which may capture all wave tags broadcasted through the radio signals or specific frequency.

Figure 34:
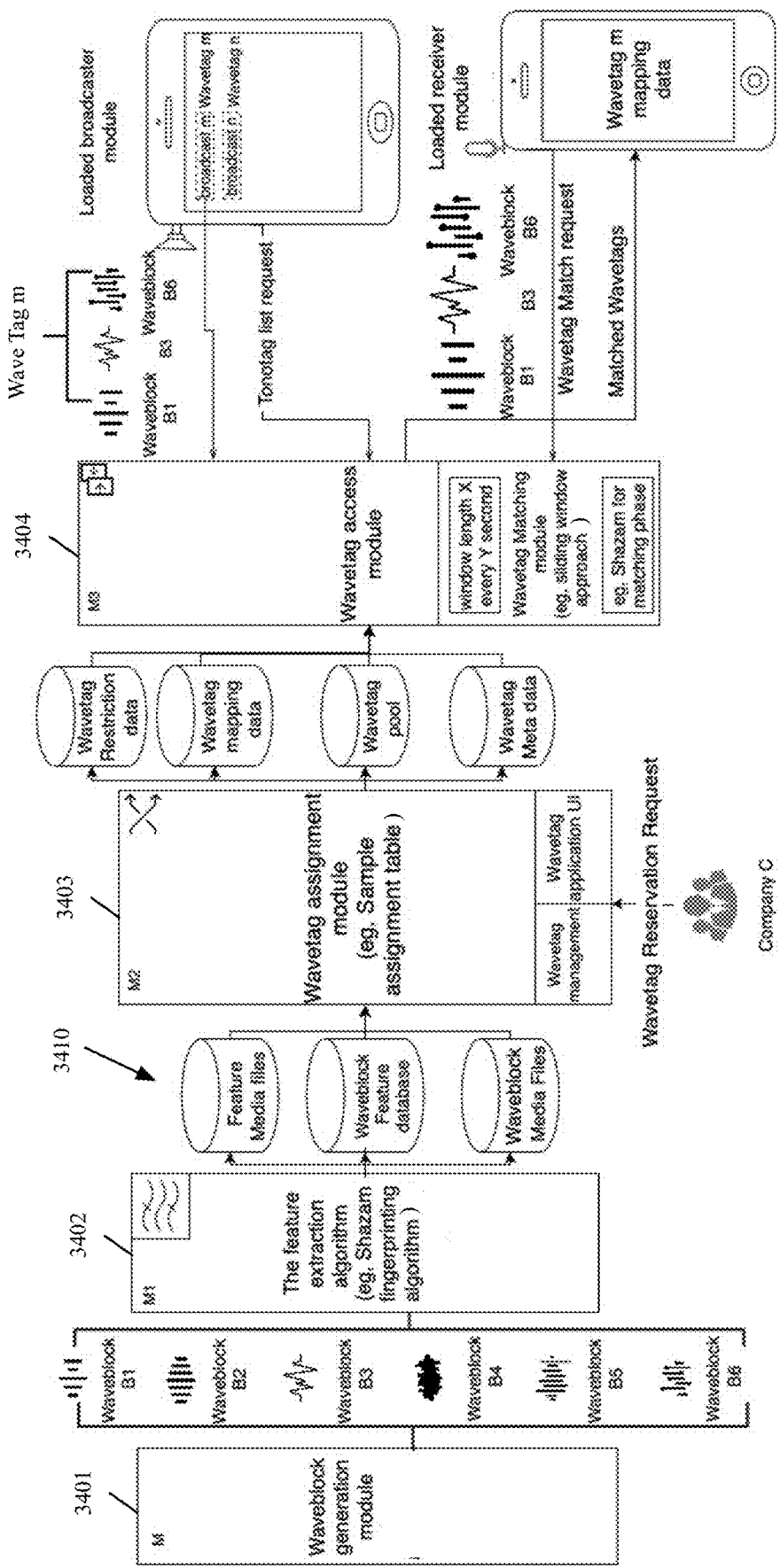
FIG. 34 is a functional diagram illustrating alternative approaches for implementing different aspects of the present embodiments.

FIG. 34 is a functional diagram illustrating alternative approaches for implementing different aspects of the present embodiments. The wave tags are artificial sound, light, or other types of wave patterns that the present embodiments generate in a way that each wave tag is distinctive from the other wave tags. Some embodiments may include four main components that may be implemented in alternative ways (wave tag generation module M 3401, feature extraction module M1 3402, wave tag assignment module M2 3403, and wave tag access module 3404).

For example, wave tags may be generated in possible alternative ways (module M 3401) as long as they may be distinctive enough from the existing wave tags (Module M1 3402). Fingerprints 3410 of sound, video or any appropriate file may be used to compare them with the fingerprint of the existing wave tags. Fingerprint of a media file may be some records in a database, a video, images, or a text file generated after analyzing the sound or video and representing the sound or video using the characteristics of the signals including frequency, notes.

Other feature extraction methods may be used, including machine learning algorithms to find the match in wave tag database or adding new wave tags into the existing wave block pool. For module M2 3403, different logics may be used for the assignment of wave blocks in the wave tags. For example, using different signaling wave blocks, different number of wave blocks in the wave tags, different wave tag schemas (described above with reference to FIG. 7) may be used in M2 3403. There may be alternative implementation for M3 3404, for example, by using a different setup for moving the sliding window approach (described above with reference to FIG. 19). A different approach may be used to perform the matching phase, for example, by using machine learning matching or different image or video processing algorithms.

Figure 41A:
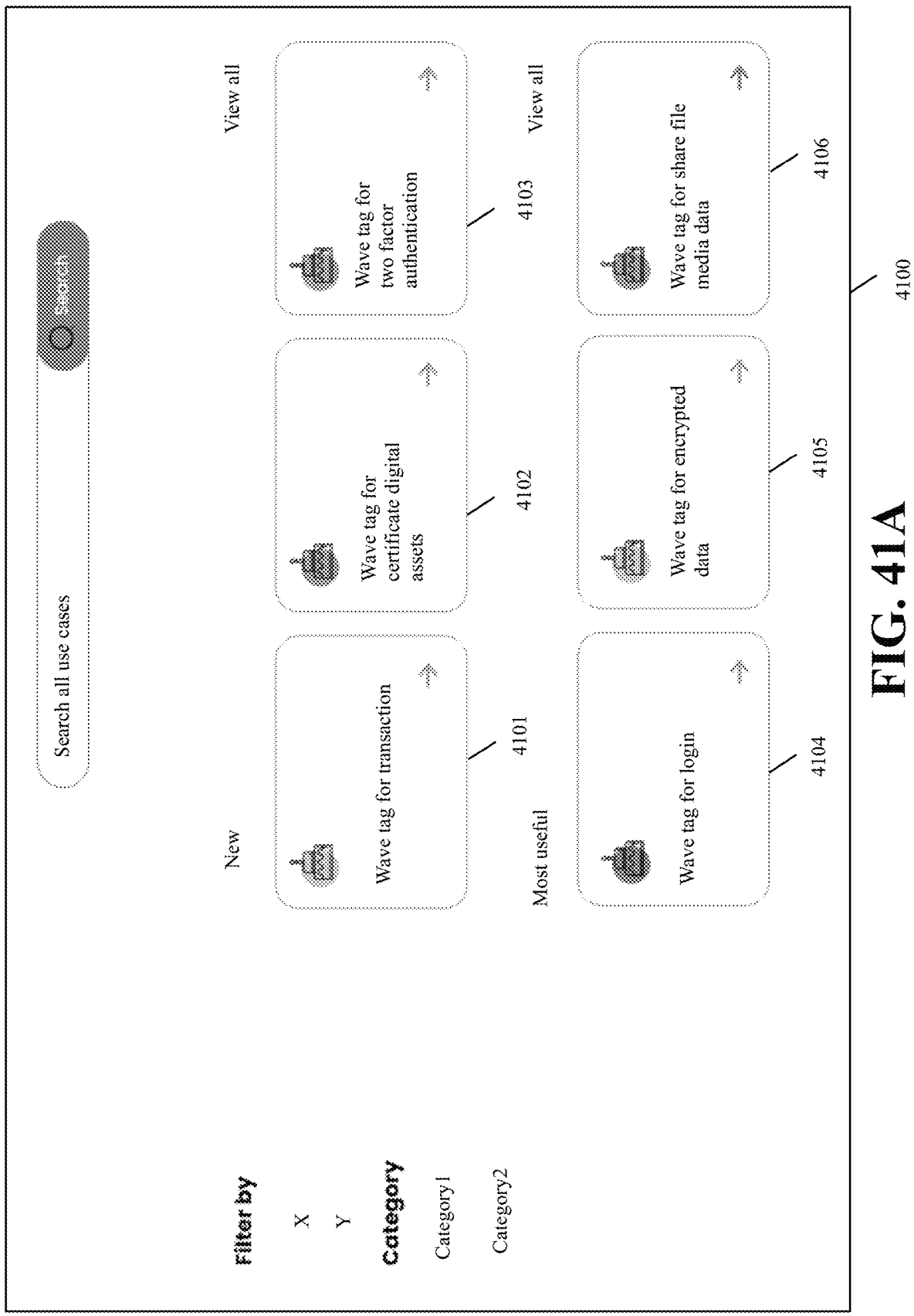
FIG. 41A is a schematic front view of a computing device that may display a user interface with several options for selecting use cases of wave tags, according to various aspects of the present disclosure.
Figure 41B:
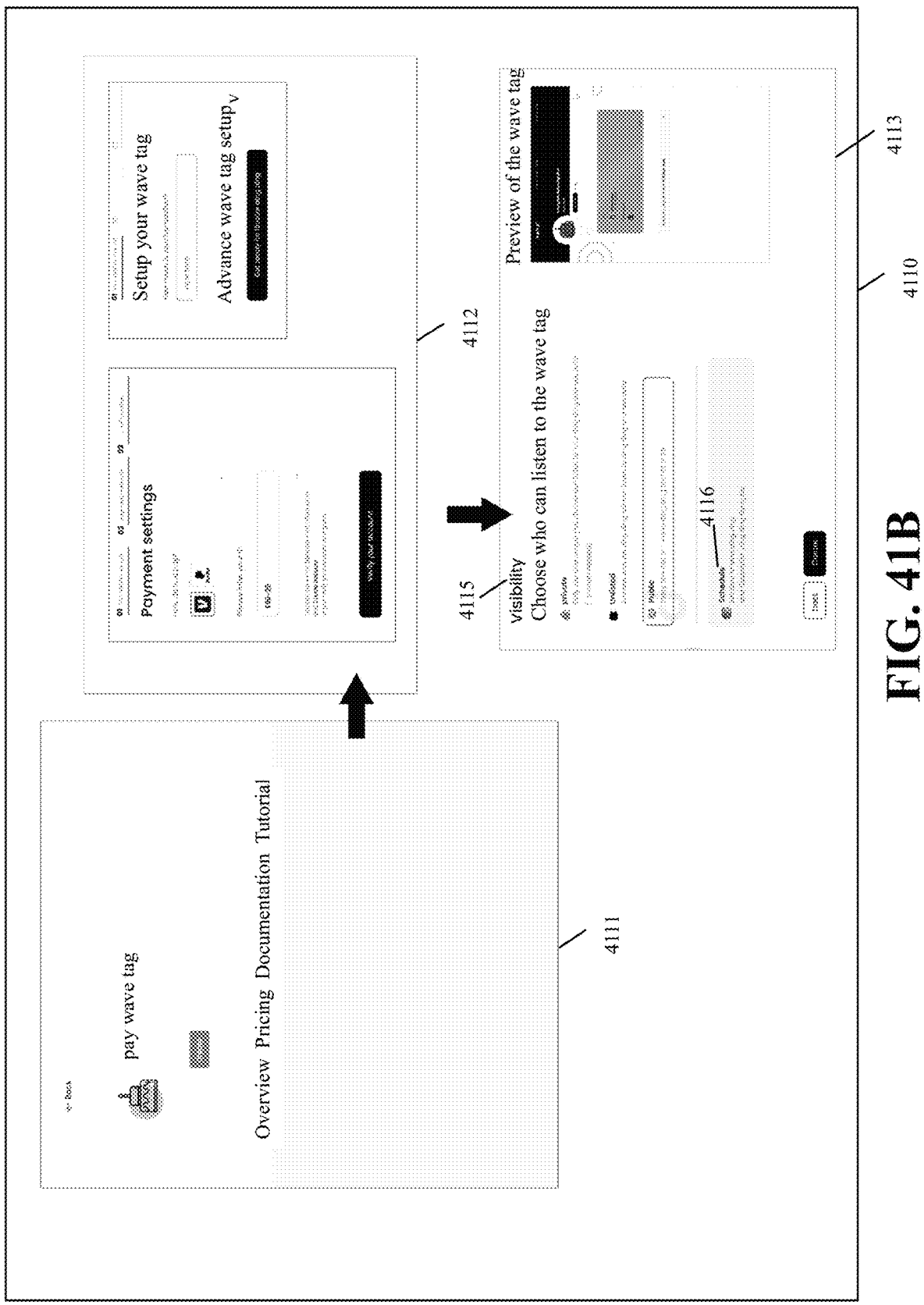
FIG. 41B is a schematic front view of a computing device that may display a user interface for configurating of the wave tags for various use cases and provide parameters for the wave tags, according to various aspects of the present disclosure.

FIG. 41A is a schematic front view of a computing device that may display a user interface 4100 with several options 4101-4106 for selecting use cases of wave tags. FIG. 41B is a schematic front view of a computing device that may display a user interface 4110 for configurating of the wave tags for various use cases and provide parameters for the wave tags.

With reference to FIG. 41A, individual persons or businesses may explore the use cases 4101-4106 and request wave tags for their needs. The user interface 4110 of FIG. 41B may be displayed, for example, after the option 4101 is selected in the user interface 4100 of FIG. 41A. With reference to FIG. 41B, a requester may attempt to perform a financial transaction from the use case page (4111). The use case page 4111 may include overview, documentation, fee and pricing, and sample ready-to-use user interface for the users and the developers to use wave tag for that use case.

In the example of FIG. 41B, the use-case includes performing a financial transaction. As shown in page 4112, the requester may specify the amount of money to transfer and connect a payment method, such as cash payment (e.g., with PayPal, Venmo, etc.), credit card payment (e.g., Visa, Mastercard, Stripe, etc.), bank account, credit balance, financial assets, crypto currency, or digital assets to pay the amount along with possible transaction fee and optional redeeming code. As shown in page 4113, the requester may provide a set of sound tag generation parameters. The sound tag generator may generate a financial transaction sound tag and may let the requester save the sound tag on the phone, share the sound tag to a social media profile to be broadcasted later or broadcast the sound tag immediately (as described below with reference to FIG. 41C). In the capturing device, the sound tag is captured, fingerprinted, and compared to the existing tags to find the match. If a valid financial tag is detected as a financial transaction, the capturing device (e.g., smartphone, laptop, tablet, smart watch, or a computing device) may request for the method of withdrawal (e.g., with PayPal, Venmo, Stripe, bank account, credit balance, financial assets, crypto currency or digital assets). The person using the capturing device may accept the transaction and withdraw the money using any method of payment (as described below with reference to FIG. 41D).

For performing a share operation use case, the requester may specify the content to share using a share button. The sound tag generator may generate or assign a sharing sound tag and may let the requester save the sound tag on the phone, share the sound tag to a social media profile to be broadcasted later or broadcast the sound tag immediately. In the capturing device, the sound tag may be captured, fingerprinted, and compared with existing tags to find a match. If the valid sharing tag is detected, the capturing device (e.g., smartphone, laptop, tablet, smart watch, computing device, etc.) may ask for the method of sharing with social media profile, third party applications, or method of saving the shared information (in other cases, e.g., for multimedia method of downloading the file and method of storing the file like save in Google drive, save in phone, drobox or send it to specific messaging application or third-party application).

For performing an authentication operation or login process use case, the requester may specify the one or more of access tokens, access credentials or access link. The requester may provide a set of sound tag generation parameters. The sound tag generator may generate an authentication sound tag and may let the requester save the sound tag on the phone, share the sound tag to a social media profile to be broadcasted later or broadcast the sound tag immediately.

In the capturing device, the sound tag may be captured, fingerprinted, and compared with the existing tags to find a match. If a valid authentication tag is detected, the capturing device (e.g., smartphone, laptop, tablet, smart watch, computing device, etc.) may ask to use the access credentials to authorize the capture device access to the information.

In addition, performing an authentication in a multi factor authentication may be done using wave tags. The requester may specify optional requester related parameters like account identification or data passed from first step of authentication along with a set of sound tag generation parameters. If no parameters are provided, detecting a valid wave tag itself may be a success authorization. The sound tag generator may generate a sound tag mapping to the requester related parameters and may let the requester save the sound tag on the phone, share the sound tag to a social media profile to be broadcasted later or broadcast the sound tag immediately. In the capturing device, the sound tag may be captured, fingerprinted, and compared with the existing tags to find a match. If a valid second factor authenticator tag is detected and corresponds to the requester, the capturing device (e.g., smartphone, laptop, tablet, smart watch, computing device, etc.) may authorize the capture device to proceed.

For performing decryption operation use case, the requester may specify the data, such as, encrypted files, multimedia files, or text along with an encryption algorithm if other than the default option, such as public key encryption. The requester may provide a set of sound tag generation parameters. The sound tag generator may generate or assign a decryption sound tag which may be mapped to the decryption key and may let the requester save the sound tag on the phone, share the sound tag to a social media profile to be broadcasted later or broadcast the sound tag immediately. The encrypted data also may be ready to download or share and to be decrypted in future. The public key used for encryption may also be shared for future encryption uses. In the capturing device, the sound tag may be captured, fingerprinted, and compared with the existing tags to find a match. If a valid decryption tag is detected, the capturing device (e.g., smartphone, laptop, tablet, smart watch, computing device, etc.) may ask to choose a method to provide the encrypted data to be decrypted by uploading the encrypted data. A decryption operation may be applied using the mapped decryption key (private key) and decrypted data may be provided to store or share using an interface.

As shown by 4113, the set of sound tag generation parameters may include visibility 4115 and lifecycle 4116 parameters of the generated tags. The life cycle setup is using the schedule button 4116 in diagram. Life cycle parameters may include expiration date of the sound tag, frequency of usage limit, and redemption timer. For example, when the frequency of usage limit is set to 1, the expiration date is set to 04/22/2022 12 PM PCT, and the redemption timer is set to 10 seconds, the sound tag may be detected only one time with one device before 04/22/2022 12 PM PCT and not after that time. Once captured and detected, the wave tag has to be used, redeemed, or spent in the next 10 seconds after broadcasting the sound tag or the wave tag may not be mapped. The default value may be set for these parameters. These parameters may be set for all wave tags for different use cases if needed.

Figure 41C:
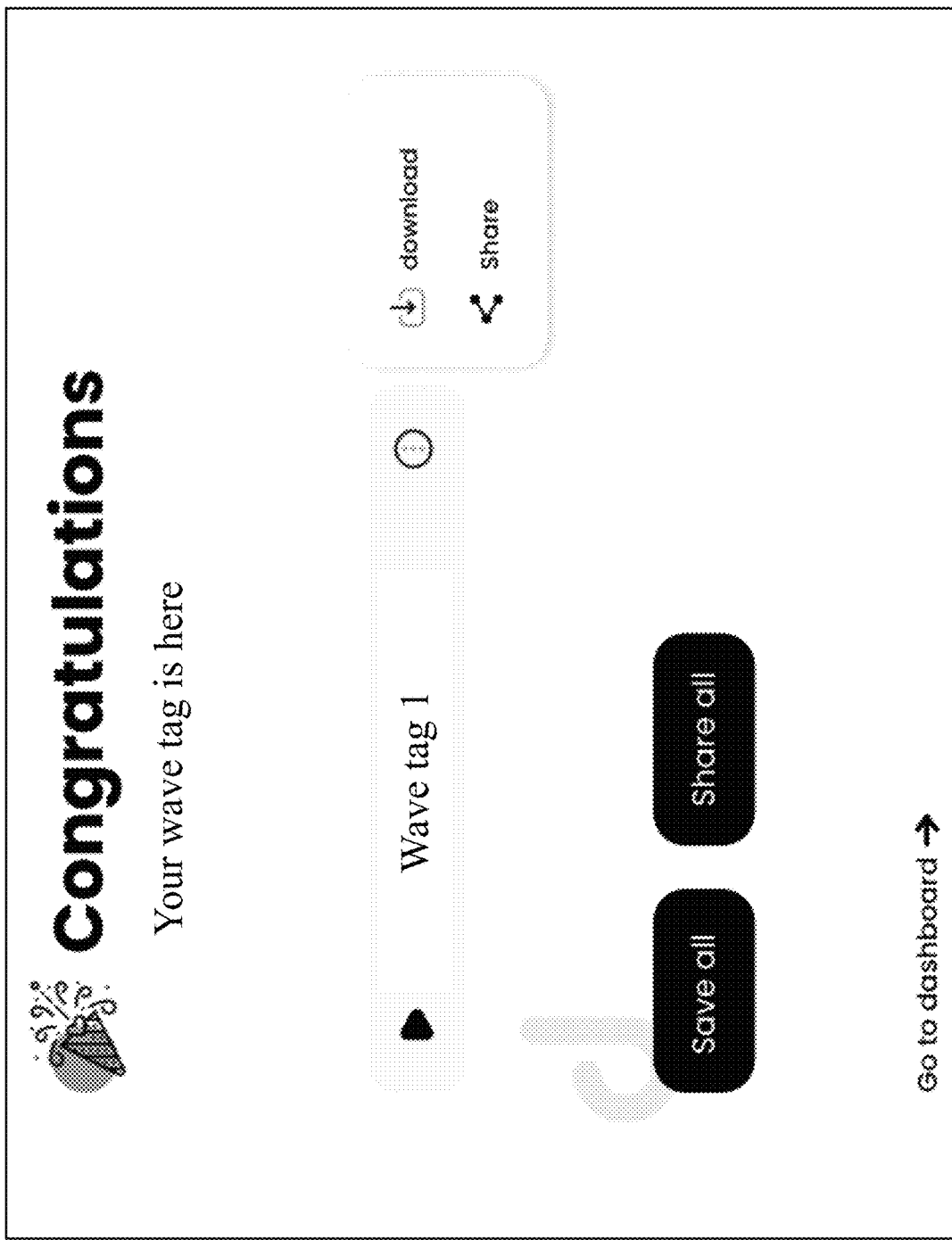
FIG. 41C is a schematic front view of a computing device that may display a user interface for storing, sharing, and exporting wave tags for various use cases for future or immediate broadcasting, according to various aspects of the present disclosure.

FIG. 41C is a schematic front view of a computing device that may display a user interface 4120 for storing, sharing, and exporting wave tags for various use cases for future or immediate broadcasting, according to various aspects of the present disclosure. Once the wave tags are created, they may be shared on social media or messaging applications or stored in storage or could. The owner can broadcast the wave tag later.

Figure 41D:
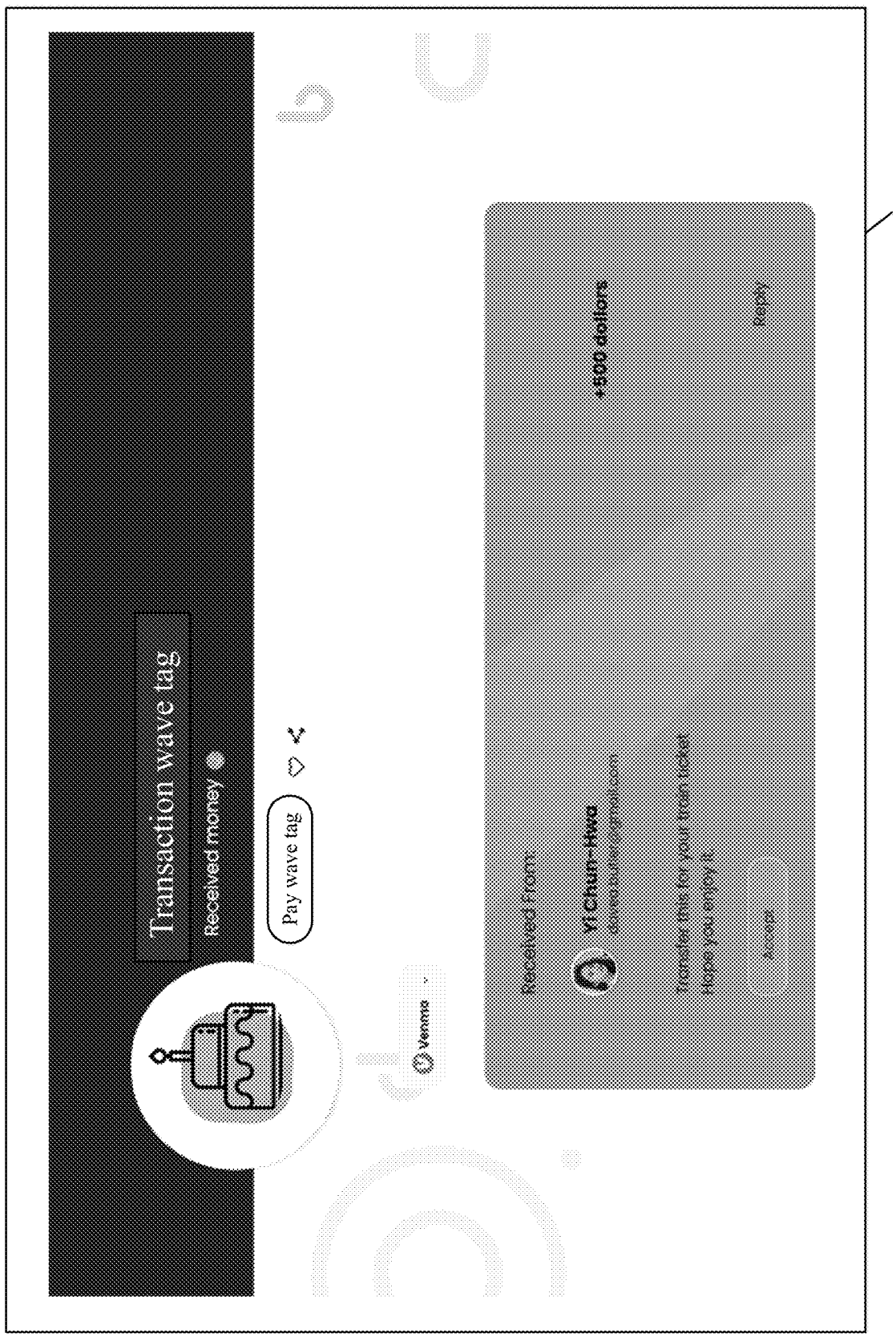
FIG. 41D is a schematic front view of a computing device that may display a user interface for handling a detected wave tag in a capturing device, according to various aspects of the present disclosure.

FIG. 41D is a schematic front view of a computing device that may display a user interface 4130 for handling a detected wave tag in a capturing device, according to various aspects of the present disclosure. In the example of FIG. 41D, the wave tag has been detected as a $500 dolor value transaction. The capturing device (e.g., smartphone, laptop, tablet, smart watch, computing device, etc.) may ask for a method of withdrawal (e.g., with PayPal, Venmo, Stripe, bank account or credit balance, financial assets, crypto currency or digital assets, etc.). In this example, the capturer is using Venmo ID to accept the transaction and withdraw the money. This diagram also represents the transaction log and may be used for bookkeeping purposes.

Figure 41E:
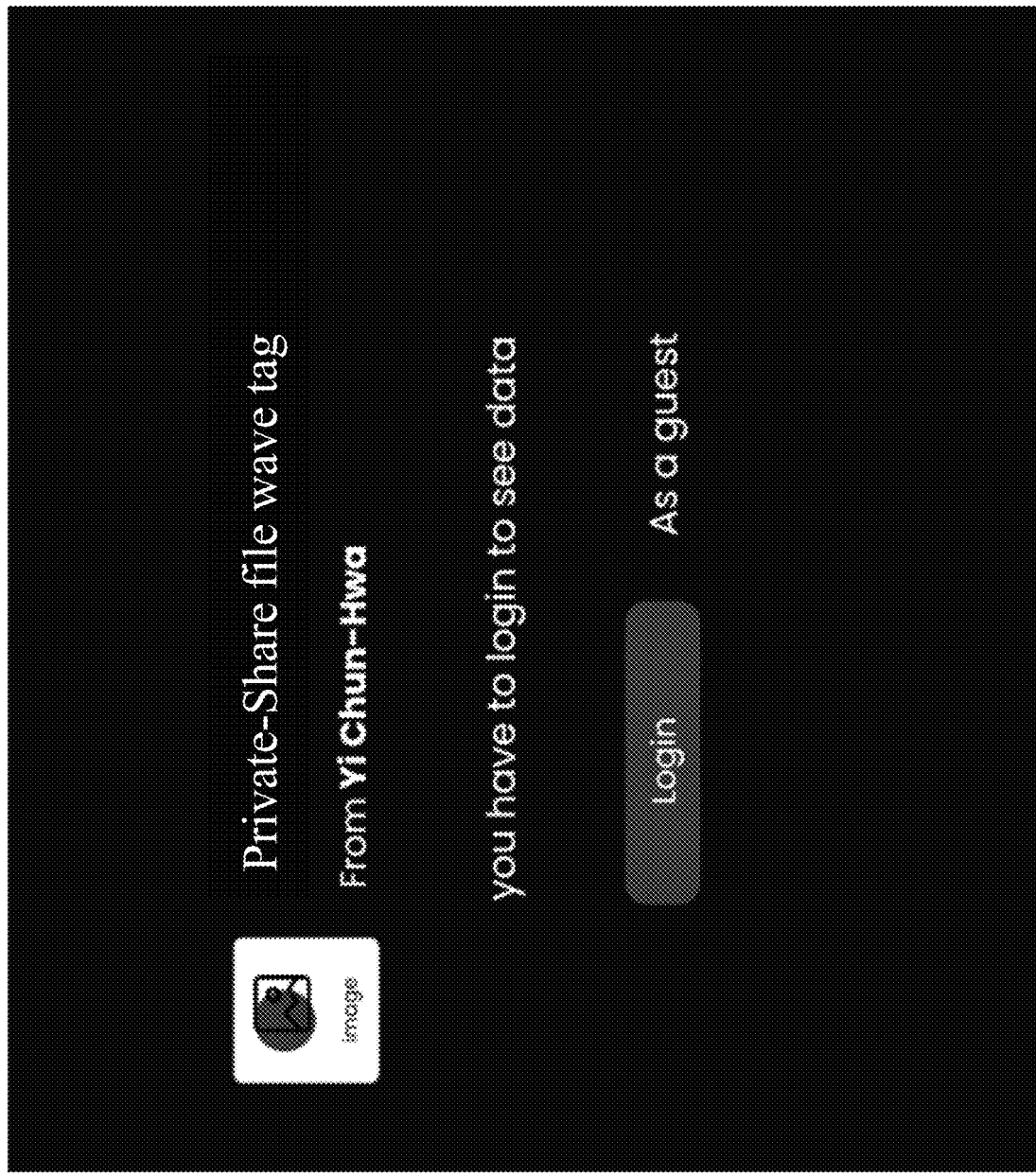
FIG. 41E is a schematic front view of a computing device that may display a user interface for handling detected private wave tags in a capturing device, according to various aspects of the present disclosure.

FIG. 41E is a schematic front view of a computing device that may display a user interface 4140 for handling detected private wave tags in a capturing device, according to various aspects of the present disclosure. In the example of FIG. 41E, a private wave tag representing a file is detected. When the wave tag is private and the capturer is not authorized to see the content, this sample page may be used to authorize the capturer. The authorization process may bind to an account in specific application, or also specific software, hardware. For example, the wave tag may be restricted to a specific browser or specific cookies stored inside the browser. The wave tag may be restricted to specific location and if the capturing device is not in that location. In summary, we may show this page and ask for resolving the restriction (location, login to account, setting cookies) to proceed.

Figure 41F:
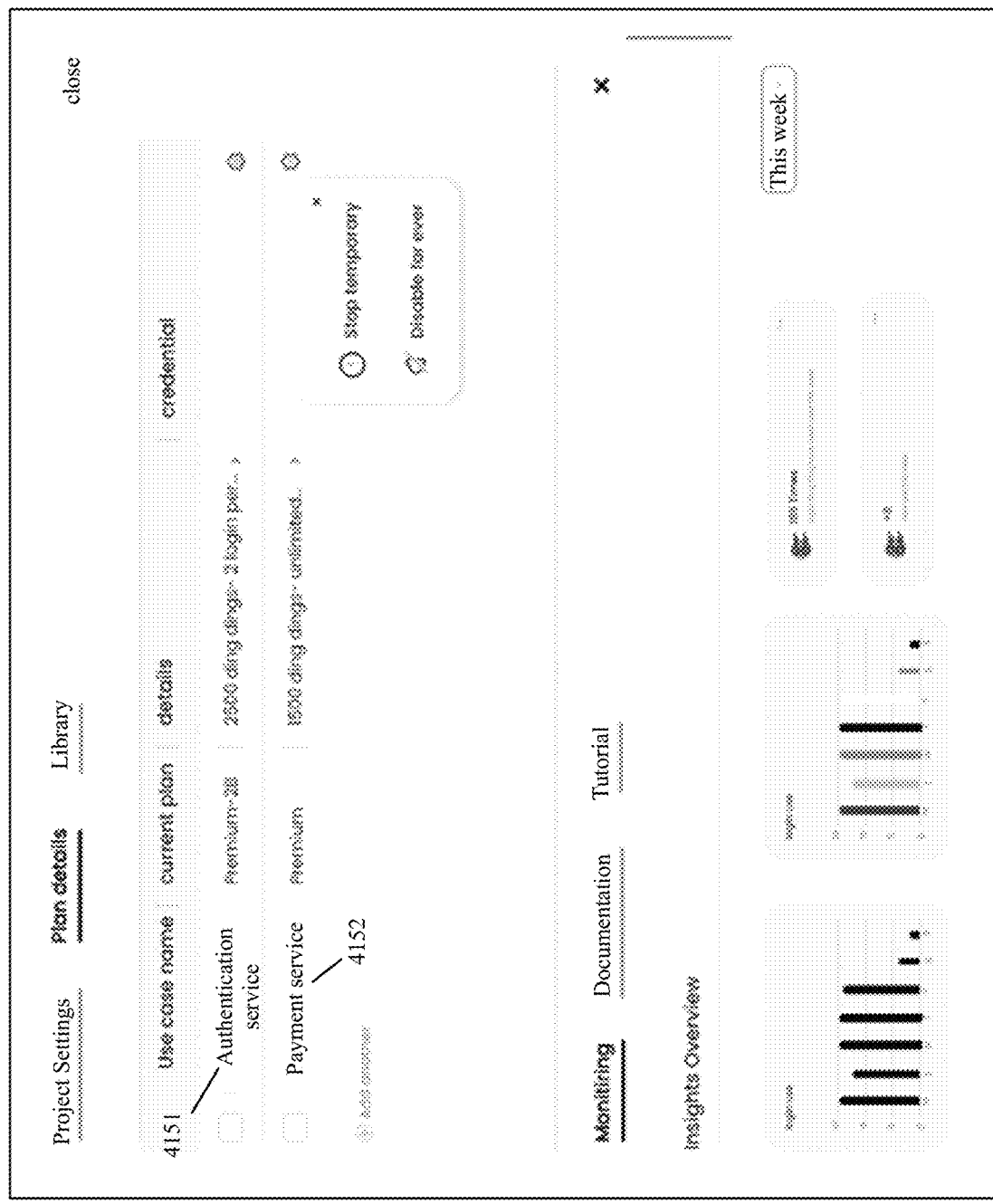
FIG. 41F is a schematic front view of a computing device that may display a user interface for managing active wave tag services for projects and businesses, according to various aspects of the present disclosure.

FIG. 41F is a schematic front view of a computing device that may display a user interface 4150 for managing active wave tag services for projects and businesses, according to various aspects of the present disclosure. In the example of FIG. 41F, there are two services enabled for specific project or business. The first service 4151 is an authentication service and second service 4152 is a payment service. The set of actions may include one or more of performing an authentication operation, login process or second factor authenticator. The requester may enable authentication service by specifying at least one method of requesting with, for example, a share button for the service and receiving credentials to use the service or use them in software development kits (SDKs).

Using the credentials, the sound tag generator may generate or assign a sound tag upon each request and may let the requester save the sound tag on the phone, share the sound tag to a social media profile to be broadcasted later or broadcast the sound tag immediately. In the capturing device (using login with wave tag button), the sound tag may be captured, fingerprinted, and compared with existing tags to find the match. If the valid tag is detected as a sharing sound tag, the capturing device (e.g., smartphone, laptop, tablet, smart watch, computing device, etc.) may ask for a method of storing the information with Google drive, drobox, phone storage, or any third-party application or user account or method of forwarding information into social media or messaging applications with displayed shortcuts. The requester may monitor the sharing operations using the service credentials in real-time and may stop or start the service upon the request. The optional service fee may be applied based on overall usage of the service in pay as you go or subscription model.

For a wave tag for payment service, the set of actions may include financial transactions. The requester may enable transaction service by connecting at least one payment method, for example, with PayPal, Venmo, Stripe, bank account, credit balance, financial assets, crypto currency, or digital assets to the service and may receive credentials to use the service or use them in SDKs. Using the credentials, the sound tag generator may generate or assign a financial transaction sound tag upon the request and may let the requester save the sound tag on the phone, share the sound tag to a social media profile to be broadcasted later or broadcast the sound tag immediately.

In the capturing device, the sound tag may be captured, fingerprinted, and compared with the existing tags to find a match. If a valid financial tag is detected as a financial transaction, the capturing device (e.g., smartphone, laptop, tablet, smart watch, computing device, etc.) may ask for method of withdrawal such as, with PayPal, Venmo, stripe, bank account or credit balance, financial assets, crypto currency or digital assets. The capturer may withdraw the money using at least one method of payment. The requester may monitor the transaction operations in the service using the service credentials in real-time and may stop or start the service upon the request. The optional service fee may be applied based on overall usage of the service in pay as you go or subscription model.

For wave tag for sharing service, the set of actions may include sharing operations. The requester may enable sharing service by specifying at least one type of information and method of sharing, for example, share button for the service and receiving credentials to use the service or use them in SDKs. Using the credentials, the sound tag generator may generate or assign a sound tag upon each request and may let the requester save the sound tag on the phone, share the sound tag to a social media profile to be broadcasted later or broadcast the sound tag immediately. In the capturing device, the sound tag may be captured, fingerprinted, and compared with the existing tags to find a match. If a valid tag is detected as a sharing sound tag, the capturing device (e.g., smartphone, laptop, tablet, smart watch, computing device, etc.) may ask for a method of storing the information with Google drive, drobox, phone storage, or any third-party application or user account or method of forwarding information into social media or messaging applications with displayed shortcuts. The requester may monitor the sharing operations using the service credentials in real-time and may stop or start the service upon the request. The optional service fee may be applied based on overall usage of the service in pay as you go or subscription model.

For wave tag for encryption service, the set of actions may include one or more of performing encryption operation. The requester enables encryption service by specifying at least one method of requesting, for example, an encrypt button for the service and at least one method of encryption, for example, RSA algorithm and receiving credentials to use the service or use them in SDKs. Using the credentials, the sound tag generator may generate a sound tag upon each request and may let the requester save the sound tag on the phone, share the sound tag to a social media profile to be broadcasted later or broadcast the sound tag immediately.

The encrypted data also may be ready to download or share and to be decrypted in future. The public key used for encryption also may be shared for future encryption uses. In the capturing device, the sound tag may be captured (by clicking the decrypt button), fingerprinted, and compared with existing tags to find the match. If the valid decryption tag is detected, the capturing device (e.g., smartphone, laptop, tablet, smart watch, computing device, etc.) may ask to choose a method to provide the encrypted data to be decrypted by uploading the encrypted data. A decryption operation may be applied using the mapped decryption key (private key) and decrypted data may be provided to store or share using an interface. In the capturing device, (e.g., smartphone, laptop, tablet, smart watch, computing device, etc.) may ask for a method of storing the decrypted information with Google drive, drobox, phone storage, or any third-party application or user account or method of forwarding information into social media or messaging applications with displayed shortcuts. The requester may monitor the sharing operations using the service credentials in real-time and may stop or start the service upon the request. The optional service fee may be applied based on overall usage of the service in pay as you go or subscription model.

Figure 42A:
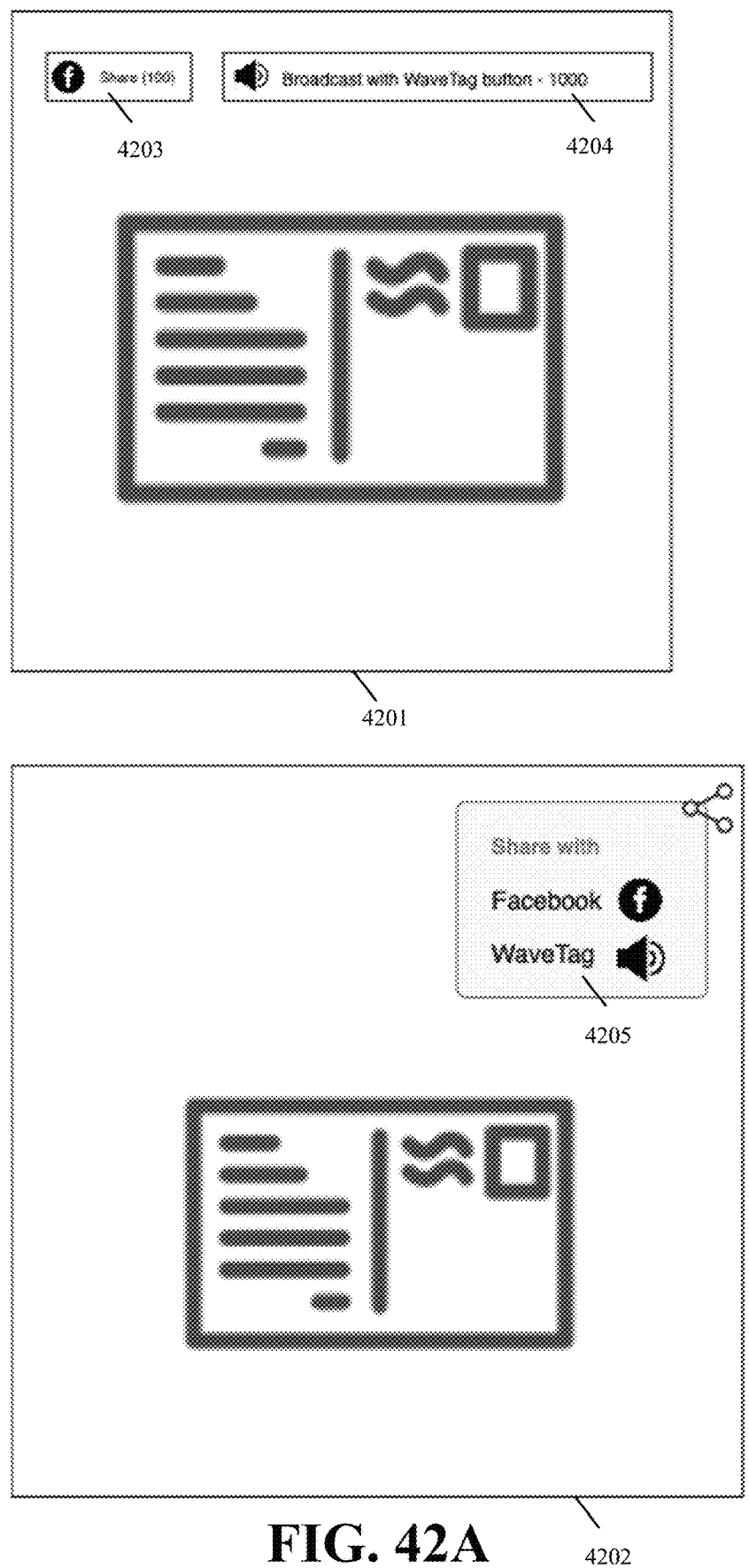
FIG. 42A is a schematic front view of a computing device that may display a user interface for using a wave tag as a sharing tool along with existing ones, according to various aspects of the present disclosure.

FIG. 42A is a schematic front view of a computing device that may display a user interface for using a wave tag as a sharing tool along with existing ones, according to various aspects of the present disclosure. As examples, two ways of using wave tags as a sharing option are displayed. A share button 4203 along with number of detections so far 4204 (as shown by 4201) and an option in share dropdown menu in the corner (as shown by 4202). In both ways, broadcasting a wave tag as a content sharing operation (URL, multimedia file, contact addresses). The requester may specify the content to share using a share button (may be typing manually or by voice). The sound tag generator may generate or assign a sharing sound tag and may let the requester save the sound tag on the phone, share the sound tag to a social media profile to be broadcasted later or broadcast the sound tag immediately.

In the capturing device, the sound tag may be captured, fingerprinted, and compared with the existing tags to find a match. If a valid sharing tag is detected, the capturing device, (e.g., smartphone, laptop, table, smart watch, or computing device) may ask for the method of sharing with social media profile, third party applications, or method of saving the shared information (in other cases, e.g., for multimedia method of downloading the file and method of storing the file like save in Google drive, save in phone, drobox or send it to specific messaging application or third-party application). In other cases, for example for multimedia an interface similar to file uploader, and for contact addresses an interface similar to a phonebook may be used to pick number or social media id.

Figure 42B:
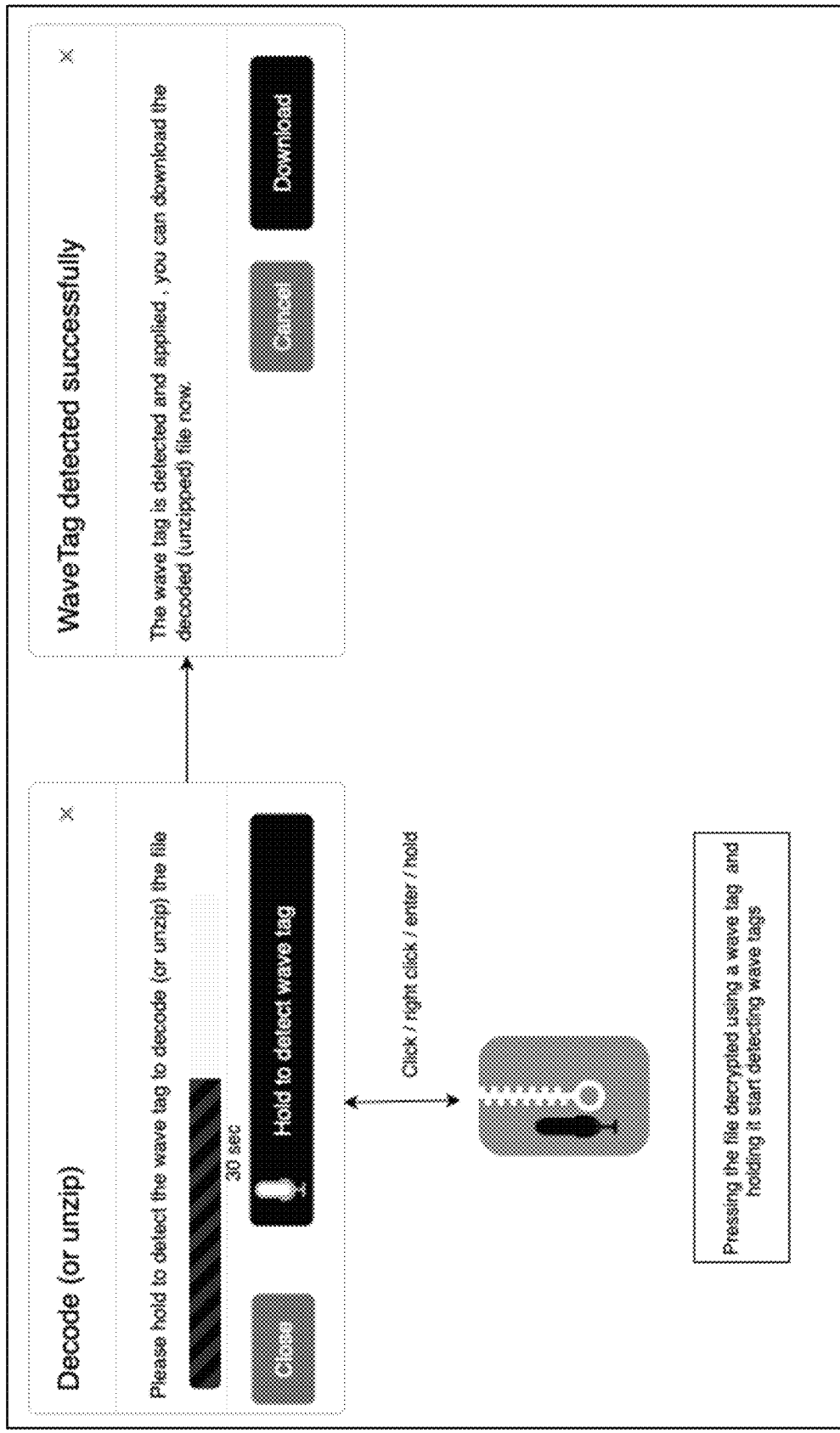
FIG. 42B is a schematic front view of a computing device that may display a user interface for using a wave tag in a decryption or unzipping process, according to various aspects of the present disclosure.

FIG. 42B is a schematic front view of a computing device that may display a user interface 4210 for using a wave tag in a decryption or unzipping process, according to various aspects of the present disclosure. Files that are encrypted or zipped using encryption or compression algorithms but may be decrypted or uncompressed by applying the decryption key acquired by a wave tag. The encrypted file with a wave tag as key may be shown in specific extension or icon. Clicking on file and holding it to capture and detect the wave tag is a sample process that is shown in this diagram. For sound, the button may be microphone that is recording while holding the button and detecting the wave tag once released.

Figure 42C:
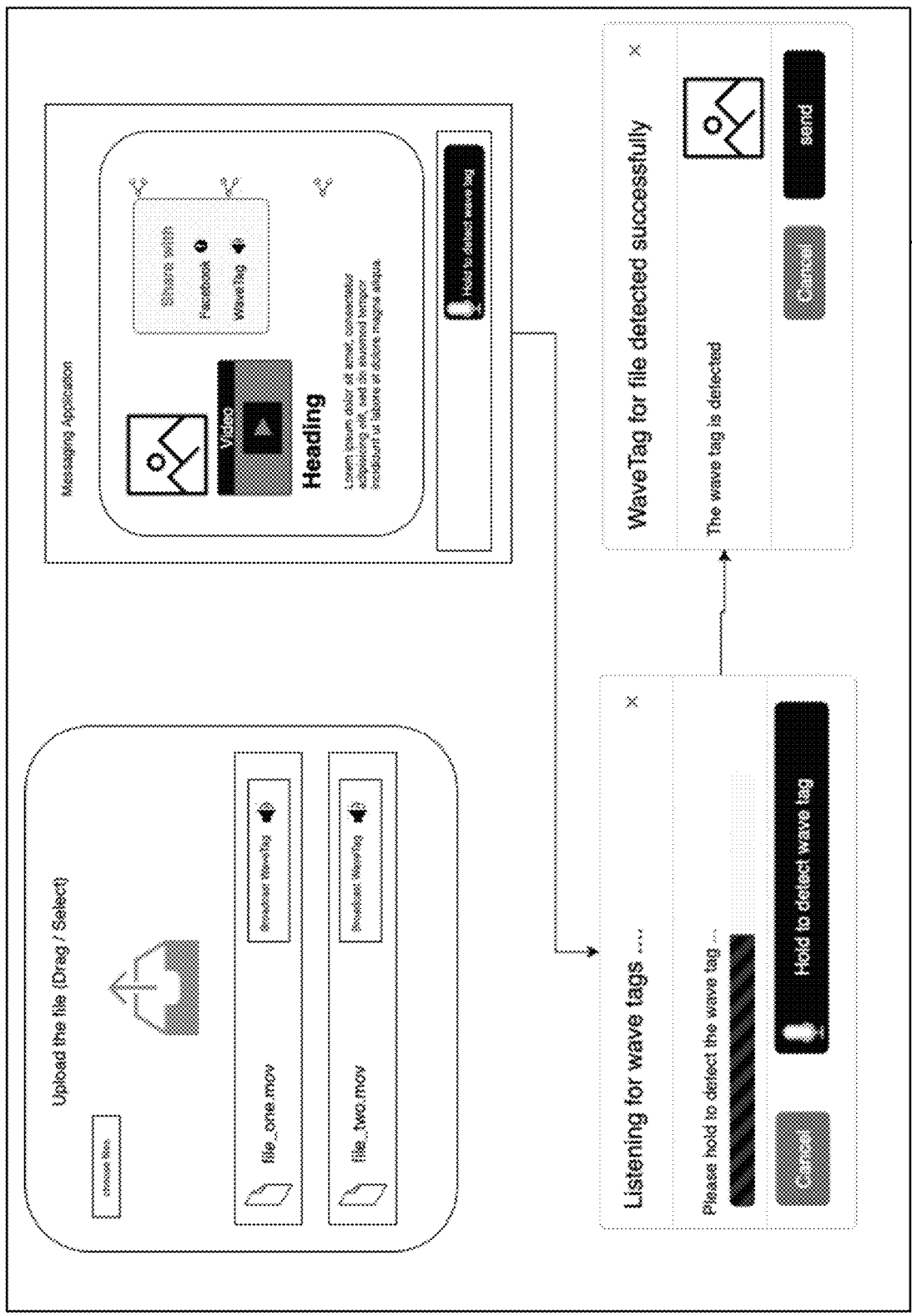
FIG. 42C is a schematic front view of a computing device that may display a user interface for using wave tags in a transferring media files and example of using the wave tags in a messaging application as additional way of sharing data, according to various aspects of the present disclosure.

FIG. 42C is a schematic front view of a computing device that may display a user interface 4220 for using wave tags in a transferring media files and example of using the wave tags in a messaging application as additional way of sharing data, according to various aspects of the present disclosure. The figure is an example of a user interface 4220 to upload a file and generate or assign a wave tag upon upload. The wave tag may be used as alternative way to share file.

Figure 42D:
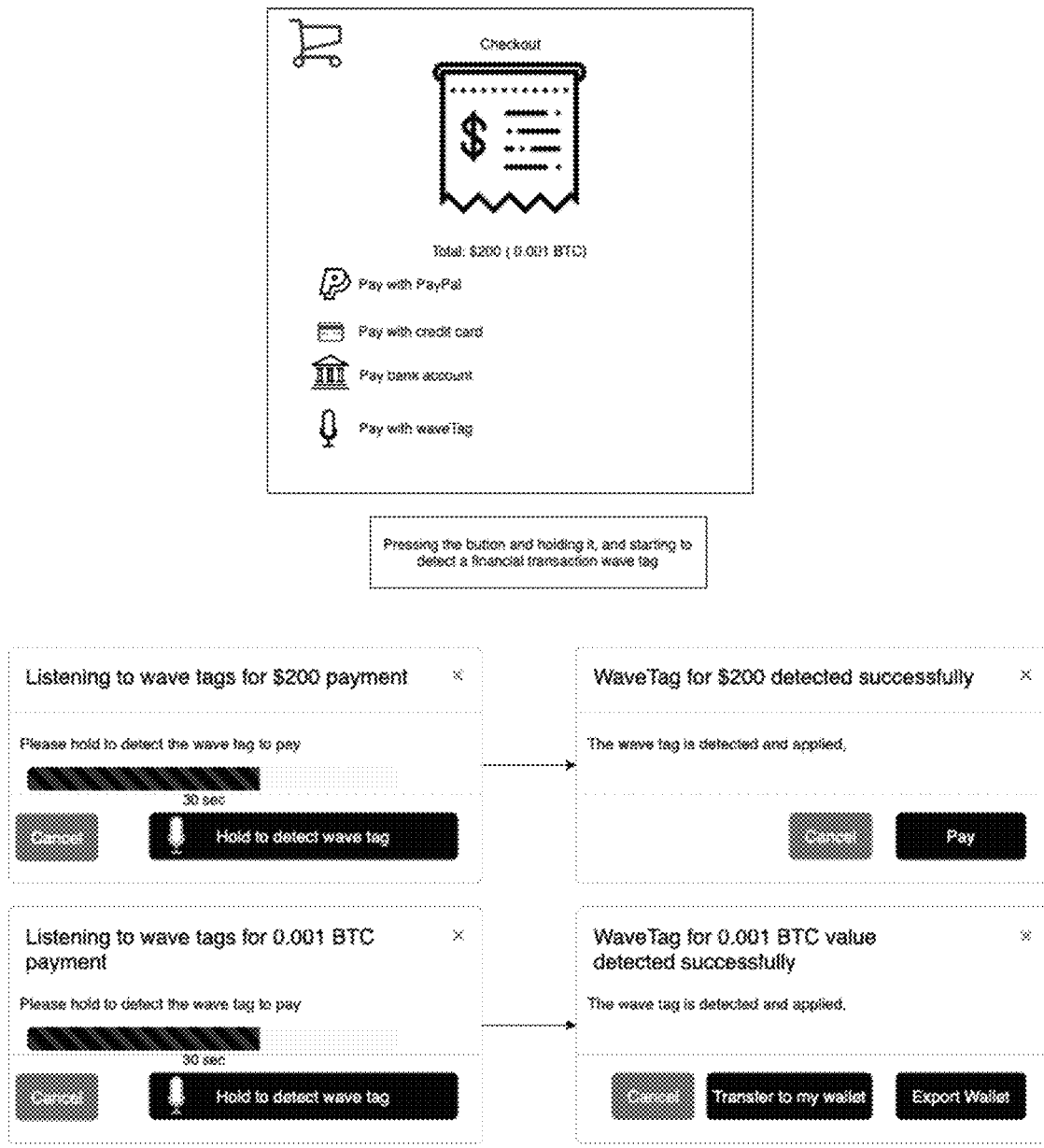
FIG. 42D is a schematic front view of a computing device that may display a user interface for using wave tag as a method of payment along with existing payment options and example of detecting a valid wave tag in capturing device to process a payment, according to various aspects of the present disclosure.

FIG. 42D is a schematic front view of a computing device that may display a user interface for using wave tag as a method of payment along with existing payment options and example of detecting a valid wave tag in capturing device to process a payment, according to various aspects of the present disclosure. The figure is an example of user interface offering wave tag as a payment option using a payment button that capture and detect transaction wave tags. For sound, the button may be microphone that is recording while holding the button and detecting the wave tag once released.

Figure 42E:
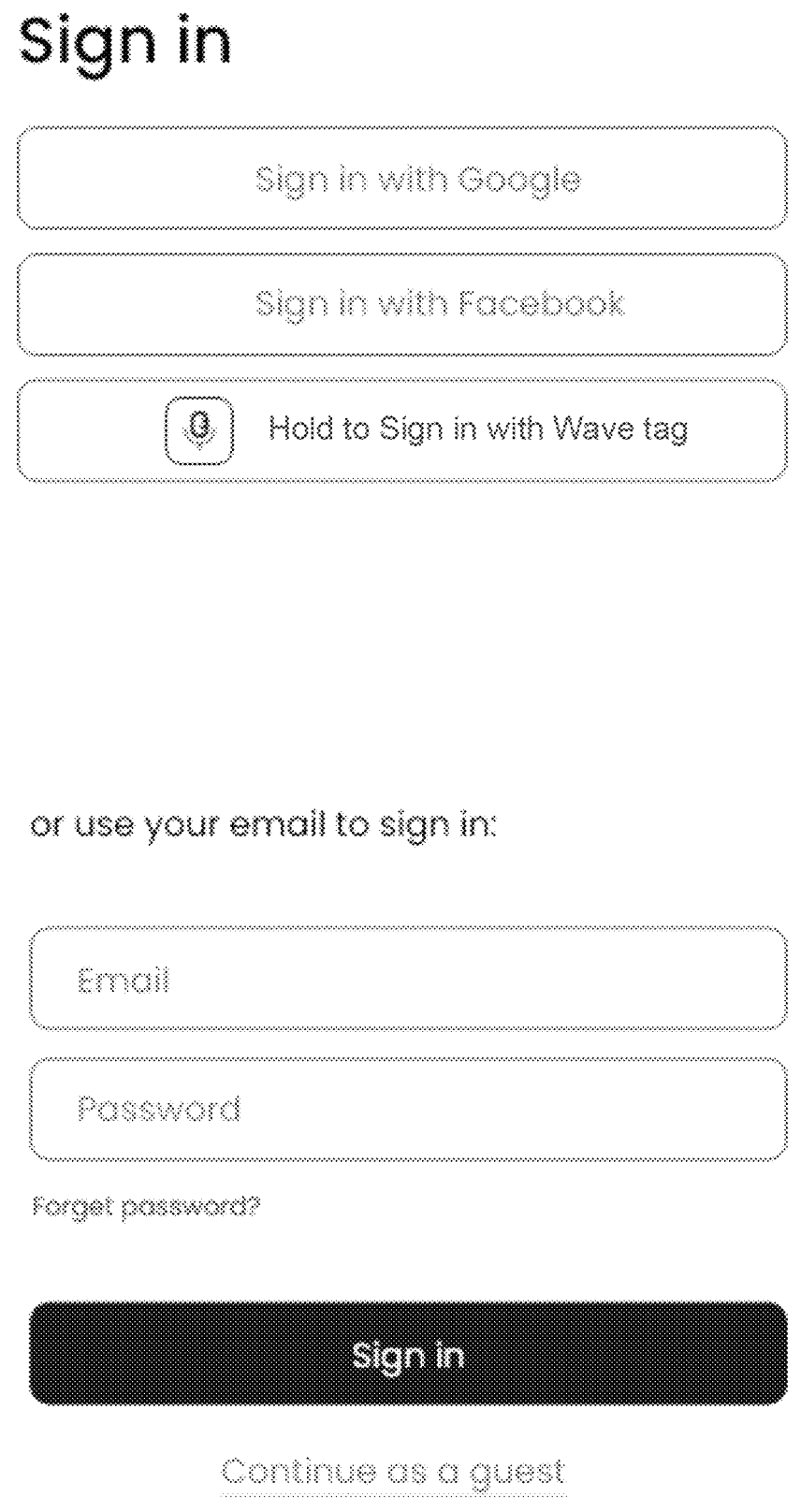

FIG. 42E is a schematic front view of a computing device that may display a user interface for using a wave tag as a method of login or a step in a multifactor authentication, according to various aspects of the present disclosure. The figure shows a sample user interface providing login with wave tag as a login option. For sound, the button may be microphone that is recording while holding the button and detecting the wave tag once released.

II. Example Embodiments

This section provides further details and several example embodiments of the present disclosure. The embodiments of the present disclosure relate to the art of identification and classification and has particular relation to identification and classification through the medium of identifying patterns in non-printed synthetic identifier tags. A non-printed detectable identifier for inputting information into the computer or like that. And more particularly to a vocally or "visually non-printed" or unique wave signal which is distinguishable tone representing some standardized characteristic, code or data placed in the tone blocks called a TonoTags so as to form a pattern. The Patterns are not necessarily meaningful, but they can be mapped to something meaningful.

This invention can be explained as non-printed version of barcode or QR codes. Although they are made to be scanned at least one time using optical device to input information into computer or like that. However, TonoTags are not printed somewhere and they do not need to be visible and scanned instead they are unique pattern of sound, light or wave signals that can be captured by capturing operation and input information into the computer or like that. Namely, information can be, not limited to, Uniform Resource Locators (URL), phone numbers, addresses, product numbers or personal identifiers, activity identity, function identifier or short data blocks.

Some embodiments provide a novel synthetic non-printed identifier pattern called Tonotag. Tonotag is non-printed standardized identification tag representing things. Tono-Tags are highly distinguishable and may obey some predefined rules when they are being created so that they can be recognized by excellent accuracy during the capturing operation. So there is a novel invention to generate TonoTags. And a novel invention for capturing non-visual or non-printed code.

In order to accomplish this and other related objects, a first aspect of the present invention provides a non-visual and non-printed code we call TonoTags comprising: Tonoblocks, each representing all or part of data; the Tonoblocks being placed on a Tonotag as patterns or special tone. So as to be readable by a Tonotag scanning operation along a predetermined scanning tones. And at least two signaling tones disposed at predetermined positions in the Tonotag. Each of the signaling tones having a tone pattern capable of generating a tone that can trigger the Tonotag capturing device for some operations. As it mentioned there should be at least two signaling tone which trigger tt_start and tt_end specifying start and end of the Tonotag. (Unique tone characteristic, special tone, light . . . )

Tonotag refers to three classes of non-printed synthetic identifier tags soundTag, LightTag and WaveTag. We decided to explain each category separately. SoundTags are TonoTags which specify the pattern, code or data using a unique standardized block of sound which can be audible or not audible by humans but detectable. Yet, the LightTag is a form of TonoTags which specify the code or data using a unique standardized block of synthetic light patterns which can be visible or not visible by humans but detectable. And the WaveTag specify the code or data using a unique standardized block of wave pattern which can be generate in special frequency.

Since we have three classes for TonoTags we have three kind of Tonotag capturing operation, SoundTag capturing operation, LightTag capturing operation, WaveTag capturing operation.

TonoTags are both for general purpose or private purpose usage. There are reserved and general purpose TonoTags. Reserved TonoTags can be read with just the owners or internally, in the other hands general purpose TonoTags can be read with all Tonotag capturing device.

SoundTag

In the SoundTag, it is preferable that the predetermined signaling tones has a pattern that can distinguish it from other sound, voice or noises in the environment, Before starting SoundTag there might be a Tonotag trigger which might be a specific pattern or tone that informs us about coming Tonotag. Also there are provided a series of timing tones including specific sound pattern which repeat many time during the SoundTag. Timing tones also ensure that we are encountered with an actual Tonotag. Basically SoundTags created by SoundTag units. SoundTag units may have different tones which represent all or part of data non-printed identifier. If same units occur multiple time they might represent something else. The combination of different SoundTag units with different tone or occurrence represent fundamental building blocks of TonoTags. The fastness of playing these SoundTag units also might change the Tonotag interpretation. So TonoTags interpretation might change by changing tone, occurrence and fastness of them. Inside the SoundTag there at least two signaling units. Start signaling unit and end signaling units are the minimum signaling units. The rest of the SoundTag creates data or body section of the Tonotag. Data units include but not limited to an identifier, the data owner, data type and data port.

LightTag

In the LightTag, it is preferable that the predetermined signaling tones has a pattern that can distinguish it from other lights in the environment. Usually there might be a specific Tonotag trigger before each LightTag with specific pattern or light characteristic that inform us about upcoming LightTag. Also there are provided a series of timing tones including specific light pattern or light type which might repeat many time during the LightTag. Timing tones also ensure that we are encountered with an actual Tonotag. Basically LightTags created by LightTag units. LightTag units may have different tone or characteristics which represent all or part of data or non-printed identifier. Among characteristics that can generate unique LightTags representing different interpretation are wavelength, color, spectra or frequency of occurrence or order of appearance of different type of light patterns. The combination of different LightTag units with different tone or occurrence represent fundamental building blocks of LightTag. Inside the LightTag there at least two signaling units. Start signaling unit and end signaling units are the minimum signaling units. The rest of the LightTag create data or body section of the Tonotag. Data units include but not limited to identifier, data owner, data type and data port. LightTags preferably works in visible light spectrum so that they can be captured and analyzed by devices like camera or light sensors.

WaveTag

WaveTag is basically is like LightTags but they are usually unique by having different wave characteristic like frequency. WaveTags are not necessary work in detectable wavelength by human. Usually there might be a specific WaveTag trigger before each WaveTag with specific pattern or wave characteristic that informs us about upcoming WaveTag. Also, there are provided a series of timing wave tones including specific wave pattern or wavelength which might repeat many times during the WaveTag. Timing tones also ensure that we have encountered with an actual WaveTag. Basically, WaveTags are created by WaveTag units. WaveTag units may have different tone or characteristics which represent all or part of data or non-printed identifier. Among characteristics that can generate unique WaveTags representing different interpretation are wavelength or frequency of occurrence or order of appearance of different type of wave patterns.

Preferred embodiments of the recognizable non-printed standard codes representing entities in physical world (e.g., products) or cyber environment like Uniform Resource Locator (URL), email, phone, personal IDs, product IDs or any kind of existing unique identification, the related method and apparatus using the same in accordance with the present invention will be explained in greater details hereinafter, with reference to the accompanying drawings. Identical parts are denoted by identical reference number throughout the views.

Figure 35:
FIG. 35 illustrates the existing gap for representing and classifying entities with reference to the Table 1, according to various aspects of the present disclosure.

To begin, the existing gap for representing and classifying entities is shown with reference to the Table 1 in FIG. 35. Printed versions like barcodes and QR codes are used as labels on products to be read by an optical device. However Tonotags are used as non-printed synthesized tags which can be identified by capturing operation to identify the corresponding entity without visually scanning codes or tags. So clearly there is a need for non-printed standard synthesized identification media to cover those gaps.

Figure 36:
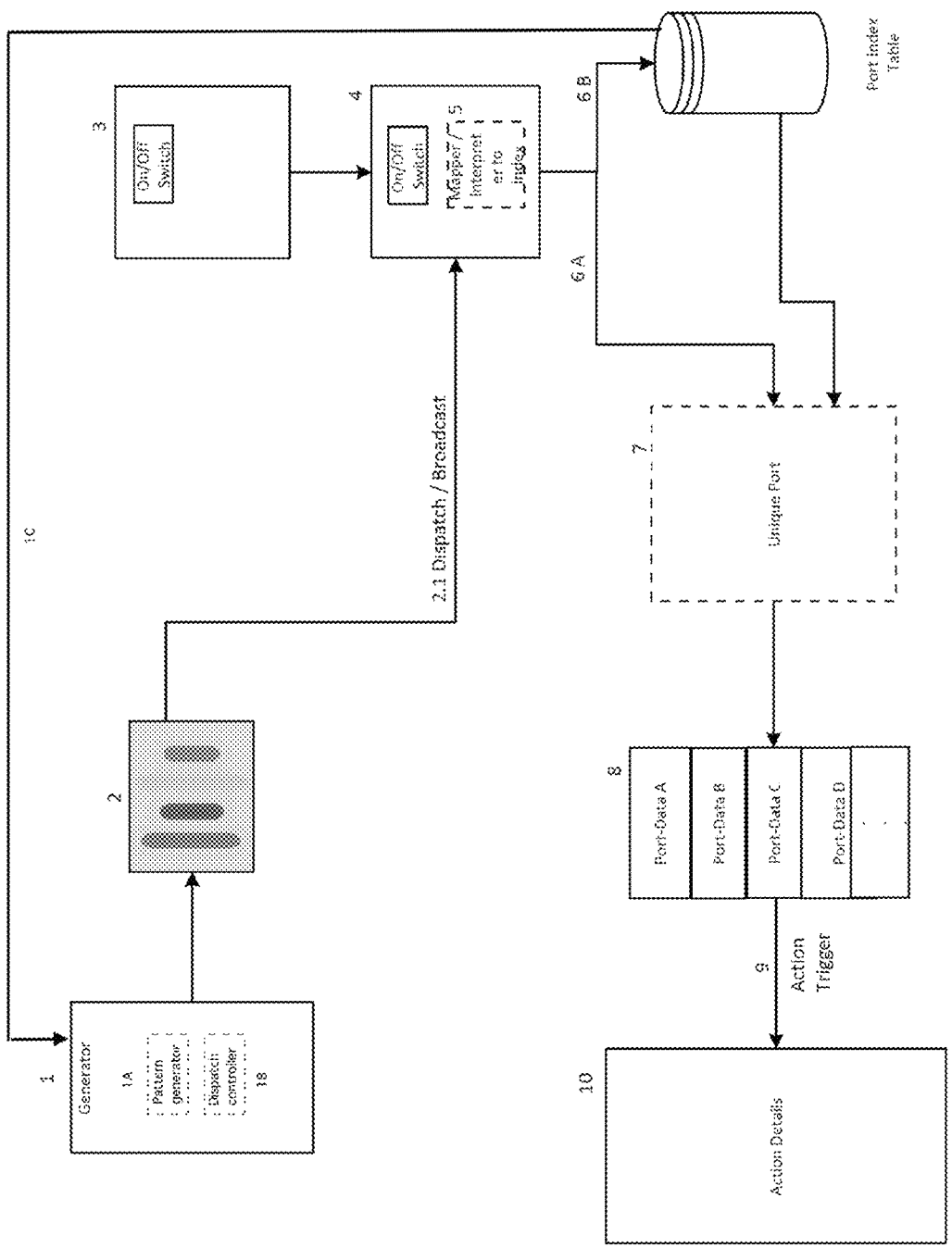
FIG. 36 illustrates one embodiment of a Tonotag lifecycle, according to various aspects of the present disclosure.

FIG. 36 shows one embodiment of a Tonotag lifecycle in accordance with the present invention. This Tonotag 2 is a distinguishable non-printed unique code, data or pattern representing things in the real world. Tonotags are generated by embodiment 1 which might be software or a hardware or like that capable of generating these unique non-printed distinguishable standardized tags representing things in the real world. The Tonotag 2 is non-printed standardized codes and can be in sound, light or wave format. Embodiment 1 can be light, sound or wave pattern (tone) generator which generates distinguishable tones. Embodiment 1 also might have a broadcast or dispatch controller which manages the broadcast mode or manipulates the Tonotags patterns or parameters, so it limits or expands the possible receiver of the Tonotag. Embodiment 3 is the Tonotag capturer which can be setup so it can capture broadcasted Tonotags. The main two setup are manual and automatic (Live) mode. More details about these two modes in FIG. 38. When capturer is set, waits for Tonotag triggers. Triggers activate the capture operation in the capturer embodiment 3, Capture operation is explained in FIG. 39. Embodiment 4 which is activated by embodiment 3, captures Tonotags after each trigger detected. Embodiment 5 inside the capturer is the mapper module which interprets each Tonotag and maps it (items 6A or 6B) to a unique standardized code 7 representing something. Each Tonotag might have a record in Tonotag index table (6B). However Tonotag can be mapped directly (item 6A) without using data tables in some cases based on the nature of what the Tonotag represents. The captured Tonotags would be listed in an interface 8 inside the capturer. Each captured Tonotag would be listed as a calling data port in interface 8. Click or calling each Tonotag presents the actual thing or information about the things that it is representing. The calling ports might trigger any other actions 9 including generation of another Tonotag. Using interface 10 we understand the things that the Tonotag represents.

Figure 37:
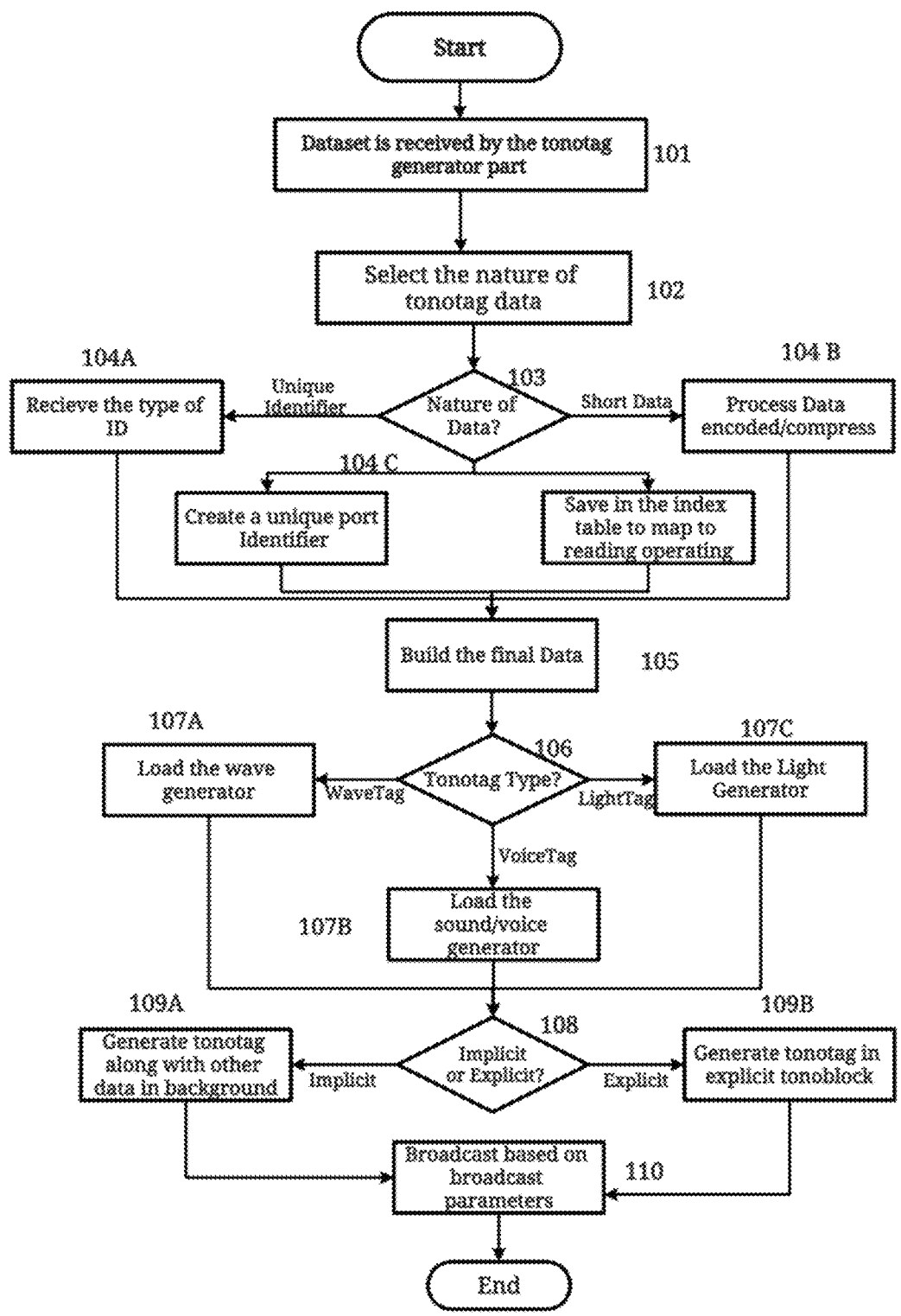
FIG. 37 is a flowchart illustrating example processes ranging from receiving an original data to be represented by Tonotag to generating the Tonotag and eventually broadcast operation, according to various aspects of the present disclosure.

Next, a series of processes ranging from the receiving an original data to be represented by Tonotag to generating the Tonotag and eventually broadcast operation in accordance with the present invention will be explained with reference to FIG. 37. This processing is executed by a signal/sound/light processing apparatus of a Tonotag broadcasting machine that is not shown.

First of all, data is set in a work memory (Step 101). Then, the nature of the Tonotag data is received by the generator component (Step 102). Subsequently, a judgement is made as to whether the Tonotag data nature is short data, unique identifier or unique port index or other supported natures (Step 103). Next step is based on the previous judgment. If the nature is a unique identifier representing something, next step is to receive the id and id type (Step 104A). If the nature is a short data representing something in the real word next step is to process the data like encoding or compressing the data (Step 104B). Otherwise if the Tonotag nature would be a unique port index we have two processes in parallel. One is to create a unique port identifier using the Tonotag generator processing Unit and save or update the port index record in the index data table (Step 104C). In either case we will have an Identifier representing something, Tonotag nature and the identifier type however we can use other flags and parameters if it is required. Using current parameters generator create a final identifier (Step 105). The Tonotag generator can generate different types of non-printed unique identifiers. The main ones are in sound, light or wave format. So, in the next step a judgement is made as to whether the Tonotag output type is sound, light or wavelength (Step 106). Next step is based on the previous judgement to load corresponding generator light, sound or signal generator (Step 107A, 107B, 107C). In next step a judgment is made as to whether the Tonotag should be broadcasted implicitly or explicitly (Step 108). Next step is according to previous step setting up the Tonotag to broadcast the Tonotag implicitly in the background or using clearly detectable Tonotag (109A, 109B). Then, the broadcasting operation is executed based on broadcast parameters which manipulate the Tonotag so limit or expand the number of devices that can capture and read the Tonotag (Step 110).

Figure 38:
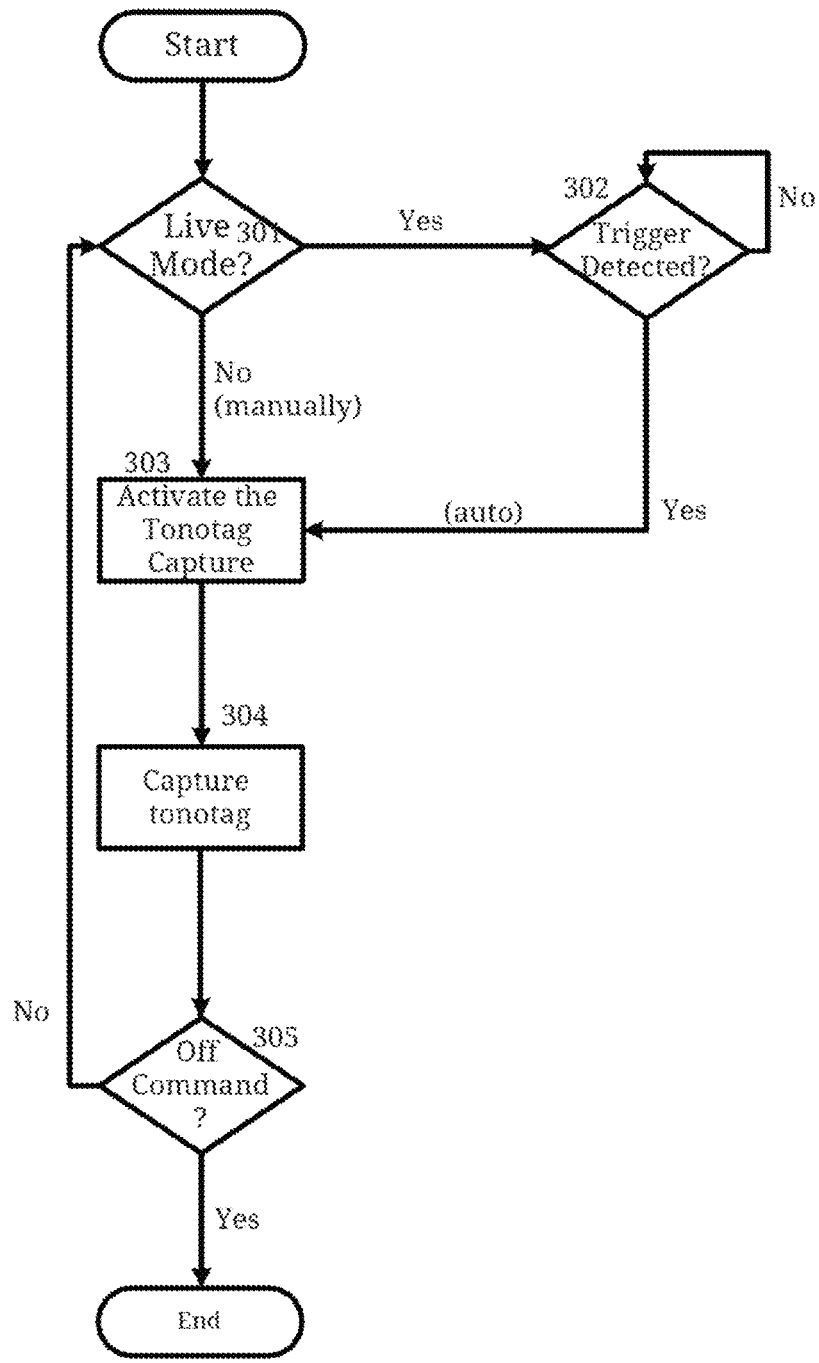
FIGS. 38 and 39 are flowcharts illustrating example processes for reading and processing of Tonotags, according to various aspects of the present disclosure.
Figure 39:
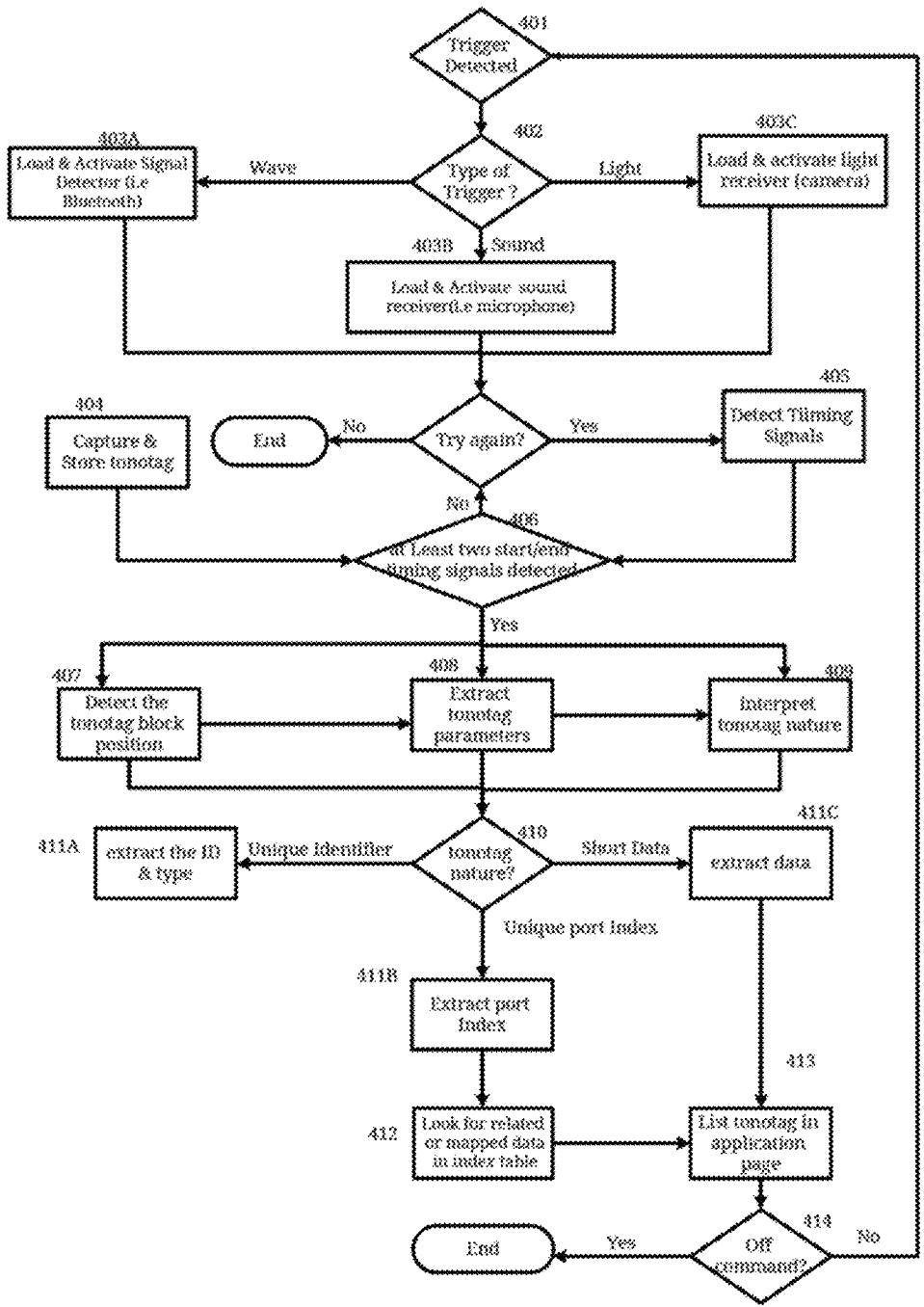

Next reading processing will be explained with reference to the flow charts of FIG. 38 and FIG. 39. For this processing, a Tonotag capturer device is required to be setup and ready to listen to broadcasted Tonotags generated by Tonotag generator. There are two main setups to activate the Tonotag capturer; manual and automatic (Live) mode. If the capturer is in live mode, it listens or waits for detecting the Tonotag trigger. Anytime it detects a trigger it goes to the next step to activate capturer and start Tonotag capture operation which will be described in FIG. 39. If the capturer device is in manual mode, it captures the current broadcasted Tonotag. The capturing process repeats until the off command is executed. Based on the Tonotag input type, camera, microphone or corresponding receiver is required. A capturer (FIG. 38), comprising a CPU, a ROM, a RAM and an I/O unit, receive the tone (sound/light/wave or any non-printed standardized identifier) into the capturer, as shown in FIG. 39. The trigger in automatic mode can be as simple as periodically checking for Tonotag every 10 second or only activating the capturing process once specific starting block or trigger signal detected. Every time any type of trigger detected we start capturing process accordingly from 405. When capturer in manual mode it capture According to FIG. 39 after Tonotag capture operation started by detecting a Tonotag trigger (Step 401), based on the type of Tonotag input corresponding receiver will be activated (Step 402). Namely, the soundTag received by something like microphone (Step 403B), the lightTag can be received by something like light sensor or camera (Step 403C), and the WaveTag can be received by Bluetooth or any wave receiver apparatus (Step 403A).

The received sound/light/wave slots saved are successively stored into a memory (RAM) as appropriate media file and will be used to see if it is a valid tag or not (Step 404). Meanwhile, as parallel processing. The timing signs of Tonotag will be detected using predefined rules (Step 405). The capturing process will not go to the next step unless at least the start and end signaling units are detected (Step 406). Based on timing signs coordinates of the Tonotag, body will be detected and extracted based on the timing signs (Step 407). Namely, the specific pattern (i.e. the frequency component ratio) could be used as a timing sign. Then the capturer interprets the Tonotag body and the Tonotag body nature based on extracted parameters of the Tonotag. The capturing process will not go to the next step unless the nature is interpreted. If there is just one supported Tonotag body nature, we can skip this step (Step 410). Next step would be based on the Tonotag body nature. To name some; If the Tonotag body nature is a unique identifier we identify the type and id (Step 411A), if the body should be interpreted as a unique port index we extract the port index (Step 411B) and if it should be interpreted as a short data we interpret the data (Step 411C). In first or second case we need to have an extra step which is looking up for related or mapped data for the extracted Tonotag interpretation (Step 412). Eventually the capturer lists the Tonotag interpretation for further inquiries or actions (Step 413). The reading operation repeats as long as the capturer is active and receive Tonotag triggers (Step 414).

Figure 40:
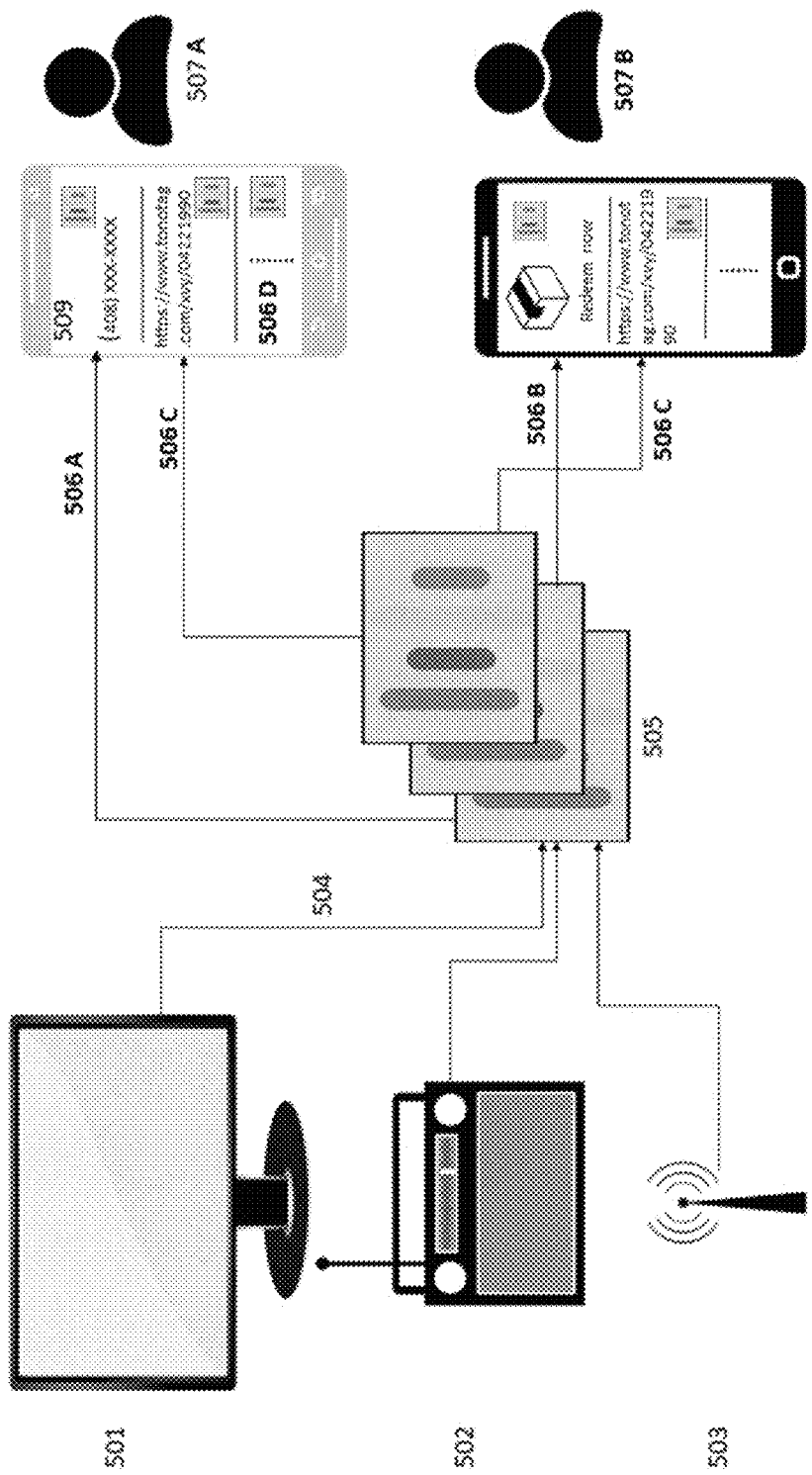
FIG. 40 illustrates the process of generating and capturing of the Tonotag, according to various aspects of the present disclosure.

FIG. 40—To clarify the described process of generating and capturing of the Tonotag and also realize the benefit of Tonotag, we have decided to explain one of the major use-cases of the proposed invention. This use-case is also itself a novel invention for solving a problem. Actually, this use-case is related to SoundTags which is one type of proposed Tonotags. The SoundTags are highly applicable in radio stations and radio programs. Obviously generally known radio stations usually communicate with their audience using sound and audio. Namely, among the usual radio programs (502), there are audio storytelling, playing music, audio talk shows (502) or variety of special topic radio station like religion-based or scientific-based radio programs. In addition to these programs there are radio advertisement.

Radios are great way to communicate and broadcast different kind of information among wide range of audience since people usually spend considerable part of their daily time while driving or using public transportation. In addition, there are many places in which they communicate with their audience using radio or audio-based communication.

Obviously, inventions like barcodes or Qr-Codes or any other type of product identifier codes won't work in these types of communications since all of existing standardized codes are in printed format and they need to be scanned at least one time using an optical code reader. This limitation stops radio stations to interact with their audience efficiently and in two-way format.

Using proposed novel invention called TonoTags radio stations can generate different types of TonoTags (505) with different types of body nature to interact with their audience. Thus, in this case, the radio station would be the TonoTags generator directly or indirectly using the main TonoTags generator. In the other hand the audience (507A, 507B) will setup their TonoTags capturer (509) in Live or Manual mode to listen and wait for TonoTag triggers. Afterward using described capture operation, the Tonotags will be listed (506A, 506B, 506C) in an interface. Each Tonotag show the thing it is representing on the interface. Namely, executing click or other type of event on each TonoTag might trigger another action (506B), activity (506A) or services.

To name most important TonoTags that can be used in radio station programs would be Tonotags representing specific Uniform Resource Locator (URL) (506C), Phone number (506A), address, and products (506B), services or even barcode and QRCodes themselves. It can also be a thing inside a private or public organization so that all or part of audience would understand (506A for 507A, 506B for 507B). Basically, Tonotags would be used as ports to give the audience more information or showing the specific interfaces so that they can ask audience to input or initiate some kind of tasks, activities.

Meantime the radio is on and the program is on air the current program also broadcasts related or non-related Tonotags so that audience can capture those TonoTags using their Tonotag capturer and see additional information or initiate some tasks or provide required information for the playing radio programs. As it is clear now, so on there is a full two-way communication between the radio program and the listeners which can do other things in addition to listening.

Tonotags also enable the audience to capture TonoTags for later so they can check them in right time and right place (506D). So, as you see the audience will be still connected to the radio program which otherwise it was impossible.

TV programs would be able to use TonoTags as well with same mechanism. The use-cases for TV might be in same or different applications (501).

Tonotags also is making unique way of Radio Marketing. This novel invention is also possible only with existence of some version of TonoTag. We call this Interactive Radio marketing. To name some characteristic of interactive radio marketing, first of all there is something like Tonotags so that the audience can capture using non-printed code and see more information about it and also there might be an interface which enables the users to buy the product or service or the represented things afterwards. There is possibility that purchase request might be triggered directly right after capturing Tonotag.

Another activity that can be triggered right after capturing the Tonotag is to subscribe for something right after capturing its Tonotag.

III. Computer System

Figure 43:
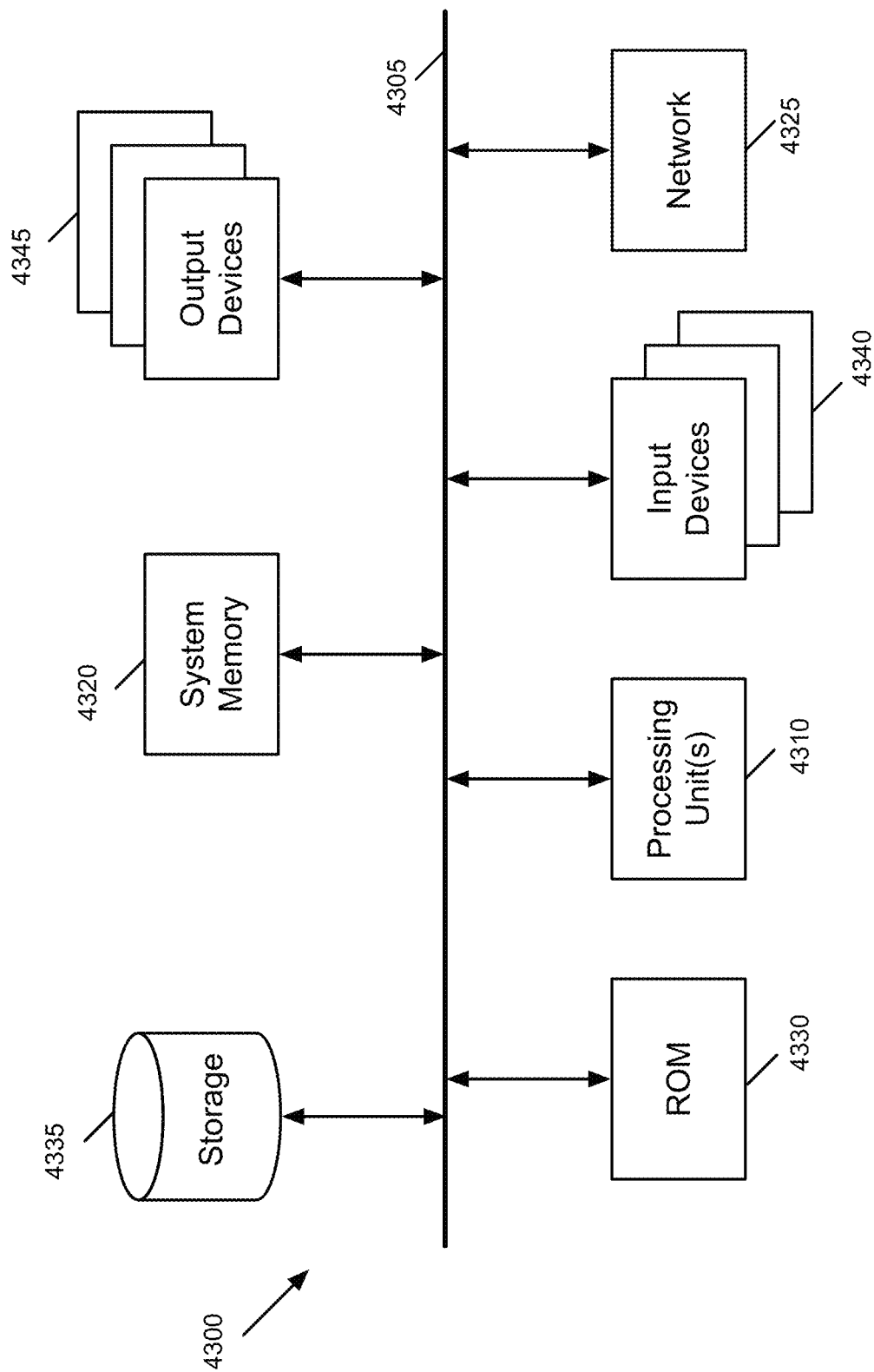
FIG. 43 is a functional block diagram illustrating an example electronic system, according to various aspects of the present disclosure.

FIG. 43 is a functional block diagram illustrating an example electronic system 4300, according to various aspects of the present disclosure. With reference to FIG. 43, some embodiments of the invention, such as for example, and without limitations, the wave tag manager 100, the wave tag requesting device 155, the broadcasting device 158, the wave tag reader/capture device 140, the mobile devices, the servers, the computers, etc., described above, may be implemented using the electronic system 4300. The electronic system 4300 may be used to execute any of the processes, methods, controls, or operating system applications described above. The electronic system 4300 may be a computer (e.g., a desktop computer, laptop computer, a personal computer, a tablet computer, a server computer, a mainframe, a blade computer etc.), a phone (e.g., a smartphone), a personal digital assistant (PDA), or any other sort of electronic device. Such an electronic system may include various types of computer readable media and interfaces for various other types of computer readable media. The electronic system 4300 may include a bus 4305, processing unit(s) 4310, a system memory 4320, a read-only memory (ROM) 4330, a permanent storage device 4335, input devices 4340, and output devices 4345.

The bus 4305 may collectively represent all system, peripheral, and chipset buses that communicatively connect the numerous internal devices of the electronic system 4300. For example, the bus 4305 may communicatively connect the processing unit(s) 4310 with the read-only memory 4330, the system memory 4320, and the permanent storage device 4335.

From these various memory units, the processing unit(s) 4310 may retrieve instructions to execute and data to process in order to execute the processes of the invention. The processing unit(s) may be a single processor or a multi-core processor in different embodiments.

The read-only-memory 4330 may store static data and instructions that are needed by the processing unit(s) 4310 and other modules of the electronic system. The permanent storage device 4335, on the other hand, may be a read-and-write memory device. This device is a non-volatile memory unit that may store instructions and data even when the electronic system 4300 is off. Some embodiments of the invention may use a mass-storage device (such as a magnetic or optical disk and its corresponding disk drive) as the permanent storage device 4335.

Other embodiments may use a removable storage device (such as a floppy disk, flash drive, etc.) as the permanent storage device. Like the permanent storage device 4335, the system memory 4320 may be a read-and-write memory device. However, unlike storage device 4335, the system memory may be a volatile read-and-write memory, such as random access memory. The system memory may store some of the instructions and data that the processor needs at runtime. In some embodiments, the invention's processes may be stored in the system memory 4320, the permanent storage device 4335, and/or the read-only memory 4330.

From these various memory units, the processing unit(s) 4310 may retrieve instructions to execute and data to process in order to execute the processes of some embodiments.

The bus 4305 may also connect to the input and output devices 4340 and 4345. The input devices may enable the user to communicate information and select commands to the electronic system. The input devices 4340 may include alphanumeric keyboards and pointing devices (also called "cursor control devices"). The output devices 4345 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 43, the bus 4305 may also couple the electronic system 4300 to a network 4325 through a network adapter (not shown). In this manner, the computer may be a part of a network of computers (such as a local area network ("LAN"), a wide area network ("WAN"), an Intranet, or a network of networks, such as the Internet. Any or all components of the electronic system 4300 may be used in conjunction with the invention.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also referred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, and wired download.

What is claimed is:

1. A method of identifying data items by acoustic wave patterns, the method comprising:
receiving a media file comprising acoustic data at an acoustic wave tag generating device;
defining, from the media file, a plurality of acoustic wave blocks comprising a plurality of signaling wave blocks and a plurality of body wave blocks, each acoustic wave block comprising a unique fingerprint, each fingerprint comprising a set of unique acoustic wave pattern features distinguishable from the unique acoustic wave pattern features of other acoustic wave blocks in the plurality of acoustic wave blocks;
storing the unique fingerprints of each of the plurality of acoustic wave blocks;
receiving a request at the acoustic wave tag generating device from a requester for a plurality of acoustic wave tags to identify a plurality of corresponding data items;
assigning a plurality of acoustic wave tags to the requester, each acoustic wave tag comprising (i) a signaling wave block assigned to, and uniquely identifying, said requester and (ii) a set of one or more body wave blocks, wherein each data item in the plurality of data items is uniquely identified by the set of body wave blocks of the corresponding acoustic wave tag;
storing a mapping of the signaling wave blocks of the assigned acoustic wave tags to the requester and a mapping of each set of body wave blocks to the corresponding data items;
broadcasting the signaling wave block and the set of body wave blocks of a first acoustic wave tag in the plurality of the acoustic wave tags assigned to the requester;
at a capturing device, capturing the signaling wave block and the set of body wave blocks of the first acoustic wave tag;
extracting the unique fingerprints of the signaling wave block and the set of body wave blocks of the first acoustic wave tag;
identifying the captured signaling wave block and the captured set of body wave blocks of the first acoustic wave tag by comparing the extracted unique fingerprints of the signaling wave block and the set of body wave blocks of the first acoustic wave tag with the stored unique fingerprints of the plurality of acoustic wave blocks;
identifying the requester by comparing the identified signaling wave block of the first acoustic wave tag with the stored mapping of the signaling wave block of the first acoustic wave tag to the requester; and
determining the data item identified by the set of body wave blocks of the first acoustic wave tag from the stored mapping of the set of body wave blocks to the corresponding data items.

2. The method of claim 1, wherein the request for the plurality of acoustic wave tags comprises a plurality of sound tag generation parameters comprising a set of one or more lifecycle parameters for the generated acoustic wave tags, wherein the set of life cycle parameters for the first acoustic wave tag comprises an expiration date of the first acoustic wave tag, and wherein the data item identified by the set of body wave blocks of the first acoustic wave tag is a first data item, the method further comprising:
unassigning the first acoustic wave tag from the corresponding data item after the expiration date;

including the first acoustic wave tag in a pool of unassigned acoustic wave tags; and assigning the set of body wave blocks of the first acoustic tag to a second data item in response to receiving a request to assign the second data item to an acoustic wave tag.

3. The method of claim 1, wherein the request for the plurality of acoustic wave tags comprises a plurality of sound tag generation parameters comprising a set of one or more lifecycle parameters for the generated acoustic wave tags, wherein the set of life cycle parameters for the first acoustic wave tag comprises a number of uses of the first acoustic wave tag, wherein the data item identified by the set of body wave blocks of the first acoustic wave tag is a first data item, the method further comprising:

unassigning the first acoustic wave tag from the corresponding data item after said number of uses;

including the first acoustic wave tag in a pool of unassigned acoustic wave tags; and assigning the set of body wave blocks of the acoustic tag to a second data item in response to receiving a request to assign the second data item to an acoustic wave tag.

4. The method of claim 1, wherein the data item triggers an action in the capturing device.

5. The method of claim 4, wherein the action comprises performing a financial transaction, wherein the request for the plurality of acoustic wave tags comprises a plurality of sound tag generation parameters comprising an amount of money and a payment method, the method further comprising sending a request by the capturing device to withdraw the amount of money using the payment method.

6. The method of claim 5, wherein the sound tag generation parameters further comprise a transaction fee and a redeeming code.

7. The method of claim 5, wherein the request for the plurality of acoustic wave tags further comprises a set of credentials to use in software development kits (SDKs), the method further comprising monitoring the financial transaction, starting the financial transaction, or stopping the financial transaction by the requester using the set of credentials.

8. The method of claim 4, wherein the action comprises performing a financial transaction, wherein the request for the plurality of acoustic wave tags comprises a plurality of sound tag generation parameters comprising a payment method and a set of one or more credentials, the method further comprising:

at the acoustic wave tag generating device, assigning the financial transaction to the first acoustic wave tag using the set of credentials;

performing the financial transaction by the capturing device using the payment method; and monitoring the transaction, starting the transaction, or stopping the transaction by the requester using the set of credentials.

9. The method of claim 8 further comprising applying a service fee based on an overall usage of the payment method in one of a pay as you go model and a subscription model.

10. The method of claim 4, wherein the action comprises performing a content sharing operation on a shared content comprising one of a uniform resource locator (URL), a multimedia file, and a contact address, the method further comprising:

requesting a method of storing the shared content; and
storing the shared content using the method of storing the shared content.

11. The method of claim 10, wherein the request for the plurality of acoustic wave tags further comprises a set of credentials to use in software development kits (SDKs), the method further comprising monitoring the sharing operation, starting the sharing operation, or stopping the sharing operation using the set of credentials by the requester.

12. The method of claim 4, wherein the action comprises performing a content sharing operation, the content comprising one of a uniform resource locator (URL), a multimedia file, and a contact address, the method further comprising:

requesting a method of forwarding the shared content into social media applications or messaging applications; and forwarding the shared content into social media applications or messaging applications using the method of forwarding.

13. The method of claim 4, wherein the action comprises performing an authentication, wherein the request for the plurality of acoustic wave tags comprises a plurality of sound tag generation parameters comprising a set of one or more access credentials, the method further comprising: at the capturing device, using the access credentials to authorize the capturing device to access shared information.

14. The method of claim 4, wherein the action comprises performing a two factor authentication, the method further comprising:

at the capturing device, authorizing the capture device based on a determination that the first acoustic wave tag is a second factor authenticator tag corresponding to the requester.

15. The method of claim 14, wherein the request for the plurality of acoustic wave tags comprises a plurality of requester related parameters comprising one of an account identification and data passed from a first step of authentication.

16. The method of claim 4, wherein the action comprises performing a decryption operation, wherein the request for the plurality of acoustic wave tags comprises an encryption algorithm and an encrypted data, the encrypted data comprising one of an encrypted file, an encrypted multimedia file, and an encrypted text, the method further comprising:

at the capturing device, mapping the first acoustic wave tag to a decryption key; and decrypting the encrypted data using the mapped decryption key.

17. The method of claim 4, wherein the action comprises performing an encryption operation, wherein the request for the plurality of acoustic wave tags comprises a method of encryption and an encryption key, the method further comprising:

at the acoustic wave tag generating device, encrypting the data associated with the first acoustic sound wave using the encryption key and the method of encryption; and at the capturing device, receiving the encrypted data; and
decrypting the encrypted data using a decryption key corresponding to the encryption key.

18. The method of claim 17, wherein the method of encryption request comprises providing an encryption request button, and wherein the method of encryption comprises Rivest-Shamir-Adleman (RSA) algorithm.

19. The method of claim 17 further comprising: at the capturing device, performing one of storing the decrypted data, forwarding the decrypted data into one or more social media applications, and forwarding the decrypted data into one or more messaging applications.

20. The method of claim 17, wherein the request for the plurality of acoustic wave tags further comprises a set of credentials to use in software development kits (SDKs), the method further comprising monitoring the decryption operation, starting the decryption operation, or stopping the decryption operation by the requester using the set of credentials.

21. The method of claim 1, wherein the acoustic wave blocks are mechanical wave type wave blocks comprising at least one of audible sound waves and inaudible wave sounds comprising ultrasound waves.

22. The method of claim 1, wherein the set of acoustic wave blocks of the first acoustic wave tag comprises at least two acoustic wave blocks, comprising at least one audible sound wave block and at least one inaudible acoustic wave block.

23. The method of claim 1, wherein the signaling wave block of the first acoustic wave tag further identifies at least one of (i) an interpretation method of the first acoustic wave tag, (ii) a private or public accessibility of the first acoustic wave tag, (iii) a verification method for the ownership of the first acoustic wave tag, (iv) a definition of a schema used for generating the first acoustic wave tag, (v) a category of a product identified by the data item identified by the set of body wave blocks of the first acoustic wave tag, and (vi) a type of the data item identified by the set of body wave blocks of the first acoustic wave tag, the type of data comprising one of a uniform resource locator (URL), a barcode, an international standard book number (ISBNs), an Internet protocol (IP) address, and a telephone number.

24. The method of claim 1, wherein each acoustic wave tag is generated based on one of a plurality of schemas, each schema defining one or more of a number of the acoustic wave blocks, an arrangement of the acoustic wave blocks in the acoustic wave tag, and a type of each acoustic wave block, the type of each acoustic wave block comprising one of a signaling wave block and a body wave block.

25. The method of claim 1, wherein the first acoustic wave tag is a private wave tag accessible to a subset of capturing devices, the method further comprising:

storing a set of parameters of the capturing devices that are authorized to access the data identified by the first acoustic wave tag;

after identifying the data item from the stored mapping of the data item to the first acoustic wave tag, determining whether the capturing device is an authorized capturing device to access the data item;

providing the data item to the capturing device when the capturing device is an authorized capturing device; and preventing the capturing device from accessing the data item when the capturing device is not an authorized capturing device.

26. The method of claim 1, wherein the first acoustic wave tag is a private acoustic wave tag configured to be assigned to a particular set of requesting devices, wherein the first acoustic wave tag is requested by a requesting device, the method further comprising:

storing a set of parameters of the requesting devices that are authorized to request the data item identified by the first acoustic wave tag;

after receiving the request for the first acoustic wave tag to identify the data item, comparing a set of parameters of the requesting device with the stored set of parameters of the requesting devices that are authorized to request the data item; and providing the acoustic wave tag to the requesting device, after the requesting device is determined to be an authorized requesting device.

27. The method of claim 1 further comprising:

at the acoustic wave tag generating device, defining a descriptor for the first acoustic wave tag, the descriptor comprising a definition of the set of acoustic wave blocks and a schema for generating the first acoustic wave tag from the set of acoustic wave blocks; and from the acoustic wave tag generating device, sending the descriptor to a broadcasting device;

wherein the first acoustic wave tag is generated by the broadcasting device using the acoustic wave tag descriptor.

28. The method of claim 1, wherein the requester is one of an organization and a person.

* * * * *